(12) United States Patent
Bhutani et al.

(10) Patent No.: US 12,520,392 B2
(45) Date of Patent: Jan. 6, 2026

(54) NETWORK DIAGNOSTICS USING COLOR OUTPUT OF LAMPS

(71) Applicant: Lutron Technology Company LLC, Coopersburg, PA (US)

(72) Inventors: Ankit Bhutani, Aston, PA (US); Richard S. Camden, Coopersburg, PA (US); Craig Alan Casey, Coopersburg, PA (US); Jordan H. Crafts, Bethlehem, PA (US); Vidur Garg, Allentown, PA (US); Galen Edgar Knode, Macungie, PA (US); Prasad P. Kulkarni, Allentown, PA (US); John F. Yamrick, Souderton, PA (US)

(*) Notice: Subject to any disclaimer, the term of this patent is extended or adjusted under 35 U.S.C. 154(b) by 225 days.

(21) Appl. No.: 18/108,299

(22) Filed: Feb. 10, 2023

(65) Prior Publication Data

US 2023/0189410 A1  Jun. 15, 2023

Related U.S. Application Data

(63) Continuation of application No. 17/219,589, filed on Mar. 31, 2021, now Pat. No. 11,617,243.

(60) Provisional application No. 63/002,968, filed on Mar. 31, 2020.

(51) Int. Cl.
*H05B 45/12* (2020.01)
*H05B 47/17* (2020.01)
*H05B 47/175* (2020.01)
*H05B 47/19* (2020.01)

(52) U.S. Cl.
CPC ............ *H05B 45/12* (2020.01); *H05B 47/19* (2020.01); *H05B 47/17* (2020.01); *H05B 47/196* (2024.01); *H05B 47/199* (2024.01)

(58) Field of Classification Search
CPC ... H04W 84/12; H04W 84/005; H04W 48/12; H04W 52/383; H04W 28/20; H04W 40/28; H04W 28/0289; H04W 16/00; H05B 45/20; H05B 47/19; H05B 45/10; H05B 45/12; H05B 47/10; H05B 45/30
See application file for complete search history.

(56) References Cited

U.S. PATENT DOCUMENTS

| 8,009,042 | B2 | 8/2011 | Steiner et al. |
| 8,199,010 | B2 | 6/2012 | Sloan et al. |
| 8,228,184 | B2 | 7/2012 | Blakeley et al. |
| 9,538,603 | B2 | 1/2017 | Abraham et al. |
| 9,888,543 | B2 | 2/2018 | Chitta et al. |
| 10,022,614 | B1 | 7/2018 | Tran et al. |

(Continued)

FOREIGN PATENT DOCUMENTS

WO   2016005346 A1   1/2016

*Primary Examiner* — Monica C King
(74) *Attorney, Agent, or Firm* — Flaster Greenberg P.C.

(57) ABSTRACT

Devices of a load control system may communicate with each other via a network. The load control system may include different control devices, such as load control devices, input devices, or other devices capable of communicating with each other to perform load control. These control devices may be capable of providing feedback to a user that indicates different network information that may be used for network diagnostics and/or configuration. For example, a lighting control device may be capable of providing feedback via a corresponding lighting load that indicates network information that may be used in network diagnostics and/or configuration.

58 Claims, 28 Drawing Sheets

(56) References Cited

U.S. PATENT DOCUMENTS

| | | | |
|---|---|---|---|
| 10,098,208 B2 | 10/2018 | Gajurel et al. | |
| 10,237,945 B2 | 3/2019 | Sooch et al. | |
| 10,339,795 B2 | 7/2019 | Crafts et al. | |
| 10,506,688 B2 | 12/2019 | Abraham et al. | |
| 11,606,222 B2* | 3/2023 | Jessen | G05D 1/648 |
| 11,838,822 B2* | 12/2023 | Gundavelli | H04W 48/18 |
| 2013/0221872 A1 | 8/2013 | Gan et al. | |
| 2015/0228043 A1 | 8/2015 | Ryan et al. | |
| 2015/0264780 A1* | 9/2015 | Harris | H05B 45/12 315/297 |
| 2016/0055422 A1 | 2/2016 | Li | |
| 2016/0140526 A1 | 5/2016 | Cummins et al. | |
| 2017/0135185 A1 | 5/2017 | Dünser | |
| 2017/0214542 A1 | 7/2017 | Erdmann | |
| 2018/0133583 A1 | 5/2018 | Tran et al. | |
| 2020/0066032 A1* | 2/2020 | Li | H05B 47/199 |
| 2020/0288558 A1 | 9/2020 | Anderson et al. | |
| 2021/0089048 A1 | 3/2021 | Tran | |
| 2021/0307137 A1 | 9/2021 | Bhutani et al. | |
| 2022/0070982 A1* | 3/2022 | Hussell | H05B 47/11 |

\* cited by examiner

LINK QUALITY AND LINK COST

| Link Quality | Link Cost |
|---|---|
| 0 | Unknown/Indefinite |
| 1 | 4 |
| 2 | 2 |
| 3 | 1 |

FIG. 2F

NETWORK DIAGNOSTICS USING COLOR OUTPUT OF LAMPS

CROSS-REFERENCE TO RELATED APPLICATIONS

This application is a continuation of U.S. Non-Provisional patent application Ser. No. 17/219,589, filed Mar. 31, 2021, which claims the benefit of U.S. Provisional Patent App. No. 63/002,968, filed Mar. 31, 2020, entitled NETWORK DIAGNOSTICS USING COLOR OUTPUT OF LAMPS, the disclosure of which is incorporated herein by reference in its entirety.

BACKGROUND

Load control systems may include electrical loads (e.g., lighting loads, etc.) and load control devices (e.g., ballasts, light-emitting diode (LED) drivers, etc.) for controlling electrical power to the electrical loads. The load control devices may be controlled by messages from remote control devices or sensors (e.g., occupancy sensors, etc.) capable of sending instructions via messages to the load control devices for controlling the electrical loads.

Typically, after the load control system is installed in a location, such as a residence, an office, or the like, the devices in the load control system may be added to a network for enabling communication between the devices. As devices are added to the network, either devices that are a part of the load control system or other devices capable of network communication, the quality of network communication may be degraded. Additionally, changes to the physical space in which the load control system is installed (e.g., addition of walls, partitions, desks, etc.) may similarly degrade the quality of network communications. However, it may be difficult for a user to determine the information needed to properly configure the network to improved network communications, particularly as the network or the physical space changes.

SUMMARY

Devices of a control system, such as a load control system and/or lighting control system, may provide feedback to a user to indicate diagnostic or configuration information from which the control system may be configured. For example, the diagnostic or configuration information may comprise network information pertaining to the network (e.g., a mesh network) on which the devices may communicate. The control system may include different control devices, such as load control devices, input devices, or other devices capable of communicating with each other to perform load control. These control devices may be capable of providing feedback to a user that indicates different network information that may be used for network diagnostics and/or configuration. For example a lighting control device may be capable of providing feedback via a corresponding lighting load that indicates network information that may be used in network diagnostics and/or configuration.

The feedback may be provided in response to one or more messages transmitted to a control device. For example, messages may be transmitted to lighting control devices for triggering a feedback mode to indicate the diagnostic or configuration information at the at least one lighting control device. The lighting control device may provide the feedback at a lighting control device by controlling an amount of power provided to at least one LED of the lighting control device to indicate the diagnostic or configuration information associated with the lighting control device. The feedback may be indicated using a predefined color.

The lighting control device may be within a plurality of lighting control devices in a lighting control system. For example, the lighting control device may be a first lighting control device in the plurality of lighting control devices that meets certain predefined criteria in the one or more messages for providing feedback within a corresponding first lighting load. A second lighting control device may not meet the predefined criteria for providing the feedback indicated in the message and may cause a corresponding second lighting load to emit light having a different color or a different combination of wavelengths than the light emitted by the lighting load corresponding to the first lighting control device. For example, the first lighting load and the second lighting load may emit light emit light at a different intensity level within a predefined band of wavelengths. The first lighting control device may provide feedback by increasing an intensity level of at least one LED in the first lighting load above a predefined threshold to indicate the feedback in the predefined band of wavelengths. The at least one LED that is used to indicate the feedback may be a white LED in a red-green-blue-white (RGBW) LED light source. The non-white LEDs may be used to compensate for the increase in the intensity of the white LED to maintain the same color value of the total light output emitted by the plurality of LEDs. Though an RGBW LED light source may be provided as an example, any other light source comprising four or more LEDs may be implemented.

The feedback may be identified within the predefined band of wavelengths using an optical filter. The optical filter is embedded in a lens on a mobile device or glasses. The optical filter may comprise a notch filter configured to remove energy in the predefined band of wavelengths. In another example, the optical filter may comprise a band-pass filter configured to permit emitted light in the predefined band of wavelengths.

During network formation, different control devices may take on different network roles in the network. For example, each control device may take on the role of a leader device, a router device, or an end device. A feedback message may be sent to lighting control devices to trigger the lighting control devices to provide feedback that indicates their role in the network.

The network role of the control devices may include a parent/child role. Leader devices and router devices may be parent devices to which child end devices may be attached for sending and/or receiving communications. A feedback message may be sent to lighting control devices to trigger the lighting control devices to provide feedback that indicates their parent/child role in the network.

Each end device may be attached to a single parent device with which the end device may communicate directly (e.g., via unicast messages). Each end device may also be capable of receiving multicast messages from other auxiliary parent devices. As such, a feedback message may be sent to trigger the auxiliary parent devices to provide feedback indicating their status as an auxiliary parent.

Control devices may be capable of providing feedback that identifies other network information. For example, control devices may be capable of providing feedback that indicates the quality of communications on the network. Lighting control devices may be capable of providing feedback that indicates link quality for a direct communication link between two devices in the network. The lighting control devices may similarly provide feedback that indicates a path cost for communication between devices on a communication path in the network.

The link quality and/or path cost may be determined as relative values above a noise floor measured at the load control device. The noise floor may be an RSSI value for noise generated on the network that is measured at the device. A feedback message may be sent to trigger a control device to provide an indication of the noise floor measured at the load control device.

The feedback may be provided by one or more control devices in the load control system. For example, the feedback may be provided by a plurality of lighting control devices in the load control system. The plurality of lighting control devices may provide different types of feedback to identify different network information at the lighting control devices. The feedback may be provided as a heat map of feedback that indicates the network information in the space in which the load control system is installed, for example.

A plurality of load control devices may provide feedback that identifies a path between a control devices capable of communicating with one another in the load control system. The feedback may identify the path between control devices having different network roles on the network. For example, the feedback may identify a path between an end device and a leader device on a network.

BRIEF DESCRIPTION OF THE DRAWINGS

FIG. 2F is a table that illustrates example link costs that may correspond to different link qualities.

DETAILED DESCRIPTION

Figure 1:
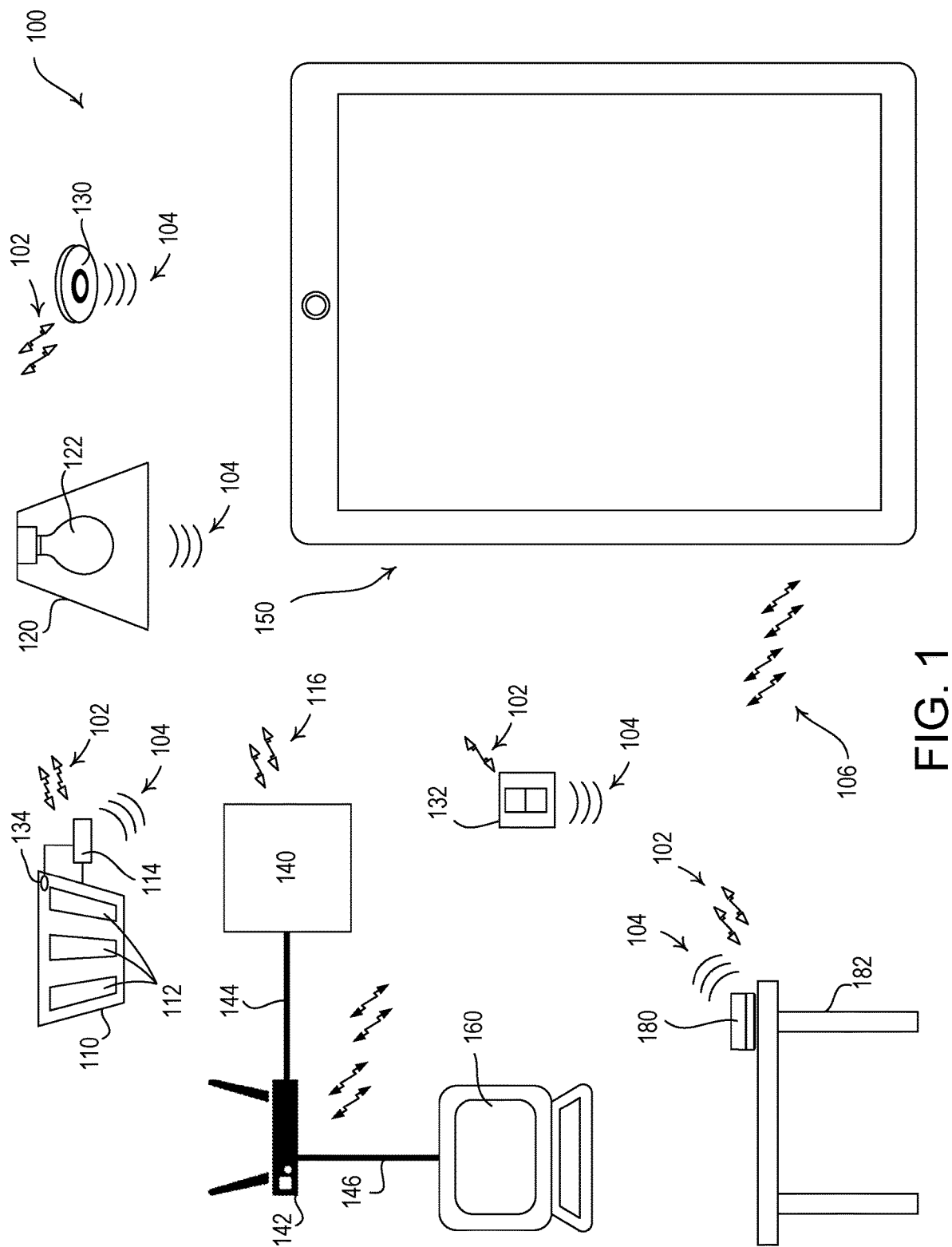
FIG. 1 illustrates a representative load control system for configuring and/or controlling one or more control devices.

FIG. 1 illustrates a representative load control system 100 for configuring and/or controlling one or more control devices in the load control system 100. The load control system 100 may include a lighting fixture 110 (e.g., a panel fixture) having one or more lighting loads 112 (e.g., light-emitting diode (LED) lighting engines). The lighting fixture 110 may also include a load control device 114 (e.g., an LED driver) for controlling an amount of power provided to the lighting loads 112 of the lighting fixture 110. The load control device 114 may be referred to as a lighting control device. Though a lighting control device may be referenced herein for performing certain functionality, other load control devices may be similarly implemented.

The lighting control device 114 may be installed inside of the lighting fixture 110, to an outside surface of the lighting fixture 110, and/or adjacent to (e.g., external to) the lighting fixture 110. The lighting control device 114 of the lighting fixture 110 may operate to control the amount of power provided to the lighting loads 112 to control an intensity level of the lighting fixture 110 in response to the received messages from one or more input devices.

The load control system 100 may include a lighting fixture 120 (e.g., a downlight fixture) having a controllable light source 122 (e.g., a controllable LED lamp). The controllable light source 122 may include an integral lighting control device (e.g., an LED driver) for controlling an amount of power provided to an internal lighting load of the controllable light source 122. For example, the lighting control device may be screwed into a standard Edison socket of the lighting fixture 120. The lighting control device of the lighting fixture 120 may operate as to control an intensity level of the lighting load of the controllable light source 122 in response to the received messages from one or more input devices. Though the lighting control device 114 and the controllable light source 122 may be provided as an example load control devices, the load control system 100 may include other types of load control devices, such as a motorized window treatment, a temperature control device, and/or a plug-in load control device, for example.

The lighting level of the lighting fixture 110 and/or the controllable light source 122 may be controlled according to lighting control instructions received from an input device. An input device may be capable of communicating messages to a load control device via wired and/or wireless signals for controlling an electrical load (e.g., lighting load). Example input devices in the load control system 100 may include an occupancy sensor 130, a remote control device 132, and/or another input device capable of communicating messages to the lighting control device 114 and/or the controllable light source 122 for performing control. The load control system 100 may also comprise a system controller 140 and a user device, such as a mobile device 150, which may also operate as an input device. For example, the mobile device 150 may comprise a smart phone and/or a tablet.

The amount of power delivered to the lighting loads 112 of the lighting fixture 110 and/or the controllable light source 122 may be controlled in response to lighting control instructions received from an input device (e.g., the occupancy sensor 130, the remote control device 132, the system controller 140, the mobile device 150, and/or another input device). The lighting level may be controlled according to operational settings stored in lighting control configuration information, such as preset configurations, zone configurations, occupancy configurations, and/or timing schedule configuration information that may be stored at the lighting control device 114, the controllable light source 122, the system controller 140, and/or the mobile device 150. The lighting control instructions may be transmitted on a wireless communication network (e.g., an Internet-of-Things (IOT) network, such as a THREAD network, an AMAZON Web Service (AWS) network, or another IOT network; a WIFI network; and/or another wireless communication network) via radio-frequency (RF) communication signals 102.

The occupancy sensor 130 may be an input device configured to detect occupancy and/or vacancy conditions in the space in which the load control system 100 is installed. The occupancy sensor 130 may transmit messages via the RF communication signals 102 in response to detecting the occupancy and/or vacancy conditions. The RF communication signals 102 may communicate messages via one or more protocols (e.g., standard communication protocols, such as a WI-FI; WI-MAX; BLUETOOTH; NFC; ZIGBEE, THREAD; and/or proprietary communication protocols, such as CLEAR CONNECT, CLEAR CONNECT TYPE X, Z-WAVE, or another proprietary communication protocol). Though FIG. 1 shows the occupancy sensor 130 communicating messages via the RF communication signals 102, the occupancy sensor 130 may communicate via a wired communication.

The system controller 140 may be configured to turn the lighting load of one or more lighting devices, such as the lighting fixture 110 and/or the controllable light source 122, on and off in response to receiving an occupied signal and a vacant signal, respectively. The occupancy sensor 130 may operate as a vacancy sensor, such that the lighting load of the lighting fixture 110 may be manually turned on by a user and/or automatically turned off in response to detecting a vacancy signal from the sensor (e.g., the lighting load is not turned on in response to detecting an occupancy condition). Examples of load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

Though the occupancy sensor 130 may be shown as being external to the lighting fixture 110, an occupancy sensor 134 may be incorporated in the lighting fixture 110 and/or in direct communication (e.g., wired or wireless) with the lighting control device of the lighting fixture 110 for controlling the lighting fixture 110. The occupancy sensor 134 may be configured to operate similarly to the occupancy sensor 130, but may be in direct communication with the lighting control device of the lighting fixture 110. For example, the lighting load of the lighting fixture 110 may turn on and off in response to receiving an occupied signal and a vacant signal, respectively, from the occupancy sensor 134.

The remote-control device 132 may be an input device configured to transmit messages to the system controller 140 and/or directly to the lighting fixture 110 and/or the controllable light source 122 via the RF communication signals 102 in response to an actuation of one or more buttons of the remote-control device 132. Though FIG. 1 shows the remote-control device 132 communicating messages via the RF communication signals 102, the remote-control device 132 may communicate via a wired communication. The remote-control device 132 may be a wall switch, a dimmer switch, or another remote-control device for controlling an electrical load.

The system controller 140 may also originate one or more messages according to operational settings for operating one or more load control devices in the load control system 100. The system controller 140 may be configured to transmit one or more messages to the lighting control device of the lighting fixture 110 in response to the messages received from associated input devices, such as the remote-control device 132, the occupancy sensor 130, the mobile device 150, and/or another input device. The messages may include control instructions that are generated in response to the operational settings for controlling the lighting control device of the lighting fixture 110 in response to the messages received from associated input devices. The system controller 140 may communicate with the lighting control device in the lighting fixture 110 via a wired and/or wireless communication. For example, the system controller 140 may communicate with the lighting control device of the lighting fixture 110 via RF communication signals 102. The system controller 140 may communicate with other lighting control devices of lighting fixtures (e.g., a group of lighting control devices, etc.) in the load control system 100.

The system controller 140 may communicate with the mobile device 150 directly via wired and/or wireless communications. The system controller 140 may communicate with the mobile device 140 via a network communication device 142. The network communication device 142 may be a wireless access point, such as a wireless router and/or a modem for example. The network communication device 142 may communicate with the mobile device 150 via network communication signals 106 using one of the wireless communication protocols described herein to allow the mobile device 150 to communicate with other computing devices and/or networks (e.g., via the Internet). The system controller 140 may communicate with the network communication device 142 via a communication link 144, which may be a wired and/or wireless communication link. For example, the wireless communication link may allow the system controller 140 to communicate with the network communication device 142 wirelessly using a wireless communication protocol, such as one of the wireless communication protocols described herein. Though the system controller 140 and the network communication device 142 are shown as separate devices in FIG. 1, the network communication device 142 may be included in the system controller 140. The network communication device 142 may also be configured to communication with a user device, such as, a processing device 160 (e.g., a personal computer and/or laptop), via a communication link 146, which may be a wired and/or wireless communication link.

The mobile device 150 may be implemented to configure and/or control the load control system 100. For example, the mobile device 150 may be used to discover, control, and/or configure control devices (e.g., input devices and/or load control devices) in the load control system 100. The mobile device 150 may receive operational settings for controlling the load control devices, such as the lighting control devices, in the load control system 100. The mobile device 150 may update the operational settings of the load control devices and distribute the operational settings to the load control devices themselves and/or the system controller 140 for being stored thereon to enable control of the load control devices in response to messages from the input devices in accordance with the updated operational settings. The mobile device 150 may be a cellular phone (e.g., smart phone), a tablet, a personal digital assistant, a personal computer, a laptop computer, a wearable computing device (e.g., glasses, a watch, a wristband, etc.), or other mobile computing device.

The load control devices may be controlled according to the operational settings stored in memory thereon and/or stored at the system controller 140. For example, the system controller 140 may be configured to transmit one or more messages to the lighting control device 114 of the lighting fixture 110 that include control instructions that are generated in response to the operational settings for controlling the lighting control device 114 of the lighting fixture 110. The control instructions may cause the lighting control device 114 to control an intensity and/or color (e.g., correlated color temperature (CCT) value or full color value) of the emitted light from the lighting loads 115 when the lighting control device 114 is in an operation mode. The control instructions may similarly cause the lighting control device of the controllable light source 122 to control an intensity and/or color (e.g., correlated color temperature (CCT) value or full color value) of the emitted light from the lighting load when the controllable light source 122 is in an operation mode.

The load control devices may enter a feedback mode in response to a triggering event to trigger the feedback mode. The feedback mode may be used for indicating diagnostic or configuration information at the load control devices. The triggering event may be receipt of a message or actuation of a button on the load control device. The messages that operate as a triggering event for the feedback mode may be received directly from the mobile device 150 and/or via another device (e.g., the remote control device 132, the system controller 140, or another device). For example, the triggering event may be in a message from the mobile device 150, an occupancy condition received from the occupancy sensor 130, or another triggering event as described herein. The triggering event may comprise one or more predefined criteria for triggering the feedback mode that may be sent in a feedback message to the load control devices. The predefined criteria may include a group identifier, such as a device type identifier, an area identifier, a zone identifier, a load control system identifier, a manufacturer identifier, or another identifier for identifying a group of control devices. The device type identifier may identify different types of control devices, such as lighting control devices, motorized window treatments, or other control devices in the load control system. The area identifier may indicate a location or sub-location within the user environment for grouping or organizing devices together based on their respective area (e.g., the devices in a single room may be organized or grouped together). After the devices are grouped or organized based on the area to which they are assigned in the user environment, the devices may also be assigned to a certain zone within the area. For example, the lighting devices in a certain area of the user environment may be assigned a zone identifier based on their respective function. For example, the lighting control devices that are intended to emit light on a certain surface, such as desk, and have the same type of electrical load and/or load control device for performing similar control may be grouped or organized together in a "Desk Area" zone.

The predefined criteria may include a threshold at which one or more messages are to be received. For example, the predefined criteria may include a signal quality threshold (e.g., RSSI) at which the feedback message is to be received at the load control device. The predefined criteria may include another signal quality threshold (e.g., RSSI) at which one or more messages are to be received from an input device, the mobile device 150, the system controller 140, and/or another device in the load control system.

The mobile device 150 may transmit a feedback message comprising the one or more predefined criteria that may cause one or more load control devices to enter the feedback mode. The message may be transmitted to the load control devices directly (e.g., via a mobile device beacon message) or indirectly (e.g., via the system controller or another device in the load control system 100). The mobile device beacon message may include, for example, a beacon identifier. For example, the beacon identifier may be unique identifier that identifies the mobile device 150 (e.g., or an application executed on the mobile device 150) and/or a non-unique identifier, such as one of the group identifiers described herein. The mobile device beacon message may include an identifier of load control devices of the load control system 100. The mobile device beacon message may also include a received signal strength discovery threshold. The load control devices may receive the mobile device beacon message and may compare a signal strength (e.g., a received signal strength indicator (RSSI)) at which the mobile device beacon message was received to the received signal strength discovery threshold. A load control devices may enter the feedback mode if the signal strength at which the mobile device beacon was received is greater than or equal to the received signal strength discovery threshold (e.g., the control device is within discovery range of the mobile device 150).

The load control devices may provide feedback to the user and/or the mobile device 150 upon entering the feedback mode. The feedback may include feedback indicated in a message. For example, lighting control device 114 and/or controllable light source 122 may be caused to blink and/or illuminate a color (e.g., color temperature or a full-color value) of a corresponding light load in response to entering the feedback mode. The feedback may be provided by a color value of a total light output of the emitted light produced by the lighting load, or the feedback may be provided in one or more predefined bands of wavelength, as described herein. Different types of feedback may be indicated in the messages received by the control devices to cause different types of feedback to be provided by the control devices.

As described herein, a lighting control device, such as the lighting control device 114 and/or the controllable light source 122 may control a lighting load (e.g., or a plurality of lighting loads), such as the respective lighting loads 112 and the lighting loads of the controllable light source 122, where the lighting loads may include a plurality of different colored LEDs. In other words, the lighting loads 112 and the lighting load of the controllable light source 122 may include within a single package, for example, a number of differently colored emission LEDs and may be configured such that the chromaticity output of the LEDs is mixed to produce light having varying chromaticity coordinates (e.g., color points) within a color gamut formed by the various LEDs that make up the lighting load. As one example, the lighting loads 112 and/or the lighting load of the controllable light source 122 may include one or more red LEDs, one or more green LEDs, one or more blue LEDs, and one or more white LEDs (which may be collectively referred to herein as an RGBW lighting load). White LEDs may comprise substantially white LEDs (e.g., such as phosphor-coated yellow and/or mint green LED(s)). Although the RGBW lighting load is described herein with a combination of four LEDs of certain colors, other combinations of LEDs (e.g., more or less LEDs and/or different color LEDs) may be used. For example, another combination of four or more LEDs of other color combinations may be used.

The lighting control device 114 and the lighting control device of the controllable light source 122 may adjust various settings of the corresponding lighting loads to adjust the light emitted from the lighting loads. For example, the lighting control device may adjust the intensity level (i.e., lighting intensity level and/or brightness), the color (e.g., correlated color temperature (CCT) value and/or full-color value), value of a vibrancy parameter affecting color saturation, etc., which are further described herein. Each lighting control device and respective lighting load may be configured to produce white or near-white light of varying brightness/intensities within a range of color temperatures ranging from "warm white" (e.g., roughly 2600 Kelvin (K)-3700 K), to "neutral white" (e.g., 3700 K-5000 K) to "cool white" (e.g., 5000 K-8300 K). For example, the lighting control device 114 and respective lighting loads 112 may be configured to produce light at colors of varying chromaticity coordinates that lie on or near the black body locus or curve. Similarly, the lighting control device and the corresponding lighting load of the controllable light source 122 may be configured to produce light at colors of varying chromaticity coordinates that lie along the black body locus or curve. As a further example, such lighting control devices and their corresponding light loads may be further configured to produce any of a plurality of colors within the color gamut formed by the various LEDs that make up the lighting load.

Each lighting control device and its respective lighting load may be configured to increase and/or decrease a color saturation of objects in a load control environment. For example, the lighting control device 114 and/or the controllable light source 122 may control or be responsive to a vibrancy parameter that is configured to adjust the spectrum of the light emitted by the lighting loads in order to control the color saturation of the objects in the load control environment. The vibrancy parameter may allow the lighting control device 114 and/or the controllable light source 122 to tune the individual colors that make light at a given color (e.g., full color or a color temperature). The vibrancy parameter may allow the lighting control device 114 and/or the controllable light source 122 to control the saturation of light having given chromaticity coordinates. The vibrancy parameter allows the lighting control device 114 and/or the controllable light source 122 to control the power provided to the LEDs of the corresponding lighting loads to adjust the overall spectral power distribution of the light source, which may affect the color of the light (e.g., the reflected light) on objects within the load control environment. Increases and decreases in the value of the vibrancy parameter may increase and/or decrease the color saturation of objects in the area without changing the color of the light emitted by the lighting loads when the occupant of the space looks directly at the lighting loads. In an example, the vibrancy parameter may be a value between zero and one hundred percent for increasing and/or decreasing the color saturation of the objects in the load control environment. Changing the value of the vibrancy parameter may cause the lighting control device 114 and/or the controllable light source 122 to decrease or increase the intensity of one or more white LEDs (e.g., white or substantially white LEDs) that make up the respective lighting loads (e.g., the lighting loads 112 or the lighting load of the controllable light source 122). For example, increasing the value of the vibrancy parameter may thereby decrease the intensity of the one or more white LEDs that make up the respective lighting loads (e.g., the lighting loads 112 or the lighting load of the controllable light source 122), and thereby increase the color saturation of the objects in the load control environment. Decreasing the value of the vibrancy parameter may thereby increase the intensity of the one or more white LEDs that make up the respective lighting loads (e.g., the lighting loads 112 or the lighting load of the controllable light source 122), and thereby decrease the color saturation of the objects in the load control environment. Changing the value of the vibrancy parameter in this manner may also include changing the intensities of other LEDs (e.g., red, green, and/or blue LEDs) of the lighting loads (e.g., the lighting loads 112 or the lighting load of the controllable light source 122) to maintain the same color output and/or intensity level of the lighting loads (e.g., to maintain the same (or approximately the same within one or more MacAdam ellipses) chromaticity coordinates of the mixed color output of the lighting loads) and/or the same lumen output of the lighting loads. Adjusting the vibrancy value may, however, adjust a spectral power distribution of the light, which may adjust the light reflected off of objects in the space. For example, as the vibrancy value increases, a spectral power distribution curve (e.g., spectrum) of the emitted light (e.g., relative intensity vs wavelength) may become sharper and/or may result in individual colors on the objects to appear more vibrant when the light reflects off of them. One example of such a lighting control device and respective lighting load is described as illumination device 38 of U.S. Pat. No. 10,237,945, issued Mar. 19, 2019, entitled ILLUMINATION DEVICE, SYSTEM AND METHOD FOR MANUALLY ADJUSTING AUTOMATED PERIODIC CHANGES IN EMULATION OUTPUT, the contents of which are hereby incorporated by reference in their entirety. One will recognize that other examples lighting control device and respective lighting loads are possible.

The mobile device 150 may discover control devices (e.g., input devices and/or load control devices) upon receipt of control device beacons transmitted from the control devices. The control device beacons may be beacons transmitted from the control devices and include a unique identifier that identifies the corresponding control devices (e.g., input devices and/or load control devices). For example, a control device beacon may include a serial number or another unique identifier that corresponds to a respective control device. The beacon may include an address (e.g., a network address), a unique identifier, and/or any other kind of device identification data. The control device beacons may also, or alternatively, include a unique identifier of the device type for the corresponding control device. For example, the control device beacons may include an identifier for lighting control devices, sensors (e.g., occupancy sensors, etc.), remote control devices, and/or other types of control devices.

The control device beacons may be transmitted via RF communication signals 104 from control devices in the load control system 100. For example, the control device beacons may be transmitted from the lighting fixture 110, the controllable light source 120, the occupancy sensor 130, the remote-control device 132, and/or another type of control device. In addition, the control device beacons may be transmitted via RF communication signals 102. The RF communication signals 102 and the RF communication signals 104 may be wireless communication signals that communicate via first wireless communication protocol. The RF communication signals 102 and the RF communication signals 104 may be of a different signal type (e.g., protocol, bandwidth, etc.). For example, the RF communication signals 104 may be communicated via a first wireless communication protocol, such as a short-range wireless communication protocol, while the RF communication signals 102 may be communicated via a second wireless communication protocol that is different than the first wireless communication protocol and that may be used for communications between control devices (e.g., load control devices and input devices). One of the RF communication signals (e.g., RF communication signals 102) may be used for controlling electrical loads during operation of the load control system 100, and one of the RF communication signals (e.g., RF communication signals 104) may be used for discovering control devices and commissioning the load control system 100.

The RF communication signals 102, 104 may be communicated via a communication circuit (e.g., transceiver) in the respective control devices, or via a separate beacon transmitting device. The beacon transmitting devices for a control device may be included in, or nearby, the control device for indicating a relative location of the corresponding control device by transmitting control device beacons. The RF communication signals 102 may be communicated via the same communication circuit as the RF communication signal 104, or a different communication circuit.

The load control system 100 may include one or more beacon transmitting devices that may be location beacon transmitting devices, such as a beacon transmitting device 180. The beacon transmitting device 180 (e.g., the location beacon transmitting device) may be located at a work station 182. The location beacon transmitting device may communicate a beacon (e.g., a location beacon) via RF communication signals 102 and/or 104. The beacon transmitted by the location beacon transmitting device may include a beacon that communicates a unique identifier. The beacon may be associated with a location at which the location beacon transmitting device resides, such as the work station 182, an office, a conference room, a portion of an office or conference room, or another location.

The beacon transmitted by the location beacon transmitting device may include a unique identifier that the mobile device 150 and/or the system controller 140 may associate with a physical location at which the location beacon transmitting device resides. If multiple location beacons are discovered, the user may associate the unique identifier of the beacon with the greatest signal strength to the closest physical location. The physical location may also, or alternatively, be determined from the geolocation of the mobile device 150.

The mobile device 150 may discover the beacon transmitted by the location beacon transmitting device for configuring and/or controlling one or more control devices in the load control system. For example, the mobile device 150 may discover the beacon transmitted by the location beacon transmitting device and may associate the unique identifier of the beacon with the unique identifier discovered from one or more control device beacons (e.g., beacons transmitted by control devices). The control devices that are associated with the unique identifier of the beacon transmitted by the location beacon transmitting device may be collectively controlled when the location beacon transmitting device is discovered by mobile devices.

The beacons may be transmitted from the control devices and/or the location beacon transmitting device periodically, or in response to a triggering event. The triggering event may be receipt of a message. The triggering event may be sent in a message from the mobile device 150 or another device (e.g., the occupancy sensor 130, the remote control device 132, or another input device). The system controller 140 may automatically control the communication of the beacons by communicating a message based on a periodic triggering event (e.g., expiration of a timer). In response to a message, the control devices and/or the location beacon transmitting device may enter a configuration mode and begin transmitting beacons. The message may trigger a transmission of a beacon or periodic transmission of beacons for a period of time.

The transmission of the beacons may be triggered by a message transmitted on the same or different RF communication signals and/or protocol and/or channels. For devices capable of performing two-way communications on the RF communication signals 104, the mobile device 150 may send a message to the devices on the RF communication signals 104 that cause the devices to communicate beacons on the RF communication signals 102. As the transmission of the beacons may be performed as a one-way communication from a control device, the transmission of the beacons may be triggered by a message sent on another communication protocol and/or using another communication signal. For example, control devices may receive a message via the RF communication signals 102 that triggers the transmission of the beacons from the control devices in the load control system on the RF communication signals 104.

The message that triggers the transmission of the beacons may be communicated to the control devices and/or the location beacon transmitting device directly or indirectly via another device. For example, the mobile device 150 may send a message to the system controller 140 to trigger the transmission of the beacons from the control devices in the load control system. Another message may be sent from the system controller 140 using RF communication signals 102 to trigger the transmission of the beacons from the control devices and/or the location beacon transmitting device. The control devices configured to receive the RF communication signals 102 may begin transmitting the beacons using RF communication signals 104.

The triggering event may be an actuation of a button on a device. One-way communication devices and/or two-way communication devices may transmit beacons in response to actuation of a button on the device.

The device identifier (e.g., device identification data) that is received in the beacons from a device may be used to determine the device identifier for communicating with the device on another network or network protocol. For example, the mobile device 150 may receive the beacon from the lighting fixture 110 via RF communication signals 102 and the unique identifier in the beacon may correspond to the unique identifier for communicating with the lighting fixture on another network using the RF communication signals 104. The unique identifier on each network or network protocol may have a different format, but may include a portion of the identifier (e.g., primary identifier) that is repurposed on each network for enabling ease of communication.

The mobile device 150 may interpret the information received in the beacons and perform commissioning and/or control of the load control system 100, or the mobile device 150 may send the information to another device for enabling commissioning and/or control. For example, the mobile device 150 may send the information received in the beacons and/or user input received on the mobile device 150 to the system controller 140 for configuring and/or controlling the load control system 100.

The mobile device 150 may discover the beacons and determine the beacon identifiers. The mobile device 150 and/or the system controller 140 may select the beacon identifiers for being configured and/or controlled. Each of the discovered beacons may be selected for configuration and/or control, or the beacons that are discovered above a received signal strength discovery threshold (e.g., RSSI) may be selected for configuration and/or control. The received signal strength discovery threshold may define a discovery range (e.g., an area around the mobile device 150 and/or system controller 140 in which control devices may be discovered). The mobile device 150 and/or the system controller 140 may group control devices identified via the beacons and associate the devices for enabling load control in the load control system 100. The mobile device 150 and/or the system controller 140 may automatically add the identifiers of the selected beacons to a group of control devices to be associated for enabling load control.

The control devices of the load control system 100 may communicate with each other on a communication link, which may comprise one or more network communication links via a wireless communication network. The control devices may join the network and/or attach to another devices on the network (e.g., to form a mesh network). When devices in the load control system 100 are initially installed, the control devices in the system may join the network by exchanging credentials that may be used to establish network communication links with other devices on the network. The network credentials may be exchanges with a network commissioning device, such as the mobile device 150 and/or the system controller 140, during commissioning of the load control system 100. The control devices may each attempt to attach to another device on the network to form the mesh network (e.g., formation of the network).

Figure 2A:
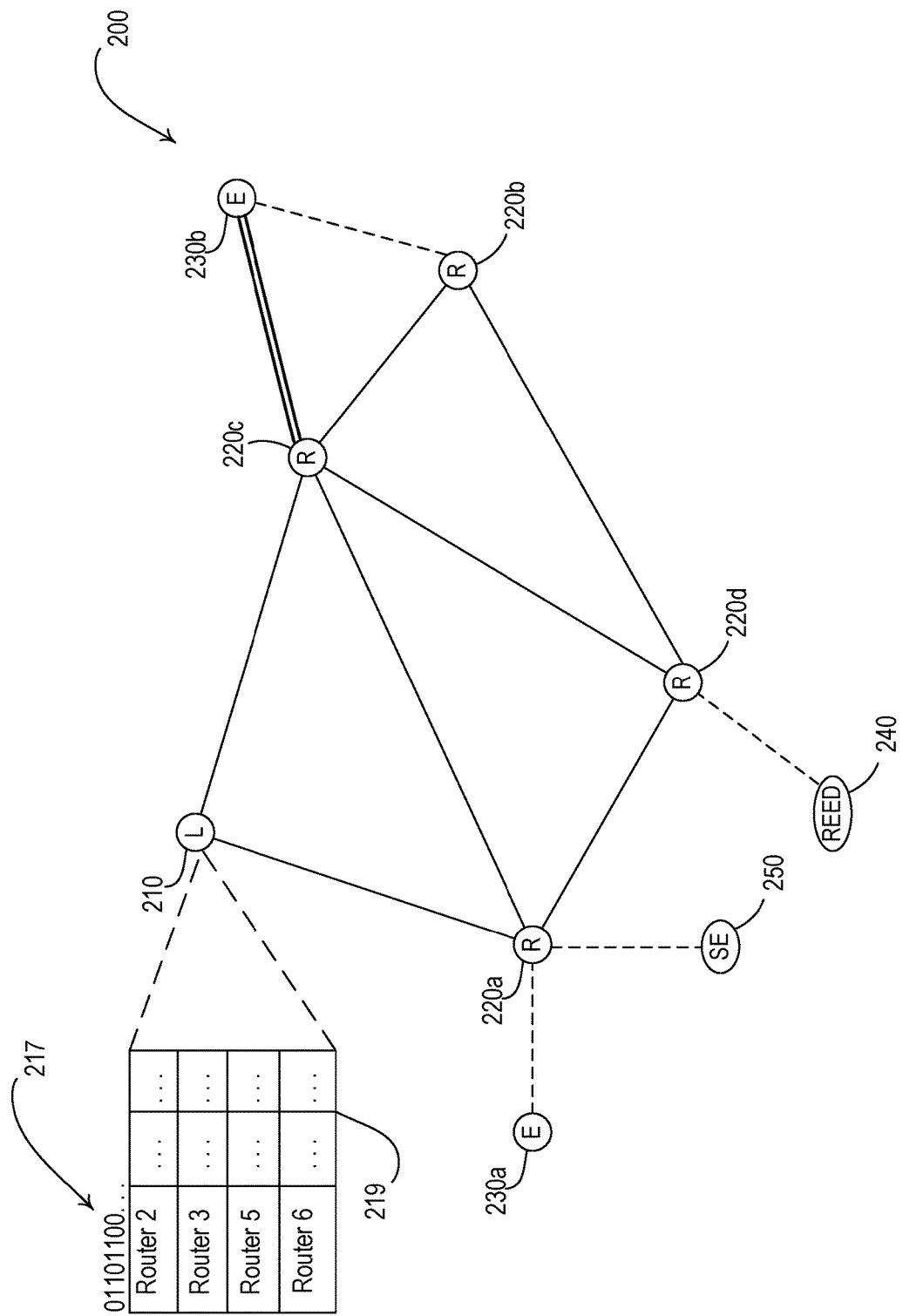
FIG. 2A is a diagram of an example network that may allow for communication between devices in the load control system of FIG. 1.

FIG. 2A is an illustration of an example network 200 that may allow for communication between control devices in a load control system (e.g., the load control system 100). The network 200 may include any suitable network to facilitate communications in a load control system. For example, the network 200 may be a mesh network on which control devices communicate using a mesh network wireless communication protocol (e.g., the THREAD protocol or other suitable protocol). The various control devices of the load control system 100 may communicate with each other via the network 200. As shown in FIG. 2A, the network 200 may comprise a single network partition. In addition, the network 200 may be an example of a network partition (e.g., a subnetwork or subnet) within a larger network. For example, the network 200 may be an example of a network partition within a larger network composed of a plurality of network partitions. The network 200 is an example network and the techniques described herein may be applied to other networks, for example, that include more control devices or fewer control devices than the network 200.

The circled nodes of FIG. 2A may represent devices that are attached to other devices on the network 200 (e.g., the various control devices of the load control system 100). A control device that is attached to at least one other control device on the network 200 may communicate with the other control devices (e.g., that are attached to another control device on the network 200). Communication within the network 200 may be facilitated by the network communication links (e.g., attachments) established within the network 200. Referring to FIG. 2A, the network communication links between the devices may be indicated by lines (e.g., solid and dashed lines) that connect the respective control devices.

The control devices that are attached to at least one other device on the network 200 may take on and/or be assigned a respective role in the network. For example, the roles may include: a leader device (e.g., leader device 210), a router device (e.g., router devices 220a-220d), an end device (e.g., end devices 230a and 230b), a router eligible end device (REED) (e.g., router eligible end device 240), a parent device, a child device and/or a sleepy end device (e.g., sleepy end device 250). The role of a control device may indicate the functions and/or capabilities of the control device with respect to the network 200. As described herein, end devices may include end devices (e.g., end devices 230a and 230b), router eligible end devices (e.g., router eligible end device 240), and/or sleepy end devices (e.g., sleepy end device 250).

As illustrated in FIG. 2A, the network 200 may include a leader device 210 and one or more router devices 220a-220d. The leader device 210 may manage other control devices on the network 200. For example, the leader device 210 may assign and maintain router identifiers (e.g., router IDs) for each of the router devices 220. For example, each of the router devices 220a-220d may be assigned a unique router identifier. The leader device 210 may assign and maintain the roles of other devices. The leader device 210 may be configured as the gateway for the network 200. For example, the leader device may be a control device that facilitates communication (e.g., routes and receives messages to and from) between the network 200 and other networks or network partitions. Referring to FIG. 1, a system controller (e.g., the system controller 140 shown in FIG. 1) may be an example of a leader device 210. In addition, a control device within a load control system that is capable of being assigned to the role of a router device may be assigned to the role of the leader device.

The leader device 210 may support and be attached to multiple router devices (e.g., 64 router devices, 32 router devices, or another number of router devices may be defined for the network 200). The leader device 210 may operate as a router device. The router devices 220a-220d on the network 200 (e.g., attached to the leader device 210 on the network 200) may be in communication with each other, for example, to form a mesh network. The router devices 220a-220d may be in communication with one another via network communication links (e.g., as indicated by the solid lines connecting the router devices 220a-220d). The router devices 220a-220d may be in communication with the leader device 210, either directly or through one or more other router devices (e.g., as indicated by the solid lines connecting the leader device 210 to the router devices 220a and 220c). The router devices 220a-220d may receive and route messages to other devices on the network 200 (e.g., the end devices 230a, 230b, the router eligible end device 240, and/or the sleepy end device 250). For example, the router devices 220a-220d may receive and/or transmit messages between devices, or between each other for communicating messages received from an attached device to another device attached to another router device. Referring now to the load control system 100, a device that is, for example, externally powered (e.g., a device that is not battery powered) may be assigned to the role of a router device, such as the lighting fixture 110, the lighting fixture 120, the occupancy sensor 130, and/or the system controller 140.

The network 200 may include one or more end devices 230a, 230b (e.g., full or minimal end devices). The end devices 230a, 230b may be attached to another device (e.g., a parent device, such as the leader device 210 and/or the router devices 220a, 220b, 220c, 220d) on the network 200 and may transmit and/or receive messages via its attached parent device (e.g., leader device and/or router device). Though two end devices 230a, 210b are shown in FIG. 2A, and each is attached to different router devices, each router device 220a-220d may support multiple end devices (e.g., more than 500 end devices). The system controller 140, input devices, and/or load control devices may be examples of the end devices 230a, 230b.

Referring again to FIG. 2A, the network 200 may include the router eligible end device 240. The router eligible end device 240 may be an end device that is capable (e.g., hardware capable and/or software capable) of becoming a leader device and/or a router device. In certain situations, the role of the router eligible end device 240 may be updated to a leader device and/or a router device. For example, when the router eligible end device 240 identifies itself as being within reach of an end device attempting to attach to the network 200, the router eligible end device 240 may upgrade itself to the role of a router device. The router eligible end device 240 may transmit and/or receive messages via the attached router device 220d. As shown in FIG. 2A, the router eligible end device 240 may be one of the end devices that is attached to the router device 220d. A control device that is, for example, externally powered (e.g., a control device that is not battery powered) may be assigned to the role of a router eligible end device.

The network 200 may include the sleepy end device 250. The sleepy end device 250 may include, or may be similar to, an end device. For example, the sleepy end device 250 may be an end device that is powered by a finite power source (e.g., a battery). The sleepy end device 250 may be aware of its role as a sleepy end device based on, for example, an indication that is stored at the sleepy end device 250. Communication with the sleepy end device 250 may be performed such that the finite power source is preserved and/or is efficiently consumed. For example, the sleepy end device 250 may periodically disable its communication circuit(s) in between message transmissions. The sleepy end device 250 may transmit and/or receive messages via an attached router device 220a. As shown in FIG. 2A, the sleepy end device 250 may be one of the end devices that is attached to the router device 220a. Input devices (e.g., the remote control device 170) and/or load control devices (e.g., the motorized window treatments 150 when battery powered) may be examples of the sleepy end device 250. In addition, sensors and/or battery powered devices may be examples of the sleepy end device 250.

The leader device 210 may update the roles (e.g., or confirm role updates) of the devices communicating within the network 200, for example, based on changes to the network 200. In an example, a control device may be assigned to a certain role when the device attaches to the network 200, and the leader device 210 may update the role of the device based on changes in network conditions. Changes in network conditions may include: increased message traffic, attachment of other devices, changes in signal strength, etc. Updates to the assigned role of a control device may be based on the capabilities of the device. For example, the leader device 210 may update the role of a control device from a router eligible end device to a router device (e.g., as a router eligible end device is an end device that is eligible to perform the role of a router device). The leader device 210 may update the role of a control device to a router device by assigning a router identifier (ID) to the device.

As the leader device 210 updates the roles of the devices in the network 200, the leader device may maintain the number of router devices in the network 200 and/or the router identifiers in use in the network 200. For example, the leader device 210 may store and/or maintain a bitmap 217 that may be used to indicate the number of router devices and/or the router identifiers being used in the network 200. The bitmap 217 may include a number of bits that each correspond to a different router identifier being used in the network 200. In an example, the leader device 210 may support 64 router devices and the leader device 210 may store a 64-bit bitmap for tracking the router identifiers in use in the network 200. Each bit in the bitmap may indicate whether a router identifier is identified by the leader device 210 as being used (e.g., with a value of "1") or unused (e.g., with a value of "0"). The leader device 210 may determine that a device should be upgraded to a router device and, so long as a router identifier is available, assign a router identifier to the router device. The leader device 210 may downgrade router devices (e.g., to end devices) or remove router devices from the network 200. As router devices are added or removed, the bitmap 217 may be updated to indicate the number of router devices and/or router identifiers that are in use in the network 200.

The leader device 210 may send the bitmap 217 to the other router devices in the network 200. Each router device, including the leader device 210, may maintain network information about each of the router devices identified as being used in the network 200. For example, each router device may maintain network information about each of the router devices in a router table, such as the router table 219. For example, the network information in the router table 219 may identify the router devices in the network 200 and the quality of communications that a corresponding router device has with the other router devices being maintained in the router table stored locally thereon. Each router table, such as the router table 219, may include a row for each router identifier indicated in the bitmap 217. Each router device in the network, including the leader device 210, may perform communications on the network 200 based on the network information being stored and maintained in the locally stored router table. For example, a router device, such as the router devices 220a-220d and/or the leader device 210, may transmit messages differently within the network 200 based on the quality of the communications with corresponding router devices identified in the router table stored locally thereon.

The control devices attached to the network 200 may further operate as parent devices and/or child devices. Leader devices (e.g., the leader device 210) and router devices (e.g., the router devices 220a-220d) that are attached to one or more end devices (e.g., the end devices 230a, 230b, the router eligible end device 240, and/or the sleepy end device 250) may operate as parent devices. End devices (e.g., the end devices 230a, 230b, the router eligible end device 240, and/or the sleepy end device 250) that are attached to a leader device (e.g., the leader device 210) or a router device (e.g., one of the router devices 220a-220d) may operate as child devices. As a parent device, the leader device 210 and the router devices 220a-220d may each be attached to one or more child devices (e.g., one or more of the end devices 230a, 230b, the router eligible end device 240, and/or the sleepy end device 250, as described herein). In addition, the leader device 210 and the router devices 220a-220d may store and/or relay messages that are sent by their respective attached child devices. For example, the leader device 210 and the router devices 220 may receive messages from their respective child devices and route the received messages to the intended recipient device (e.g., either directly to the intended recipient device, via the respective parent device of the intended recipient device, and/or to a router device or leader device this is on the path to the intended recipient). Similarly, the leader device 210 and the router devices 220a-220d may receive messages intended for their respective child device and route the message to the appropriate child device. The parent of a respective sleepy end device may schedule communications with the sleepy end device when the communication circuit of the sleepy end device is enabled.

As indicated in FIG. 2A, the relationship (e.g., attachment) between a child device and a respective parent device may be indicated by dashed lines. For example, the router device 220a may be configured as the parent device of the end device 230a and the sleepy end device 250. Similarly, the router device 220b may be configured as the parent device of the end device 230b. The router device 220a may receive messages intended for the end device 230a and forward the message to the end device 230a. As the router device 220a is configured as the parent device of the end device 230a, the end device 230a may transmit messages to the router device 220a, and the router device 220a may route the message to the intended recipient. For example, when the end device 230a intends to transmit a message to the end device 230b, the end device 230a may initially transmit the message to the router device 220a. The router device 220a may route the message to the router device 220b (e.g., the parent device of the end device 230b). For example, the router device 220a may route the message to router device 220b via router device 220c or router device 220d, and the router device 220b may then forward the message to the end device 230b. In addition, as described herein and illustrated in FIG. 2A, the router device 220a may route the message to the end device 230b via the router device 220c (e.g., the auxiliary parent device of the router device 230b).

Child devices may be configured to transmit unicast messages to their respective parent device. A control device may transmit unicast messages to another control device in the network directly or via hops through other devices in the network. Each unicast message may be individually addressed to another control device by including a unique identifier of the control device to which the unicast message being transmitted. Control devices may generate separate unicast messages for each control device with which they are communicating and address the unicast messages to each control device independently. The unicast messages may also include the unique identifier of the control device that is transmitting the unicast message. A control device may determine that it is the intended recipient of a unicast message by identifying its own unique identifier in the unicast message.

Messages may be sent in the network using multicast messages and/or broadcast messages. Multicast messages may be sent to a group of control devices in the network. A multicast message may include a group identifier. The control devices that are members of the group may recognize the group identifier and process the message accordingly. Broadcast messages may be sent to each control device in the network capable of receiving the message. The broadcast messages may include an indication that the message is a broadcast message (e.g., a broadcast address). Each device that receives a broadcast message may process the message accordingly. A network may use either multicast messages or broadcast messages, and the two terms may be used unteachably herein.

The messages transmitted by a child device to its respective parent device may include an indication (e.g., a unique identifier) of the intended recipient, and the parent device may route the message accordingly. Referring again to FIG. 2A, the end device 230a may transmit messages to the router device 220a (e.g., the parent device of the end device 230a), and the router device 220a may route the message based on the intended recipient. For example, if the end device 230a transmits a message intended for the end device 230b, the router device 220a may route the message to the router device 220b (e.g., the parent device of the router eligible end device 230b) via the router device 220c or the router device 220d. For example, if the router device 220a routes the message via the router device 220d, the router device 220d may forward the message to the router device 220b, which may forward the message to the end device 230b. The router device 220a may identify that the router device 220b is the parent device that the end device 230b is attached via a lookup table. As illustrated in FIG. 2A, multiple paths may exist to route messages over the network 200, and router devices may identify the shortest path (e.g., lowest number of hops) to transmit messages to a respective device.

Child devices may be configured to communicate with an auxiliary parent device (e.g., configured to communicate with more than one parent device). Referring to FIG. 2A, for example, the end device 230b may be configured to communicate with (e.g., transmit message to and receive messages from) a parent device (e.g., a primary parent device), such as the router device 220b. The end device 230b may also be configured to communicate with (e.g., receive messages from) an auxiliary parent device, such as the router device 220c (e.g., as illustrated by the long and short dashed lines in FIG. 2A). A child device may receive unicast messages from its parent device (e.g., primary parent device). A child device may also receive multicast messages (e.g., and/or broadcast messages) from its parent device (e.g., primary parent device) and one or more auxiliary parent devices, which may increase the efficiency and reliability of child device receiving the messages. For example, the child device may receive network advertisement messages via an auxiliary parent device. The number of auxiliary parents that a child device is synchronized with may be limited to a threshold number of auxiliary parents (e.g., 3, 5, 10, etc.).

A child device may be attached to a single parent device and synchronized with one or more auxiliary parent devices. For example, the child device may send and/or receive unicast messages via the parent devices. Similarly, the child device may receive multicast messages via the one or more synchronized auxiliary parent devices. The number of auxiliary parent devices that a respective child device is synchronized with may be limited to a threshold number of synchronized auxiliary parents, which may be pre-defined and/or configured. A child device may attempt to synchronize with an auxiliary parent device by transmitting a message (referred to herein as a link request message) to the auxiliary parent device. For example, referring to FIG. 2A, the end device 230b may have transmitted a link request message to router 220c. The link request message may be used to request a network communication link between two devices. As descried herein, messages may be communicated between devices that share a network communication link. In response to receiving the link request message, the router device 220c may transmit a message (referred to herein as a link accept message) to the end device 230b. The link accept message may include information that allows the respective child device to decrypt messages from the auxiliary parent device (e.g., a frame counter). As described herein, when a child device is synchronized with an auxiliary parent device, the child device may receive multicast messages via the synchronized auxiliary parent device. For example, referring to FIG. 2A, the end device 230b may receive multicast messages via the parent device (e.g., router device 220b) and the auxiliary parent device (e.g., router device 220c), which may increase the efficiency and reliability of the child device 230b receiving multicast messages.

A child device may receive advertisement messages from a router device other than the parent device of the child device or a router device other than an auxiliary parent device of the child device. For example, the router device may transmit advertisement messages to enable other control devices to determine that a network has been formed and that the device hearing the advertisement message may attempt to attach to the router device (e.g., to communicate via the network). Devices may receive and track the advertisement messages transmitted by router devices to determine whether the device is able to communicate via the network. Also, or alternatively, the advertisement messages transmitted by a respective router device may provide other router devices with the ability to measure a communication quality metric of the communication signal (e.g., via the received signal strength indicator value) between the respective routers attached to the network (e.g., which the router devices may use to update their respective routing tables or routing information). As described herein, the child device may measure the received signal strength indicator (RSSI) or another communication quality metric of the received advertisement messages.

Certain messages may be propagated and broadcast by multiple devices in the network 200, which may increase the likelihood that a respective child device hears a message. For example, rather than sending multiple transmissions, multicast messages that are substantially similar (e.g., messages that include the same load control instructions that are sent to multiple load control devices) may be broadcasted. Referring again to the load control system 100, an actuation of a button of the remote control device 170 may adjust the intensity of multiple lighting loads (e.g., the lighting load 122 and the plug-in lighting load 142) and a message may be broadcasted to adjust the respective lighting loads. In addition, the devices that receive the broadcast transmission may be configured to process and repeat (e.g., forward the message over the network or otherwise acting as a repeater) the message in response to receiving the broadcast transmission.

Child devices may create and maintain an auxiliary parent table. The auxiliary parent table may include a list of auxiliary parents with which a respective child device is configured to communicate (e.g., synchronized with and/or able to receive multicast messages from). In addition, the auxiliary parent table may include an indication of the received signal strength (e.g., an RSSI) for each of the auxiliary parent devices of the child device. For example, the auxiliary parent table may include a rolling average of the received signal strength indicators for each of the auxiliary parent devices of the child device. Child devices may similarly create and/or maintain a router table. The router table may include the router devices that a respective child device has received messages from (e.g., advertisement messages). In addition, the router table may include an indication of the RSSI or other communication quality metric of messages received from each of the router devices in the router table. Also, or alternatively, child devices may maintain a generic router table. The router table may include each of the routers that a respective child device has received messages from and a received signal strength indicator for each of the respective router devices. The router table may also include an indication of whether a respective router device is a parent of the child device or an auxiliary parent of the child device. As used herein, the term auxiliary parent table may refer to a separate table from the router table or a subset of the router table that includes the router devices that are synchronized auxiliary parents of the child device.

As described herein, the network 200 may allow for communication between devices in a load control system (e.g., the load control system 100 shown in FIG. 1). The end devices 230a, 230b may include load control devices and/or input devices that communicate with other devices in the load control system. For example, the end device 230a may communicate with another end device and/or a router device in the load control system via RF communications.

A control device may attach to another control device on a network or network partition (e.g., the network 200 shown in FIG. 2A) to enable the device to communicate (e.g., transmit and/or receive messages) via the network. A control device may initiate attachment to another control device on a network by transmitting a parent request message (e.g., a multicast parent request message) to discover potential parent devices. A parent request message may be transmitted by a control device to discover and/or attach to a parent device (e.g., router devices and/or leader devices). A control device may transmit the parent request message as a multicast message, for example, to identify devices that are attached to a network that can act as a parent device of the control device.

Potential parent devices (e.g., the leader device 210 and/or the router devices 220 of the network 200) that receive a parent request message (e.g., a multicast parent request message) may respond by transmitting a parent response message. For example, potential parent devices that receive a multicast parent request message may each transmit a parent response message (e.g., as a unicast message) to the control device that transmitted the parent request message. A parent response message may indicate that the control device that transmits the parent response message is available to act as a parent device. Accordingly, a control device that transmits a parent request message may receive a plurality of responses to the parent request message and determine a parent to synchronize with based on the received parent response messages. The control device transmitting the parent request message may identify the received signal strength indicator (RSSI) associated with the response messages and attempt attachment to the parent device having the largest received signal strength indicator for the response message.

As multiple control devices transmit parent request messages as multicast messages within the same period of time, the parent devices may each receive multiple parent request messages at the same time or within a short time period. The number of parent request messages being received at a parent device may prevent the parent devices from being able to fully process previously received attachment request messages. In addition, the parent response messages transmitted by each of the parent devices that receive the parent request message may be transmitted at the same or substantially the same time. The number of parent request messages and parent response messages that are transmitted within the same period of time may congest the network due to the number of devices in the network (e.g., each leader device may support more than 30 router devices and each router device may support more than 500 end devices) and/or cause messages to collide with one another, which may cause one or more of the parent request messages or parent response messages to fail to be properly received. When a control device attempting to attach to another control device on the network fails to receive a parent response message, the control device may fail to attach to the other control device on the network, which may increase the amount of time for formation of the network to complete. When each of the devices in the load control system are provided with power, many control devices may attempt to attach to other control devices on the network by transmitting the parent request messages at the same time or within the same time period.

A control device attempting to attach to another control device on a network may be configured to delay network attachment to allow for other control devices to attach to control devices on the network. As described herein, when control devices attempt to attach to another control device on a network, a plurality of messages may be transmitted at the same or substantially the same time, which may increase the likelihood of message collisions on the network. Accordingly, a control device attempting to attach to another control device on the network may delay attachment to the network when the control device determines that another control device is attempting to attach to a control device on the network. For example, the control device may delay network attachment by adding time to a back-off timer after the expiration of which the control device may attempt to attach to a control device on the network.

A control device may decrease the frequency at which the control device attempts to synchronize with an auxiliary parent device and/or decrease the number of synchronized auxiliary parent devices to improve the likelihood of attachment and/or synchronization when requests are sent. Similar to network attachment, when a control device attempts to synchronize with an auxiliary parent device, a plurality of messages may be transmitted at the same or substantially the same time, which may increase the likelihood of message collisions on the network. Accordingly, the control device may decrease the frequency at which the control device attempts to synchronize with an auxiliary parent device (e.g., decrease the execution rate of a procedure to synchronize with an auxiliary parent device), which may decrease the likelihood of message collisions. In addition, the control device may decrease the number of synchronized auxiliary parent devices, which may also decrease the likelihood of message collisions.

Figure 2B:
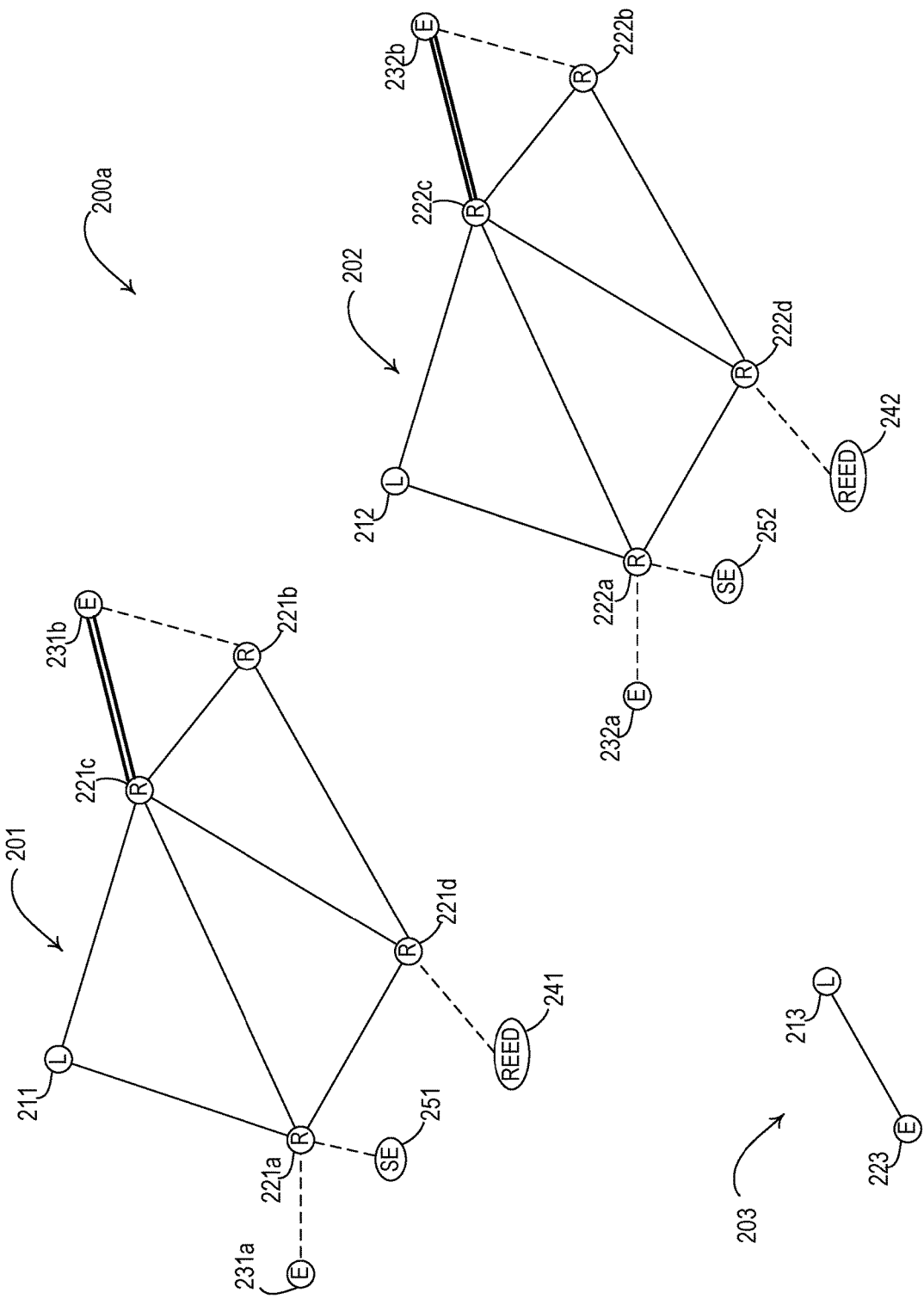
FIG. 2B is a diagram of example networks or network partitions (e.g., networks or subnetworks) that allow for communication between devices in the load control system of FIG. 1.

FIG. 2B is an example illustration of a network 200a having a plurality of network partitions 201, 202, 203 (e.g., separate network partitions). As illustrated in FIG. 2B, the network partition 201 may include the following parent devices: a leader device 211 and router devices 221a, 221b, 221c, 221d. In addition, the network 201 may include child devices, such as: end devices 231a, 231b; router eligible end device 241; and sleepy end device 251. For example, each of the router devices 221a-221d in the network partition 201 may be assigned a unique router identifier. The network partition 202 may include the following parent devices: a leader device 212 and router devices 222a, 222b, 222c, 222d. In addition, the network 202 may include child devices, such as: end devices 232a, 232b; router eligible end device 242; and sleepy end device 252. For example, each of the router devices 222a-222d in the network partition 202 may be assigned a unique router identifier. The network partition 203 may include a single parent device, leader device 213, and a single end device, end device 223.

As illustrated in FIG. 2B, the network partition 203 may include a leader device 213 and an end device 223. The network partition 203, however, may fail to include a router device. Rather, the leader device 213 may function as the sole router device within the network partition 203. A leader device that is not connected or synchronized with a router device may be referred to as a singleton device. For example, the leader device 213 may be a singleton device. As illustrated in FIG. 2B, a singleton device may be connected to one or more child devices (e.g., the end device 223). The network partition 203 may be a singleton partition. As illustrated in FIG. 2B, a singleton partition may include a leader device (e.g., the leader device 213). In addition, a singleton partition may include one or more end devices (e.g., the end device 223). However, as illustrated in FIG. 2B, a singleton partition may not include a router device.

The network 200a may allow for communication between control devices in a load control system (e.g., the load control system 100). In addition, the network partitions 201, 202, 203 may be formed as a result of certain control devices being unable to attach to an already formed network partition. For example, as described herein, a control device may attempt to attach to another control device on a network partition by transmitting a parent request message (e.g., a multicast parent request message). If, however, the control device fails to receive a response to the parent request message (e.g., because the control device is outside of a communication range of the router devices of an already formed network partition), the control device may attempt to form its own network partition (e.g., become a leader device of a new network partition).

A control device that is unable to attach to a network partition may form another network partition. For example, referring to FIG. 2B, the leader device 213 may have been unable to attach to a router device on the network partitions 201, 202 (e.g., because the leader device 213 was outside of communication range of the router devices on the network partitions 201, 202). Accordingly, the leader device 213 may form the network partition 203 and the end device 223 may attach to the network partition 203. Similarly, the leader device 212 may have been unable to attach to the network partitions 201, 203 (e.g., because the leader device 212 is outside of communication range of the router devices of the network partitions 201, 203) and formed the network partition 202.

A network partition may be associated with a partition identifier (e.g., a partition ID). The partition identifier may be randomly or pseudo-randomly assigned (e.g., randomly assigned from a range or list of identifiers). For example, a priority of the respective network partition may be based on the partition identifier for the network partition. The partition identifier may be assigned by randomly selecting a number from a range of partition identifier values. The partition identifier may be selected at a leader device and transmitted in advertisement messages to other devices that may attach to the leader device. Referring now to FIG. 2B, the network partitions 201, 202, 203 may each be associated with a respective partition identifier. For example, the network partition 202 may be assigned a partition identifier of 1, the network partition 203 may be assigned a partition identifier of 2, and the network partition 201 may be assigned a partition identifier of 3. Although the partition identifiers of the network partitions 201, 202, 203 are sequential (e.g., in order to provide for a simplified explanation), the assignment of the partition identifiers to the network partition may be sequential, non-sequential, and/or randomized. As described herein, a partition identifier may also be an indication of a priority of the respective network partition 201, 202, 203. For example, the partition identifier may also be a priority value of the respective network partition 201, 202, 203 (e.g., respective priorities of the network partitions 201, 202, 203 may be 3, 1, and 2). A higher or lower partition identifier may indicate a higher priority value for the network partition priority (e.g., then network partition 201 may be a higher-priority network partition than the network partitions 202, 203 based on the partition identifier).

A priority may be assigned to a respective network partition based on the control devices (e.g., router devices and/or end devices) in the network partition. For example, a network partition having at least one router device in addition to the leader device may be given a higher priority than a network partition having only a leader device and no other router devices. Referring to FIG. 2B, the network partition 201 may be given a higher priority than the network partition 203 since the network partition 201 has router devices 221a-221d and the network partition 203 has no router devices in addition to the leader device. In addition, a priority may be assigned to a respective network partition based on a number of control devices (e.g., router devices and/or end devices) in the network partition. Referring to FIG. 2B, the network partition 201 may be given higher priority than the network partition 203 since the network partition 201 may have a greater number of control devices in the network partition. Each control device in a network partition may have stored locally thereon the number of control devices in the network partition. Network partitions that have the same number of control devices may be given different priorities using different partition identifiers, as described herein. For example, as shown in FIG. 2B, the network partition 201 and the network partition 202 may have the same number of control devices (e.g., router devices and/or end devices). The network partition 201 may have a higher priority based on network partition 201 having a higher or lower partition identifier.

As control devices attach to each of the network partitions 201, 202, 203, the effective communication range of each of the network partitions may increase. In addition, control devices that were initially unable to attach to one or more of the network partitions 201, 202, 203 (e.g., because the control device was previously outside of the communication ranges of all of the network partitions), may subsequently be able to attach to one of the network partitions 201, 202, 203. Moreover, communication within a load control system may be better facilitated when a single network partition is formed (e.g., the network 200 having a single network partition as illustrated in FIG. 2A) as compared to when multiple network partitions are formed (e.g., the network 200a having multiple network partitions 201, 202, 203 as illustrated in FIG. 2B). For example, communication within a load control system may be better facilitated when a single network partition is formed because a device in a network partition may be unable to transmit messages to control devices attached to another network partition (e.g., a device in a network partition may be unable to communicate with other devices outside the network partition). Accordingly, if a control device attached to a first network partition is also within the communication range of a second network partition, the device may attempt to detach from the first network partition and attach to the second network partition. For example, a control device may detach from the first network partition and attach to a second network partition when the priority of the second network partition is higher than the priority of the first network partition.

The router devices attached to each of the network partitions 201, 202 may each be associated with a communication range. The communication range of each of the respective router devices may be pre-defined and/or pre-configured. For example, the communication range of each of the respective router devices may be pre-defined and/or pre-configured based on the hardware components of each of the respective router devices. The effective communication range of a respective network or network partition may be based on the communication range of the router devices attached the respective network (e.g., a summation of the communication range of each of the router devices attached to the respective network). As a result, the communication range of a respective network or network partition may increase as the number of router devices attached to the respective network increases.

As described herein, the control devices attached to a lower-priority network partition may attempt to attach to a higher-priority network partition. For example, the control devices attached to the network partition 202 may attempt to attach to the network partition 201 (e.g., as the network partition 201 has a priority value of 3 and the network partition 202 has a priority value of 1). The router device 222a may receive an advertisement message from a device attached to the network partition 201 (e.g., from the router device 221d). The advertisement message may include an indication of the partition identifier of the network 201 (e.g., 3), which may be greater than the partition identifier of the network partition 202 and may indicate that the network partition 201 is a higher-priority network partition than the network 202. The router device 222a may determine to attach to the network partition 201 (e.g., as the network partition 201 has a higher priority).

The router device 222a may attempt to attach to the network partition 201 by transmitting a request to the leader device of the network partition 201 (e.g., the leader device 211). The request may include a request to attach to the network partition 201 as a router device, for example, by requesting to attach to the network partition 201 and be assigned a certain router identifier. For example, the router device 222a may request to attach to the network partition 201 and be assigned the router identifier that the router device 222a is assigned in the network partition 202. In response, the leader device 211 may reject the request if another router device 212a-212d attached to the network partition 201 is already assigned the requested router identifier. The leader device 211 may accept the request if none of the router devices 212a-212d attached to the network partition 201 are assigned the requested router identifier. If the router device 222a attaches to the network partition 201 and is assigned the requested router identifier, the child devices of the router device 222a (e.g., the end device 232a and the sleepy end device 252) may automatically attach to the network partition 201. For example, as the child devices communicate with the router device 222a using the router identifier. If the router device 222a is assigned the requested identifier by the leader device 211 of the network partition 201 (e.g., the router identifier as assigned in the network partition 202), the child devices may continue to communicate with router device 222a using the same router identifier.

Figure 2D:
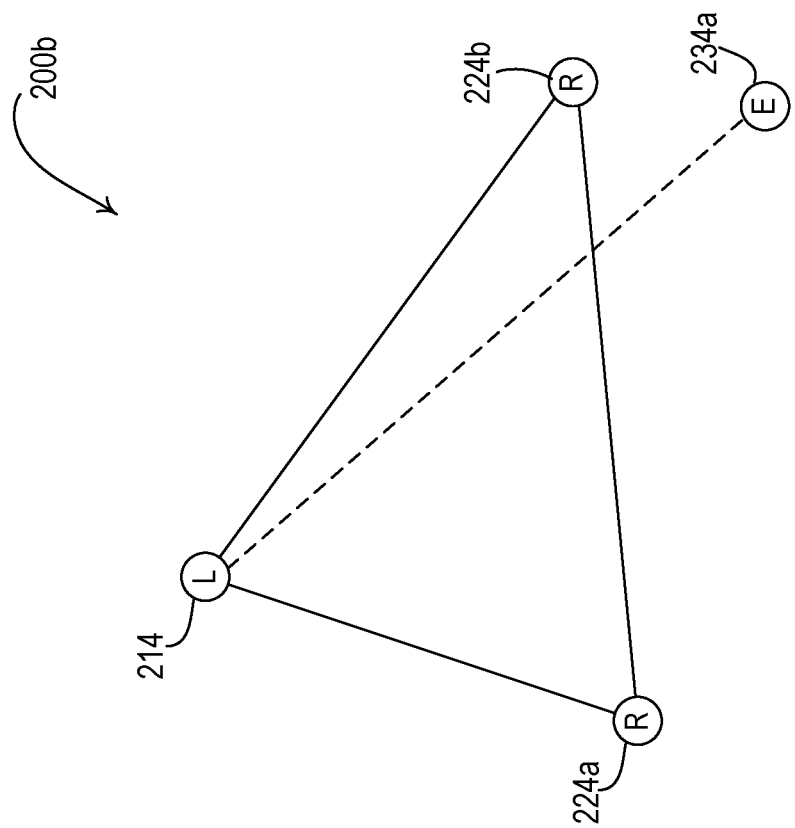
FIGS. 2C and 2D are diagrams of another example network that allows for communication between devices in the load control system of FIG. 1.
Figure 2C:
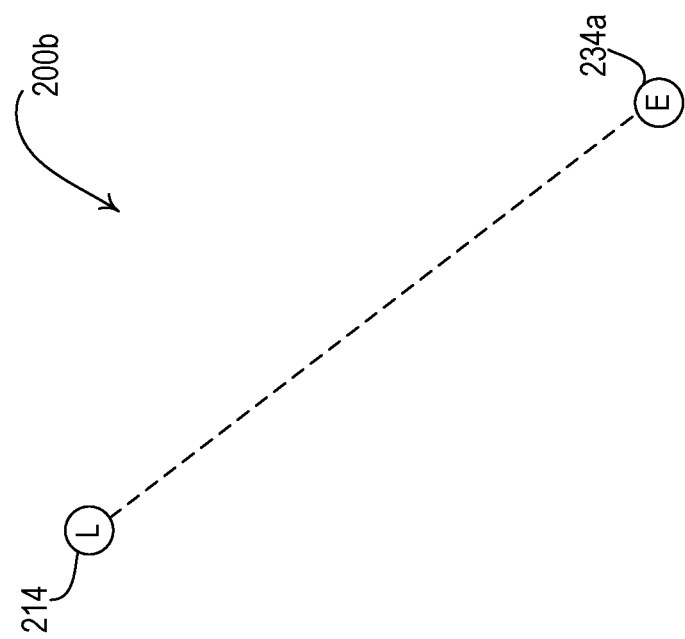

FIGS. 2C and 2D are illustrations of an example network 200b as the network 200b advances or progresses in network formation. As illustrated in FIG. 2C, the network 200b may include a leader device 214 and an end device 234a. As the network 200b is in the initial stages of network formation, the network 200b may not yet include a router device. The end device 234a may, as a result, attach to the leader device 214 (e.g., as other router devices do not yet exist on the network 200b). However, the network communication link (e.g., the parent/child link) between the leader device 214 and the end device 234a may be weak (e.g., the received signal strength indicator of messages received by the end device 234a may be approximately −60 dB). For example, the network communication link between the leader device 214 and the end device 234a may be weak because the leader device 214 and the end device 234a are not proximately positioned to each other. If the network communication link between the leader device 214 and the end device 234a is weak, the likelihood of message transmission and/or reception failures between the leader device 214 and the end device 234a may increase.

FIG. 2D illustrates the network 200b during a later stage of network formation than the stage of network formation illustrated in FIG. 2C. As illustrated in FIG. 2D, the network 200b may grow to include additional control devices as network formation advances (e.g., as time progresses). For example, the network 200b may grow to include router devices 224a, 224b. In addition, the router devices 224a, 224b may be positioned proximate to the end device 234a (e.g., positioned closer to the end device 234a than the leader device 214). In addition, the received signal strength indicators of messages transmitted by the router devices 224a, 224b and received by the end device 234a may be strong (e.g., stronger than the received signal strength indicators transmitted by the leader device 214 and received by the end device 234a, such as −35 dB and −30 dB, respectively). Thus, potential network communications links (e.g., potential parent/child links) between the router devices 224a, 224b and the end device 234a may be stronger than the network communication link between the leader device 214 and the end device 234a. Moreover, as illustrated in FIG. 2D, a potential network communications link between the router device 224b and the end device 234a may be stronger than a potential network communications link between the router device 224a and the end device 234a (e.g., as the router device 224b is positioned closer to the end device 234a than the router device 224a).

As network formation progresses or advances, additional devices may attach to the network. As a result, the end device 234a may experience better communication over the network 200b if the end device 234a determines to detach from an initial parent device (e.g., the leader device 214) and to attach to an updated parent device (e.g., the router device 224a or the router device 224b). For example, as described herein, the updated parent device may be positioned closer to the end device 234a than the initial parent device (e.g., such that the updated parent device and the end device 234a may have a stronger network communication link), which may increase the likelihood that message transmission and/or receptions are successful. As a result, as network formation advances, the end device may determine whether to attach to an updated parent device. Although FIGS. 2C and 2D are described using an example where the relative positioning of devices may increase or decrease the network communication link shared between two devices, other conditions may affect the network communication link shared between two devices (e.g., line of sight, interference, signal obstructions, etc.). To that extent, the scenarios of FIGS. 2C and 2D are merely examples to illustrate that a network may change over time and that changes to a network may be considered in attempts to improve communications over the network.

Figure 2E:
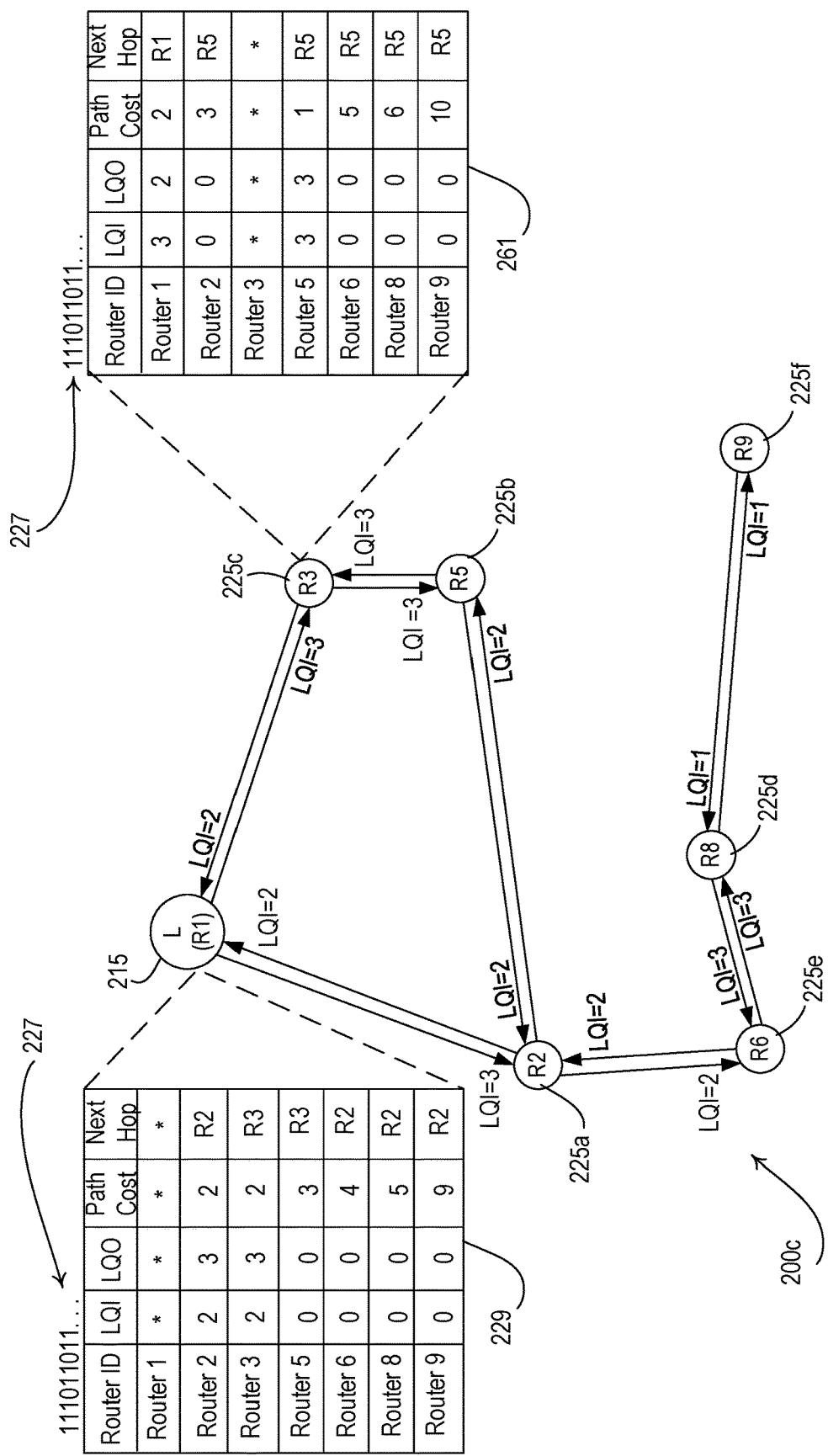
FIG. 2E is a diagram of another example network that illustrates the cost and network overhead associated with communication between the devices in the load control system of FIG. 1.

FIG. 2E is an illustration of an example network 200c. As illustrated in FIG. 2E, the network 200c may include a leader device 215 and router devices 225a, 225b, 225c, 225d, 225e, 225f. In the network 200c, the router devices (e.g., the leader device 215 and router devices 225a, 225b, 225c, 225d, 225e, 225f) may periodically transmit advertisement messages that may be used for calculating cost and/or quality of communications in the network 200c. For example, router device 225c may send an advertisement message that is received by leader device 215 and leader device 215 may send an advertisement message that is received by the router device 225c. Each router device may measure the received signal strength indicator (RSSI) of the received advertisement message and calculate a link quality at which the advertisement message is received (e.g., link quality in (LQI)).

Each router device (e.g., leader device 215 and router devices 225a, 225b, 225c, 225d, 225e, 225f) may send an advertisement message as a multicast message. The advertisement messages transmitted by a router device may be received by neighboring router devices that share a single-hop network link with the router device transmitting the advertisement messages. A single-hop network link may be capable of communicating messages from a router device via a unicast and/or multicast communication directly to another router device. For example, the router devices 225a, 225c may be neighboring devices that share a single-hop network link with the leader device 215, as the router devices 225a, 225c are capable of sending messages directly to and/or receiving messages directly from the leader device 215. The single-hop network link may be a network communication link on which router devices may be capable of directly receiving the advertisement messages above a given link quality (e.g., LQI greater than 0).

After a router device receives a periodic advertisement message from another router device, the router device may calculate the link quality (e.g., LQI) of the network communication link via which the advertisement message is received. The LQI may be calculated as a predefined number that is within a range indicating different link qualities for the network communication link between two devices. For example, the LQI may be indicated by values of 0, 1, 2, or 3. The different indicators of LQI may be assigned based on the RSSI of the received advertisement message and a link margin relative to a predefined receive level. The receive level may be a predefined minimum receive level. The receive level may be established as a predefined RSSI value for communications on the network. For example, the receive level may be defined by a noise floor that is set to an average RSSI value for noise generated on the network over a period of time. In an example using the receive level as a noise floor, a router device (e.g., leader device 215 or router device 225c) may calculate an LQI of 1 for communications received on a network link from a neighboring router device when the RSSI value of one or more advertisement messages (e.g., average RSSI for advertisement messages over a period of time) is at least a link margin of 2 dB above the noise floor. The router device (e.g., leader device 215 or router device 225c) may calculate a link quality of 2 for communications received on a network link with a neighboring router device when the RSSI value of one or more advertisement messages (e.g., average RSSI for advertisement messages over a period of time) is at least a link margin of 10 dB above the noise floor. The router device (e.g., leader device 215 or router device 225c) may calculate a link quality of 3 for communications received on a network link with a neighboring router device when the RSSI value of one or more advertisement messages (e.g., average RSSI value for advertisement messages over a period of time) is at least a link margin of 20 dB above the noise floor. A link quality value of zero may indicate that the link quality is unknown or infinite when the RSSI value of one or more advertisement messages (e.g., average RSSI value for advertisement messages over a period of time) is unable to be determined above the noise floor. Though examples are provided for predefined numbers indicating different levels of link quality, and/or different link margins that may be assigned to those levels, other indicators and/or values may be used to define link quality between two routing devices. Additionally, though individual routing devices may be provided as an example (e.g., leader device 215 or router device 225c), other routing devices may similarly calculate link quality for network communication links between neighboring routing devices.

The LQI of the network communication links measured locally at each control device (e.g., the leader device 215 and the router device 225c) may be exchanged with the other device on the network communication link. For example, the LQI may be measured locally at each control device and transmitted to the other device via an advertisement message. The LQI that is measured by another router device (e.g., on the other side of the network communication link) and received at a router device may be stored as the link quality out (LQO) for the network communication link. The LQI and/or the LQO may be stored in a local router table at each routing device. For example, the leader device 215 may store the LQI and/or the LQO for the network communication link with each router device in the network 200c in a router table 229. Similarly, the router device 225c may store the LQI and the LQO for communicating with each router device in the network 200c in a router table 261.

As described herein, the router tables 229, 261 may each identify network information for communicating with each router in the network 200c from the perspective of the devices at which the router tables 229, 261 are stored. The number of router devices in the network 200c and/or the router identifiers in use in the network 200c may be determined from a bitmap 227, as described herein. The bitmap 227 may be maintained by the leader device 215 and distributed to the other routing devices for locally maintaining their router tables. For example, the router devices 225a, 225c may receive the bitmap 227 and update their local router tables. The bitmap 227 may indicate the number of rows in the router tables (e.g., indicating the number of identified router devices in the network) and/or the router identifiers to include in the router tables. The router devices may maintain updated network information for the indicated router identifiers in the router tables. The updated network information in the router tables may include the LQI and/or LQO for the network communication link between the router devices identified in the bitmap 227. For example, the router 225c may receive the bitmap 227 from the leader device 215 and update the router table 261 to include router devices in the table 261 that are indicated in the bitmap 277, or remove router devices in the table 261 that are indicated in the bitmap 277 as failing to be used in the network.

The leader device 215 and router devices 225a, 225b, 225c, 225d, 225e, 225f may each use the LQI and LQO in their respective router tables to calculate a link cost for communicating on a network communication link with other router devices. The link quality for the network communication link between the two router devices may be the lesser of the value of the link quality for messages being transmitted out (e.g., LQO) and the value of the link quality for messages being received (e.g., LQI) on a single-hop network link between two devices. An LQO or an LQI of zero may indicate that the router device fails to have a direct network communication link with the router device listed in the router table.

A link cost for sending communications between devices on a network link may correspond directly to the link quality of communications on the network link. The link cost may indicate a relative cost or loss of communications on the network link. FIG. 2F is an example table 262 that illustrates example link costs that may correspond to different link qualities. As shown in FIG. 2F, a greater link quality may correspond to a lower link cost for communications on the network communication link between two neighboring devices.

The link cost for each network communication link may be used by a router device to calculate a path cost for communications between the router device and another device in the network 200c. The path cost may indicate the relative cost or loss of communications on an entire communication path that may include one or more router devices. The path cost for one communication path may be compared to another to determine a higher quality communication path for sending digital communications that may have a lower relative cost associated with transmission of messages.

The path cost may indicate the overall cost for communicating a message from a starting router device to an ending router device. For example, the path cost may be calculated as the total of the link costs for each hop between the starting router device from which a message may originate and the ending router device at which the message may be received in the network 200c. Each router device may calculate the path cost to a neighboring device on a single-hop network link as being equal to the link cost and store the path cost in the locally-stored router table. For example, the router device 225c may set the path cost for communications with the leader device 215 equal to the link cost (e.g., lower of LQI and LQO) on the network communication link and store the path cost in the router table 261. Similarly, the router device 225c may set the path cost for communications with the router device 225b equal to the link cost (e.g., lower of LQI and LQO) on a network link and store the path cost in the router table.

Each router device (e.g., leader device 215 and router devices 225a, 225b, 225c, 225d, 225e, 225f) may update the path cost for communicating messages to/from each router device in their respective router table based on the path cost information received from another router device. For example, as the router device 225*b* may be unable to directly communicate with the leader device 215, the router device 225*b* may receive path cost information for communicating messages through another router in the network 200*c*. The router 225*c* may transmit the path cost for communicating messages to/from the leader device 215 (e.g., path cost=2) in a multicast message that is received by other router devices. The multicast message may be an advertisement message, for example. The router device 225*b* may receive the path cost for communicating messages between the leader device 215 and the router device 225*c* (e.g., path cost=2). To calculate the total path cost for communicating messages between the router device 225*b* and the leader device 215 through the router device 225*c*, the router device 225*b* may add the link cost for communications between the router device 225*b* and the router device 225*c* (e.g., link cost=1) to the path cost received from the router device 225*c* (e.g., path cost=1) to get a total path cost (e.g., path cost=3). The link cost for communications between the router device 225*b* and the router device 225*c* may be determined from the link quality of the network communication link between the router device 225*b* and the router device 225*c*, which may be the smaller of the LQI and LQO of the network communication link (e.g., link quality=3).

Each router device may send/broadcast an advertisement message that includes the path cost to one or more other router devices in the network 200*c*. The router devices that receive the path cost information from the router device that sent the advertisement message may update their respective path cost information in their local router tables (e.g., by adding their link cost for communications with the router device that sent the advertisement message to the path cost in the received message). Each router device may use the locally-stored path cost information to identify the path through with messages may be communicated. For example, messages transmitted from the router device 225*b* to the leader device 215 may be communicated through the router device 225*a* or the router device 225*c*. The router device 225*b* may receive respective advertisement messages from the router device 225*a* and the router device 225*c* that indicate the path cost for communication of messages between the router device 225*a* and the leader device 215 is the same as the path cost for communication of messages between the router device 225*c* and the leader device 215 (e.g., path cost=2 on each network link). The router device 225*b* may add the link cost calculated for communicating messages between the router device 225*b* and the router device 225*c* (e.g., link cost=1) to the path cost information received in the advertisement message from the router 225*c* (e.g., path cost=2) to determine the total path cost for communicating with the leader device 215 through the router device 225*c* (e.g., total path cost=3). The router device 225*b* may similarly add the link cost calculated for communicating messages between the router 225*b* and the router 225*a* (e.g., link cost=2) to the path cost information received in the advertisement message from the router 225*a* (e.g., path cost=2) to determine the total path cost for communicating with the leader device 215 through the router device 225*a* (e.g., total path cost=4). The router device 225*b* may update a locally-stored router table with the lowest calculated path cost for communicating with the leader device 215 and/or the identifier of the router device through which messages are to be transmitted (e.g., router 225*c*). Each router device may similarly update their respective locally-stored router table with the lowest calculated path cost for communicating with the other router devices in the network 200*c*. For example, as shown in FIG. 2E, the leader device 215 and the router device 225*c* may each calculate the lowest path cost for communicating to other router devices in the network 200*c* and store the path cost in the respective router tables 229, 261. The router tables 229, 261 may also have stored therein the router identifier of the next hop from the respective devices 215, 225*c* through which messages are to be communicated to achieve the calculated path cost for communications to the destination router device.

Through periodically updating the link quality (e.g., LQI and/or LQO), link cost, and/or path cost, and communicating the path cost to other router devices in periodic advertisement messages, each router device may have up-to-date path cost information for communicating messages to other router devices in the network 200*c*. The router device may use the best communication path (e.g., lowest cost path) for communicating messages to another device. This routing mechanism may allow router devices to detect when other router devices have dropped off the network 200*c*, or a path cost between routers has changed, and calculate the next lowest cost path to maintain connectivity to other router devices in the network 200*c*.

In an effort to distinguish relatively older data being transmitted in the periodic advertisement messages from relatively newer data transmitted in the periodic advertisement messages, the advertisement messages may be communicated with a sequence number. The leader device, such as leader device 215, may be responsible for updating the sequence number and distributing the updated sequence number to the other router devices in the network (e.g., router devices 225*a*, 225*b*, 225*c*, 225*d*, 225*e*, 225*f* in network 200*c*). For example, the leader device 215 may increment the sequence number periodically (e.g., after transmission of one or more advertisement messages) and/or after a router device is added to the network. The sequence number may be updated to allow router devices in the network (e.g., leader device 215 and/or router devices 225*a*, 225*b*, 225*c*, 225*d*, 225*e*, 225*f* in network 200*c*) to identify updated network information transmitted in advertisement messages. For example, as router devices (e.g., leader device 215 and/or router devices 225*a*, 225*b*, 225*c*, 225*d*, 225*e*, 225*f* in network 200*c*) may be periodically communicating advertisement messages that include path cost information that indicates the path cost for communicating with other router devices in the network, the sequence number may be updated to identify the updated path cost information.

After the leader device 215 updates the sequence number, the leader device 215 may distribute the sequence number to other router devices in the network. For example, the leader device 215 may use the sequence number in its own advertisement messages. After receiving the updated sequence number, each router device may use the updated sequence number for subsequent advertisement messages transmitted from the router device on the network. Each sequence number transmitted from the leader device 215 to the other router devices may be used in the advertisement messages for the router devices until a subsequent sequence number is distributed by the leader device 215. For example, the router device 225*c* may receive the sequence number directly from the leader device 215 and use the sequence number in subsequent advertisement messages. The router device 225*b* may receive the sequence number in the advertisement messages transmitted from the router device 225*c* and use the sequence number in subsequent advertisement messages transmitted from the router device 225*b*. The routers may each use the current sequence number until an updated sequence number is received that is originated at and distributed from the leader device 215. Each router device may update the locally-stored network information in the router table when the router device receives an advertisement message from a non-leader router device (e.g., router devices 225a, 225b, 225c, 225d, 225e, 225f) that has an updated sequence number. If a router device receives an advertisement message that has the same sequence number as a previously received advertisement message, and/or previously received from the same non-leader router device, the router device may fail to process the advertisement message. If a router device fails to receive an updated sequence number within a predefined period of time (e.g., minutes, seconds, etc.), the router may assume the leader device 215 is unavailable for communications (e.g., offline, powered off, dropped from the network, changed roles, or is otherwise unable to communicate with the router device) and attempt to form another network or network partition having another leader device 215.

Figure 3:
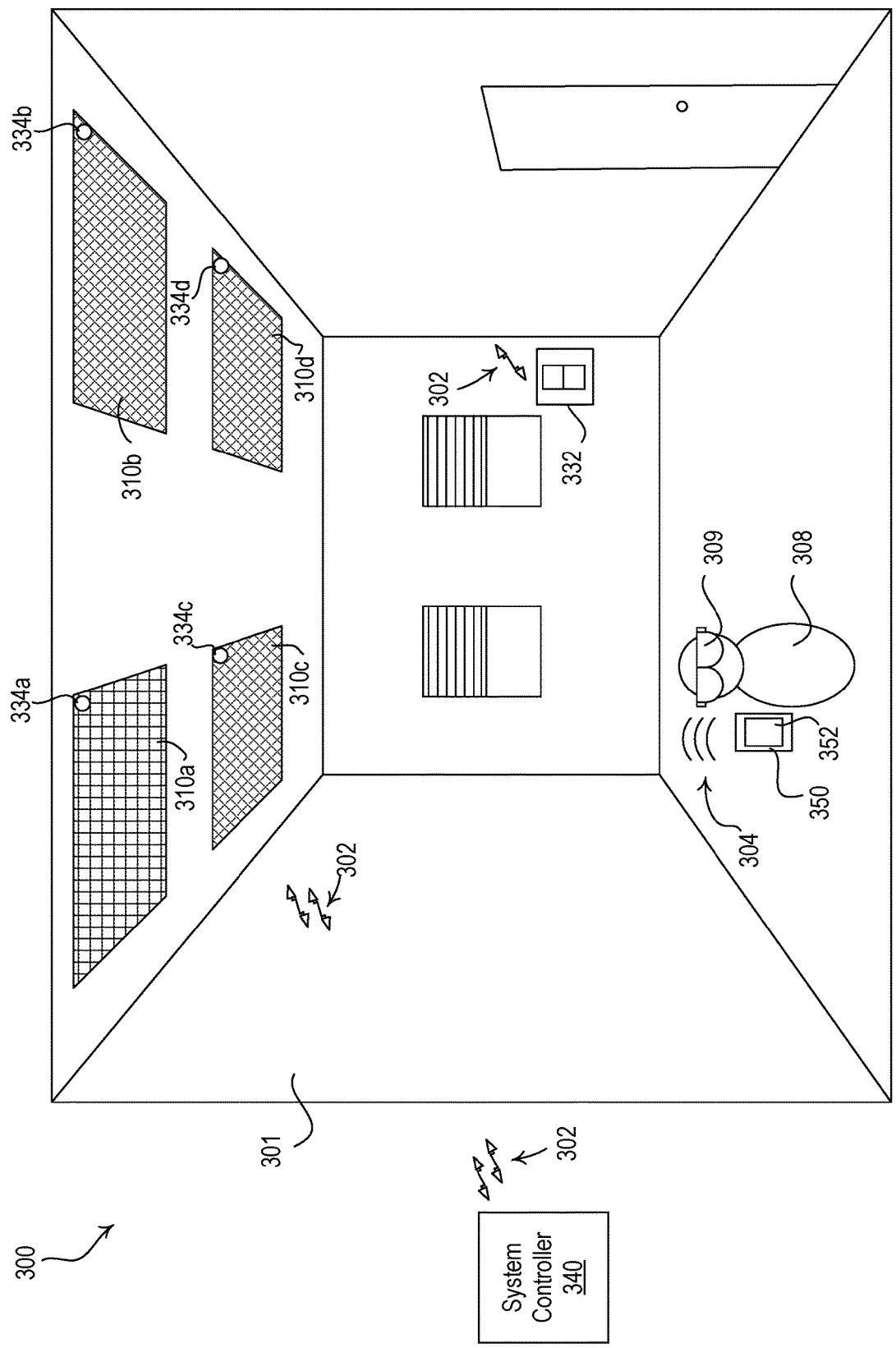
FIG. 3 illustrates a representative load control environment in which the load control system shown in FIG. 1 may be implemented for configuring and/or controlling one or more control devices communicating on a network.

FIG. 3 illustrates a representative load control environment 301 in which a load control system 300 (e.g., similar to the load control system 100 shown in FIG. 1) may be implemented for configuring and/or controlling one or more load control devices. The load control system 300 may include a plurality of lighting fixtures 310a-310d. Each of the lighting fixtures 310a-310d may comprise one or more lighting loads and a lighting control device for controlling the intensity and/or color of the lighting loads of the respective lighting fixture.

The lighting fixtures 310a-310d may each comprise a controllable light source, such as the controllable light source 120 shown in FIG. 1. As described herein, the controllable light sources of the lighting fixtures 310a-310d may each comprise a plurality of different colored LEDs to enable the controllable light source to emit light at different colors (e.g., color temperature or full-color values). Each controllable light source may be configured such that the chromaticity output of the LEDs is mixed to produce light having varying wavelength combinations and chromaticity coordinates (e.g., color points) within a color gamut formed by the various LEDs that make up the lighting load. For example, the lighting loads of the controllable light sources may each include one or more red LEDs, one or more green LEDs, one or more blue LEDs, and one or more white LEDs (which may be collectively referred to herein as an RGBW lighting load). Although the RGBW LED light source is described herein with a combination of four LEDs of certain colors, other combinations of LEDs (e.g., more or less LEDs and/or different color LEDs) may be used.

The lighting control devices of the lighting fixtures 310ad-310d may operate the respective lighting loads according to operational settings in response to the received messages from input devices. The input devices of the load control system 300 may comprise a remote control device 332 and/or sensors 334a-334d (e.g., occupancy sensors, daylight sensors, visible light sensors, and/or other sensing devices) mounted to the respective lighting fixtures 310a-310d. A single sensor may also, or alternatively, communicate with the lighting control device in respective lighting fixtures 310a-310d. The load control system 300 may also comprise a system controller 340 and/or a user device, such as a mobile device 350, which may also operate as input devices. For example, the mobile device 350 may comprise a smart phone and/or a tablet.

The lighting control device of each of the lighting fixtures 310a-310d may operate in different modes. For example, the lighting control devices of the lighting fixtures 310a-310d may operate in an operation mode to receive the messages from the input devices and control the intensity and/or color of the emitted light of the corresponding electrical load in accordance with the operational settings defined thereon (or defined at another device from which the control instructions are received). When controlling the color of the emitted light of the lighting loads of each of the lighting fixtures 310a-310d, the load control devices may adjust the lighting intensity level (i.e., brightness) of each of the LEDs to emit light at the color indicated in the operational settings in response to the received messages from the input devices.

As shown in FIG. 3, the lighting control device of the lighting fixtures 310a-310d may provide feedback to an occupant 308 (e.g., an installer or other user of the system) of the load control environment 301. The feedback may be provided by the lighting control devices entering a feedback mode and controlling the respective lighting loads to blink on and off or illuminate a color and/or an intensity. The feedback may be provided by a lighting control device to indicate diagnostic or configuration information that may be stored in memory of the lighting control devices of the lighting fixtures 310a-310d, the system controller 340, and/or other locations in the load control system 300. The feedback may be provided to indicate the diagnostic or configuration information that may assist a user in configuring, troubleshooting, and diagnosing problems in the network on which the lighting fixtures 310a-310d or other control devices in the load control system 300 may be operating. For example, the diagnostic or configuration information may include network information on which the lighting control devices of the lighting fixtures 310a-310d may be operating on the network. The network information may include, for example, network data, system configurations, and/or device status data. For example, a command may be used to identify a set of devices in an area grouping, and/or to show any devices that have logged a given fault condition.

The lighting control devices in each of the lighting fixtures 310a-310d may enter a feedback mode in response to a triggering event. The triggering event may be receipt of a message or actuation of a button on the lighting control device. The triggering event may comprise one or more predefined criteria for triggering the feedback mode that may be sent in a feedback message to the lighting control devices in each of the lighting fixtures 310a-310d. The predefined criteria may include a group identifier, such as a device type identifier, an area identifier, a zone identifier, a load control system identifier, a manufacturer identifier, or another identifier for identifying a group of control devices, as described herein. The predefined criteria may include a threshold at which one or more messages are to be received. For example, the predefined criteria may include a threshold (e.g., RSSI) at which the feedback message is received at the load control device. The predefined criteria may include a threshold (e.g., RSSI) at which one or more other messages are received from an input device, the mobile device 350, the system controller 340, and/or another device in the load control system.

The feedback messages that include triggering event for the feedback mode may be received directly from the mobile device 350 and/or via another device (e.g., the remote control device 332, the system controller 340, or another device). The feedback message may be transmitted via a first wireless communication protocol (e.g., RF communication signals 302) or a second wireless communication protocol (e.g., via RF communication signals 304). The RF communication signals 304 may be communicated via a short-range wireless communication protocol, such as BLUETOOTH or BLE, while the RF communication signals 302 may be communicated via another wireless communication protocol. The triggering event may be sent in a message in response to an actuation by the occupant 308 on the mobile device 350 (e.g., actuation of a soft button on a display 352 of the mobile device to trigger a type of feedback).

As described herein, the system controller 340 may instruct the lighting control devices of the lighting fixtures 310a-310d to enter the feedback mode. The system controller 340 may instruct the lighting control devices of the lighting fixtures 310a-310d to enter a feedback mode in response to the triggering events described herein (e.g., a button press at the system controller or receipt of a message from another device). The system controller 340 may instruct lighting control devices of the lighting fixtures 310a-310d to enter a feedback mode in response to a feedback message from the mobile device 350, an occupancy sensor, or another control device. The system controller 340 and/or the mobile device 350 may send a message to the lighting control devices of the lighting fixtures 310a-310d that are within a communication range that tells the lighting control devices to enter the feedback mode. The system controller 340 and/or the mobile device 350 may direct the feedback message to specific lighting control devices to tell specific lighting control devices to enter the feedback mode. The feedback message may be transmitted as a unicast message that includes the unique identifier of one or more lighting control devices to which the feedback message is directed, or a multicast message that includes a group identifier identifying a group of lighting control devices to which the feedback message is directed (e.g., devices in an area, such as a room, a floor, or other area).

The occupant 308 may actuate a button on the mobile device 350 to cause the mobile device 350 to enter a feedback mode and/or to transmit (e.g., periodically transmit) a beacon message (e.g., a mobile device beacon message) that triggers the feedback mode at one or more lighting control devices at the lighting fixtures 310a-310d. The mobile device 350 may transmit the mobile device beacon messages via the second wireless communication medium (e.g., the RF communication signals 304 via a short-range wireless communication link). The mobile device beacon message may include, for example, a beacon identifier. For example, the beacon identifier may be a unique identifier that identifies the mobile device 350 (e.g., or an application executed on the mobile device 350) and/or a non-unique identifier, such as an identifier of a group, area, building, load control system, and/or manufacturer of the mobile device. The mobile device beacon message may also include a received signal strength discovery threshold. The load control devices may receive the mobile device beacon message and may compare a signal strength (e.g., RSSI) at which the mobile device beacon message is received to the received signal strength discovery threshold. Each of the control devices may enter the feedback mode when it receives the particular beacon identifier of the mobile device and/or the signal strength of the received mobile device beacon message is greater than or equal to the received signal strength discovery threshold (e.g., the control device is within a discovery range of the mobile device 350). The particular beacon identifier may be predetermined and/or stored in memory of the control devices. The mobile device 350 may adjust the received signal strength discovery threshold that is included in the mobile device beacon message to adjust the range of the devices that enter the feedback mode.

As the occupant 308 moves around the load control environment 301 with the mobile device 350, the lighting control devices of the lighting fixtures 310a-310d that are within the discovery range of the mobile device 350 may provide feedback. When the lighting control devices of the lighting fixtures 310a-310d begin to receive the mobile device beacon messages as the occupant 308 moves around, those lighting control devices may enter the feedback mode and begin providing feedback to the occupant 308 and/or the mobile device 350. For example, the lighting control devices of the lighting fixtures 310a-310d may begin providing visual feedback to the occupant 308 (e.g., turn a color, change an intensity level, and/or provide another type of feedback). In addition, when the lighting control devices of the lighting fixtures 310a-310d fall outside of the discovery range of the mobile device 350 and/or fall outside of the wireless range of the mobile device 350 (e.g., stop receiving the mobile device beacon message) as the user moves around, those lighting control devices may exit the feedback mode after a timeout period (e.g., one minute). As a result, those lighting control devices may stop providing visual feedback (e.g., turn off).

Occupancy sensing techniques may be implemented to select control devices for entering a feedback mode. The sensors 334a-334d (e.g., occupancy sensors) in the respective lighting fixtures 310a-310d may be used to select lighting fixtures 310a-310d for providing feedback. The lighting control devices of the lighting fixtures 310a-310d may operate in a configuration or commissioning mode and may receive wired or wireless signals from their respective sensors 334a-334d to trigger feedback to be provided in a feedback mode. When an occupancy condition is detected by the sensor 334a, a signal may be sent from the sensor 334a to the lighting control device of the lighting fixture 310a. The signal that indicates the occupancy condition may be used as a feedback message during the commissioning or configuration mode to cause the lighting fixtures 310a-310d to enter a feedback mode and provide feedback in response to the occupancy condition. For example, the lighting fixture 310a may provide feedback in response to the occupancy condition indicated by the sensor 334a.

The occupancy sensors 334a-334d may identify different levels of activity. For example, the occupancy sensors 334a-334d may identify major motion events (e.g., above a predefined high-end level of motion) and minor motion events (e.g., below a predefined low-end level of motion) within the visible area of the occupancy sensor. The occupancy sensor 334a-334d may sense an occupancy condition upon identifying the defined occupancy state or the defined level of activity. The occupant 308 may walk under lighting fixture 310a and perform a major motion event (e.g., faster hand waving or other movement above a predefined threshold) to trigger an occupancy condition that may be identified by the occupancy sensor 334a. The occupant 308 may walk under a group of lighting fixtures 310a-310d to be detected by the corresponding occupancy sensors 334a-334d and the lighting fixtures that identify the user based on occupancy of the user in the walking path may be selected for entering the feedback mode. The lighting fixtures 310a-310d may provide feedback in response to the corresponding occupancy sensors 334a-334d identifying the threshold level of activity from the occupant 308. The lighting control devices that have been selected in the corresponding lighting fixtures 310a-310d may provide feedback as described herein (e.g., feedback indicating network roles of devices, quality of communications, noise floor, etc.).

The lighting control devices of the lighting fixtures 310a-310d may receive a feedback message from other control devices in the load control system 300. For example, the lighting control device of the lighting fixture 310a may receive a feedback message from the lighting control device of the lighting fixture 310d. The feedback message may indicate a type of feedback to be provided. For example, the lighting control device of the lighting fixture 310d may be a child device of the lighting control device of the lighting fixture 310a in the network and may send a feedback message to the lighting fixture 310a configured to cause the lighting control device of the lighting fixture 310a to indicate its role as the parent device of the lighting control device of the lighting fixture 310d. The lighting control device of the lighting fixture 310d may send the feedback message in response to a beacon from the mobile device 350, an occupancy condition, or another triggering event as described herein.

After entering the feedback mode, the lighting control devices of the lighting fixtures 310a-310d may provide feedback to the occupant 308 and/or the mobile device 350. For example, after entering the feedback mode (e.g., in response to receiving the mobile device beacon message or of occupancy conditions), the lighting control devices of the lighting fixtures 310a-310d may provide visual feedback to the occupant 308 and/or the mobile device 350. The visual feedback may correspond to a type of feedback requested in the messages from the mobile device 350, or the feedback type may be preprogrammed in the lighting fixtures 310a-310d. The visual feedback may be provided by changing a state of the lighting load in the respective lighting fixtures 310a-310d. For example, the lighting fixture 310a may provide visual feedback by turning a color to indicate the diagnostic or configuration information stored at the lighting fixture 310a to the occupant 308 and/or mobile device 350. In addition, or alternatively, the visual feedback may be provided by flashing the lighting load on and off, increasing and/or decreasing the intensity level of the lighting load, increasing and/or decreasing the color temperature of the lighting load, and/or providing other visual feedback to the occupant 308. The feedback type may be indicated in the mobile device beacon message transmitted by the mobile device 350, in another message transmitted to the lighting control device of the lighting fixture 310a, and/or may be preprogrammed and stored at the lighting control device of the lighting fixture 310a.

As shown in FIG. 3, the lighting fixture 310a may be illuminated to a different color to provide a different type of feedback than the other lighting fixtures 310b-310d. The different types of feedback may indicate different network information for configuring, troubleshooting, and diagnosing problems in the network on which the lighting fixtures 310a-310d may be communicating. The visual feedback may also, or alternatively, be provided by flashing the lighting load on and off, increasing and/or decreasing the intensity level of the lighting load, increasing and/or decreasing the color temperature of the lighting load, and/or providing other visual feedback to the occupant 308. The feedback type may be indicated in messages from the mobile device 350, and/or may be preprogrammed and stored at the lighting fixtures 310a-310d.

The occupant 308 may select the lighting control devices of the lighting fixtures 310a-310d for providing different types of feedback. For example, the feedback provided by the lighting fixtures 310a-310d may indicate different diagnostic or configuration information associated with the lighting fixtures 310a-310d. The feedback messages sent to the lighting fixtures 310a-310d may indicate the feedback to be provided, or the feedback may be preprogrammed based on the receipt of a message or detection of occupancy conditions.

The feedback may be provided using a color value of a total light output of the emitted light produced by the lighting load. For example, the lighting control device of the lighting fixture 310a may cause the lighting load to provide feedback via a color of the total light output emitted by the lighting fixture 310a. For example, the total light output of the lighting fixture 310a may be controlled to an RGB value, a color temperature value, or given chromaticity coordinates.

In another example, the feedback may be provided in one or more predefined bands of wavelength. As the occupant 308 may run diagnostics or perform configuration of the lighting control devices of the lighting fixtures 310a-310d while the space is occupied and/or being used by other occupants, controlling the total light output of the lighting fixtures 310a-310d to different colors (e.g., RGB colors) may be unacceptable or distracting to the other occupants in the load control environment 301. As such, the lighting control device of the lighting fixture 310a that is in the feedback mode may control the lighting load to emit light in one or more predefined bands of wavelengths to provide the feedback in a manner that is less distracting to the occupants.

The spectral tuning capability of the lighting control devices and the lighting loads in in the lighting fixtures 310a-310d may allow for the creation of metamers such that the combination of wavelengths in two different light spectra are visually the same to the occupants of the load control environment 301. A lighting load that includes multiple LEDs or other light sources of different colors (e.g., three or more LEDs) can emit light of the same color (e.g., color temperature value or full-color value) using a mixture of different wavelength combinations. As such, the lighting control device of the lighting fixture 310a may be triggered to enter a feedback mode that is configured to signal the feedback on predefined bands of wavelengths of the emitted light to create dissimilarities in the spectra of light emitted by the corresponding lighting load from the spectra of light emitted by the lighting loads of the lighting fixtures 310b-310d that are operating according to other operational parameters to emit light. The dissimilarities in the spectra of light emitted by the lighting load of the lighting fixture 310a and the spectra of light emitted by the lighting loads of each of the lighting fixtures 310b-310d may be unable to be perceived by the occupant 308, as the lighting loads may be producing the same color (e.g., color temperature or full-color value) using different combinations of wavelengths.

If the occupant 308 is diagnosing or configuring the devices in the load control system, the occupant may identify the feedback being signaled on predefined bands of wavelength using one or more optical filters to detect the difference in the light at the predefined bands of wavelength. For example, the occupant 308 that is diagnosing or configuring the devices in the load control system may use a notch filter or band-pass filter to filter the emitted light from the lighting load of the lighting fixture 310a that is in the feedback mode. The notch filter or band-pass filter may be embedded in a lens through which the occupant 308 may view the emitted light. For example, the notch filter or band-pass filter may be embedded in the lenses of a pair of glasses 309 or a lens over a camera on the mobile device 350 through which the occupant 308 may view the emitted light from the lighting load of the lighting fixture 310a. The optical filter through which the occupant 308 is viewing the emitted light from the lighting load of the lighting fixture 310a may be configured such that the filter is aligned with the predefined bands of wavelength through which the feedback is being signaled. The lighting loads of the other lighting fixtures 310b-310d may be providing light at a same color (e.g., color temperature or full-color value) using a different wavelength combination that is relatively unaffected by the optical filter. As such, the occupant 308 may identify a visible difference in the lighting load of the lighting fixture 310a when the optical filter is applied to the emitted light, and/or identify a visible difference in the emitted light from the lighting load of the lighting fixture 310a and the emitted light from the lighting loads of the lighting fixtures 310b-310d when the optical filter is applied to each.

The occupant 308 may identify the visual feedback being provided. The occupant 308 may configure and/or reconfigure the load control system 100 using the mobile device in response to the feedback being provided. For example, the occupant 308 may update the operational settings that are used by one or more of the lighting control devices of the lighting fixtures 310a-310d and transmit the operational settings to the load control devices and/or the system controller 340 for being stored thereon for enabling load control in response to the operational settings. The operational setting may include the network information used by the lighting control devices for communicating on the network.

One or more of the lighting fixtures 310a-310d may enter the feedback mode for providing feedback at a given time. The feedback may identify network information for configuring, troubleshooting, and/or diagnosing problems in the network on which the lighting fixtures 310a-310d or other control devices in the load control system 300 may be communicating. The network information that may be provided as feedback by the lighting fixtures 310a-310d may include the different network roles that the lighting control devices of the lighting fixtures 310a-310d are assigned in the network. The lighting control devices of the lighting fixtures 310a-310d may be capable of providing feedback that identifies other network information. For example, lighting control devices of the lighting fixtures 310a-310d may be capable of providing feedback that indicates the quality of communications on the network. The quality may be indicated by a link quality on a given communication link or the path cost for a given communication path. The lighting control devices of the lighting fixtures 310a-310d may provide feedback that indicates the noise floor that is measured at the respective control device.

The feedback may be provided by one or more lighting control devices of the lighting fixtures 310a-310d in the load control system 300. For example, the feedback may be provided by each of the lighting control devices of the lighting fixtures 310a-310d. The feedback may be provided by each of the lighting fixtures 310a-310d to identify different network information at the lighting control devices. The feedback may be provided in response to a request in the feedback message transmitted to one or more devices. For example, the predefined criteria may include a request for certain devices to provide feedback (e.g., devices having certain network information stored thereon, such as roles, link quality, etc.), so that the occupant can identify the devices. The feedback may be provided as a heat map of feedback in the load control system 300 that indicates the network information in the space in which the load control system is installed, for example. A heat map may be a scale from a first color to a second color. For example, the heat map may be a scale from green to red that includes different colors across the scale (e.g., red to indicate the lowest level of network communication, orange to indicate the next best level of network communication, yellow to indicate the next best level of network communication, and green to indicate the best level of network communication). In an example for indicating noise floor, the lighting control devices of the lighting fixtures 310a-310d may illuminate a corresponding lighting load red where there may be a relatively high level of noise to indicate that there may be communication errors, and provide a scale to a color of green in relatively noise-free environments. A similar type of scale maybe used for indicating other types of network information, such as link quality for example. A subset of the lighting control devices of the lighting fixtures 310a-310d may provide feedback that identifies a communication path between devices capable of communicating with one another in the load control system 300.

Based on the feedback provided to the occupant 308 by one or more of the lighting fixtures 310a-310d, the occupant 308 may select one or more of the lighting fixtures 310a-310d (e.g., at the mobile device 350) for modifying the operational settings associated with the selected lighting fixtures 310a-310d. The lighting control devices of the lighting fixtures 310a-310d may be displayed to the occupant 308 on the user interface 352 of the mobile device 350. The lighting control devices 310a-310d that have been selected for configuration and/or control may provide a visual feedback to the occupant 308. For example, the lighting control devices 310a-310d that have been selected for configuration and/or control may turn on or off, blink, adjust to a predefined intensity, and/or turn a predefined color.

The feedback that is provided may be based on current operational settings or long-term operational settings. For example, the lighting control devices in the lighting fixtures 310a-310d may provide live feedback of the network information, which may update as the network information updates in real time. This may allow the occupant 308 to view real-time changes in the network on which the lighting control devices are operating, including changes in response to changes in the operational settings by the occupant 308. The long-term network information may include average values over a defined period of time, such that the occupant 308 may identify long-term information on the network that may not be readily visible to the occupant 308 using real-time information.

Figure 4:
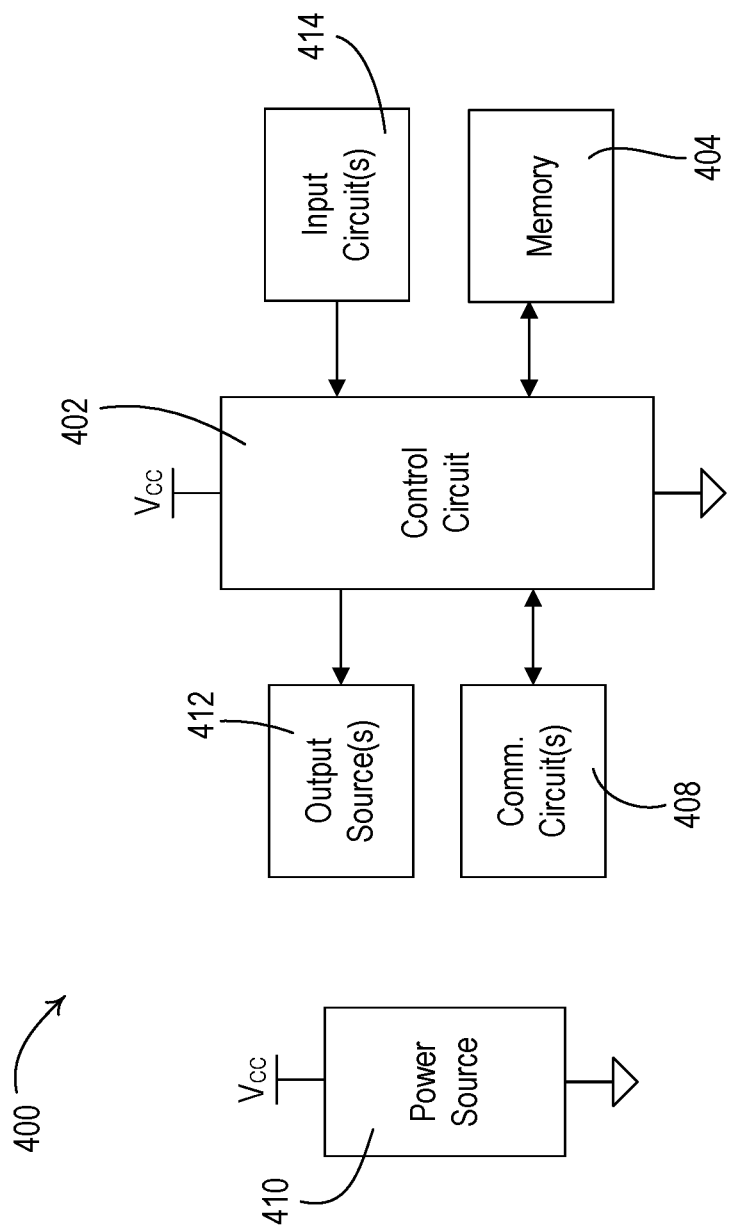
FIG. 4 is a block diagram illustrating an example of a device capable of processing and/or communication in a load control system, such as the load control system of FIG. 1.

FIG. 4 is a block diagram illustrating an example of a device 400 capable of processing and/or communication in a load control system, such as the load control system 100 of FIG. 1 or the load control system 300 of FIG. 3. In an example, the device 400 may be a control device capable of transmitting or receiving messages. The control device may be in an input device, such as a sensor device (e.g., an occupancy sensor or another sensor device), a remote control device, or another input device capable of transmitting messages to load control devices or other devices in the load control system. The device 400 may be a computing device, such as a mobile device, a system controller, or another device in the load control system.

The device 400 may include a control circuit 402 for controlling the functionality of the device 400. The control circuit 402 may include one or more general purpose processors, special purpose processors, conventional processors, digital signal processors (DSPs), microprocessors, integrated circuits, a programmable logic device (PLD), application specific integrated circuits (ASICs), or the like. The control circuit 402 may perform signal coding, data processing, image processing, power control, input/output processing, or any other functionality that enables the device 400 to perform as one of the devices of the load control system (e.g., load control system 100 and/or the load control system 300) described herein.

The control circuit 402 may be communicatively coupled to a memory 404 to store information in and/or retrieve information from the memory 404. The memory 404 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 404 may be implemented as an external integrated circuit (IC) or as an internal circuit of the control circuit 402.

The device 400 may include one or more communication circuits 408 that are in communication with the control circuit 402 for sending and/or receiving information as described herein. The communication circuit 408 may perform wireless and/or wired communications. The communication circuit 408 may be a wired communication circuit capable of communicating on a wired communication link. The wired communication link may include an Ethernet communication link, an RS-485 serial communication link, a 0-10 volt analog link, a Digital Addressable Lighting Interface (DALI) digital communication link, and/or another wired communication link. The communication circuit 408 may be configured to communicate via power lines (e.g., the power lines from which the device 400 receives power) using a power line carrier (PLC) communication technique. The communication circuit 408 may be a wireless communication circuit including one or more RF transmitters, receivers, transceivers, or other communication modules capable of performing wireless communications.

Though a single communication circuit 408 may be illustrated, multiple communication circuits may be implemented in the device 400. The device 400 may include a communication circuit configured to communicate via one or more wired and/or wireless communication protocols and at least one other communication circuit configured to communicate via one or more other wired and/or wireless communication protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols). One of the communication circuits may comprise a beacon transmitting and/or receiving circuit capable of transmitting and/or receiving beacon messages via a short-range RF signal.

The control circuit 402 may be in communication with one or more input circuits 414 from which input may be received. The input circuits 414 may be included in a user interface for receiving input from the user. For example, the input circuits 414 may include an actuator (e.g., one or more physical buttons) that may be actuated by a user to communicate user input or selections to the control circuit 402. The actuator may be actuated to put the control circuit 402 in an association mode and/or communicate association messages from the device 400 or signal other information to the control circuit 402. The actuator may be actuated to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 402 of the device 400 may enter the association mode, transmit an association message, transmit control instructions, or perform other functionality in response to an actuation or input from the user on the touch sensitive surface.

The input circuits 414 may include a sensing circuit (e.g., a sensor). The sensor circuit may be an occupant sensing circuit, a color temperature sensing circuit, a visible light sensing circuit (e.g., a camera), a daylight sensing circuit or ambient light sensing circuit, or another sensing circuit for receiving input (e.g., sensing an environmental characteristic in the environment of the device 400). The control circuit 402 may receive information from the one or more input circuits 414 and process the information for performing functions as described herein.

The control circuit 402 may be in communication with one or more output sources 412. The output sources 412 may include one or more indicators (e.g., visible indicators, such as LEDs) for providing indications (e.g., feedback) to a user. The output sources 412 may include a display (e.g., a visible display) for providing information (e.g., feedback) to a user. The control circuit 402 and/or the display may generate a graphical user interface (GUI) generated via software for being displayed on the device 400 (e.g., on the display of the device 400).

The user interface of the device 400 may combine features of the input circuits 414 and the output sources 412. For example, the user interface may have buttons that are actuated by the actuators of the input circuits 414 and may be illuminated by the visible indicators or LEDs of the output sources 412. In another example, the display and the control circuit 402 may be in two-way communication, as the display may display information to the user and include a touch screen capable of receiving information from a user. The information received via the touch screen may be capable of providing the indicated information received from the touchscreen as information to the control circuit 402 for performing functions or control.

Each of the hardware circuits within the device 400 may be powered by a power source 410. The power source 410 may include an AC power supply or DC power supply, for example. The power source 410 may generate a supply voltage Vcc for powering the hardware modules within the device 400.

Figure 5:
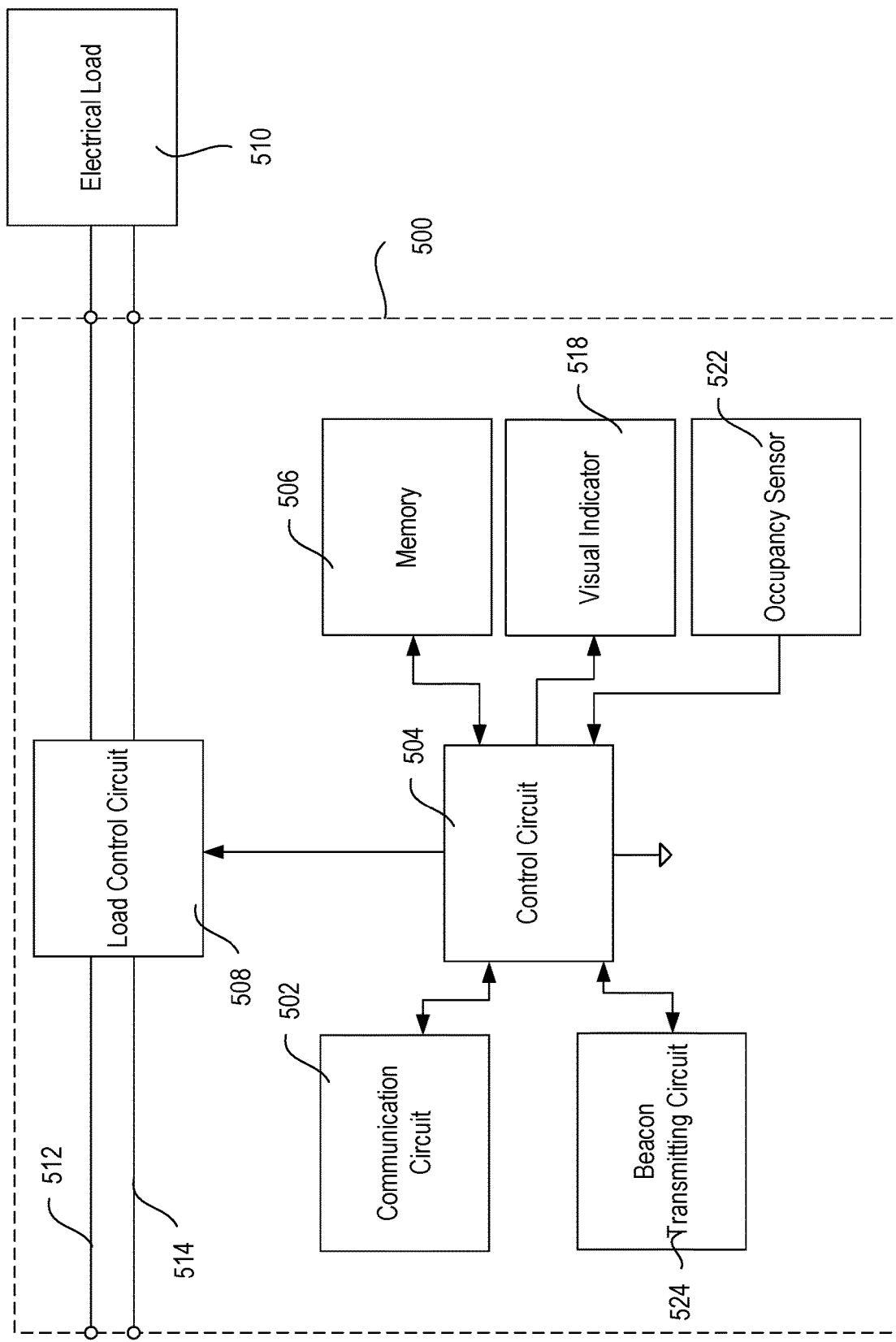
FIG. 5 is a block diagram illustrating an example of a load control device capable of operating in a load control system, such as the load control system of FIG. 1.

FIG. 5 is a block diagram illustrating an example load control device 500. The load control device 500 may be a lighting control device, for example. The load control device 500 may be a dimmer switch, an electronic switch, an electronic ballast for lamps, an LED driver for LED light sources, or other load control device. The load control device 500 may include a communication circuit 502. The communication circuit 502 may include an RF receiver, an RF transceiver, or other communication module capable of performing wired and/or wireless communications.

The communication circuit 502 may be in communication with a control circuit 504. The control circuit 504 may include one or more general purpose processors, special purpose processors, conventional processors, digital signal processors (DSPs), microprocessors, integrated circuits, a programmable logic device (PLD), application specific integrated circuits (ASICs), or the like. The control circuit 504 may perform signal coding, data processing, power control, input/output processing, or any other functionality that enables the load control device 500 to perform as described herein.

The control circuit 504 may store information in and/or retrieve information from a memory 506. For example, the memory 1006 may maintain a device database of associated device identifiers and/or executable instructions for performing as described herein. The memory 506 may include a non-removable memory and/or a removable memory. The memory 506 may include operational setting from which control instructions may be generated for controlling a load control circuit 1008 during operation in an operation mode. The memory 506 may include settings from which control instructions may be generated for controlling the load control circuit to provide feedback via the electrical load 510 during a feedback mode. The load control circuit 508 may receive instructions from the control circuit 504 and may control the electrical load 510 based on the received instructions. The load control circuit 508 may receive power via the hot connection 512 and the neutral connection 514 and may provide an amount of power to the electrical load 510. The electrical load 510 may include a lighting load or any other type of electrical load. The control instructions may include instructions for controlling an intensity level of one or more of multiple LEDs (e.g., RGBW LEDs) that make up the lighting load.

The control circuit 1004 may receive information from the occupancy sensor 522. The information received from the occupancy sensor may include an indication of an occupancy condition or a vacancy condition. The occupancy sensor 522 may include an infrared (IR) sensor, visible light sensor, or other sensor capable of detecting movement. The occupancy sensor may send an indication to the control circuit 504 in response to detection of movement (e.g., a major motion event or a minor motion event).

The control circuit 504 may communicate with beacon transmitting circuit 524 (e.g., a short-range communication circuit) to transmit beacons. The beacon transmitting circuit 524 may communicate beacons via RF communication signals, for example. The beacon transmitting circuit 524 may be a one-way communication circuit or a two-way communication circuit capable of receiving information on the same network and/or protocol on which the beacons are transmitted. The information received at the beacon transmitting circuit 524 may be provided to the control circuit 504.

The control circuit 504 may illuminate a visual indicator 518 to provide feedback to a user. For example, the control circuit 504 may blink or strobe the visual indicator 518 to indicate an occupancy condition identified by the occupancy sensor 522, that a feedback mode has been entered, or provide other feedback from the load control device 500. The control circuit 504 may be operable to illuminate the visual indicator 518 different colors. The visual indicator 518 may be illuminated by, for example, one or more light-emitting diodes (LEDs). The load control device 500 may comprise more than one visual indicator.

The control circuit 504 of the load control device 500 may control the electrical load 510 in different modes. For example, the control circuit 504 may control the electrical load 510 according to operational settings in an operation mode. The control circuit may receive a triggering event to enter a feedback mode and subsequently provide feedback indicating diagnostic or configuration information, which may be stored in the memory 506 of the load control device.

Figure 6:
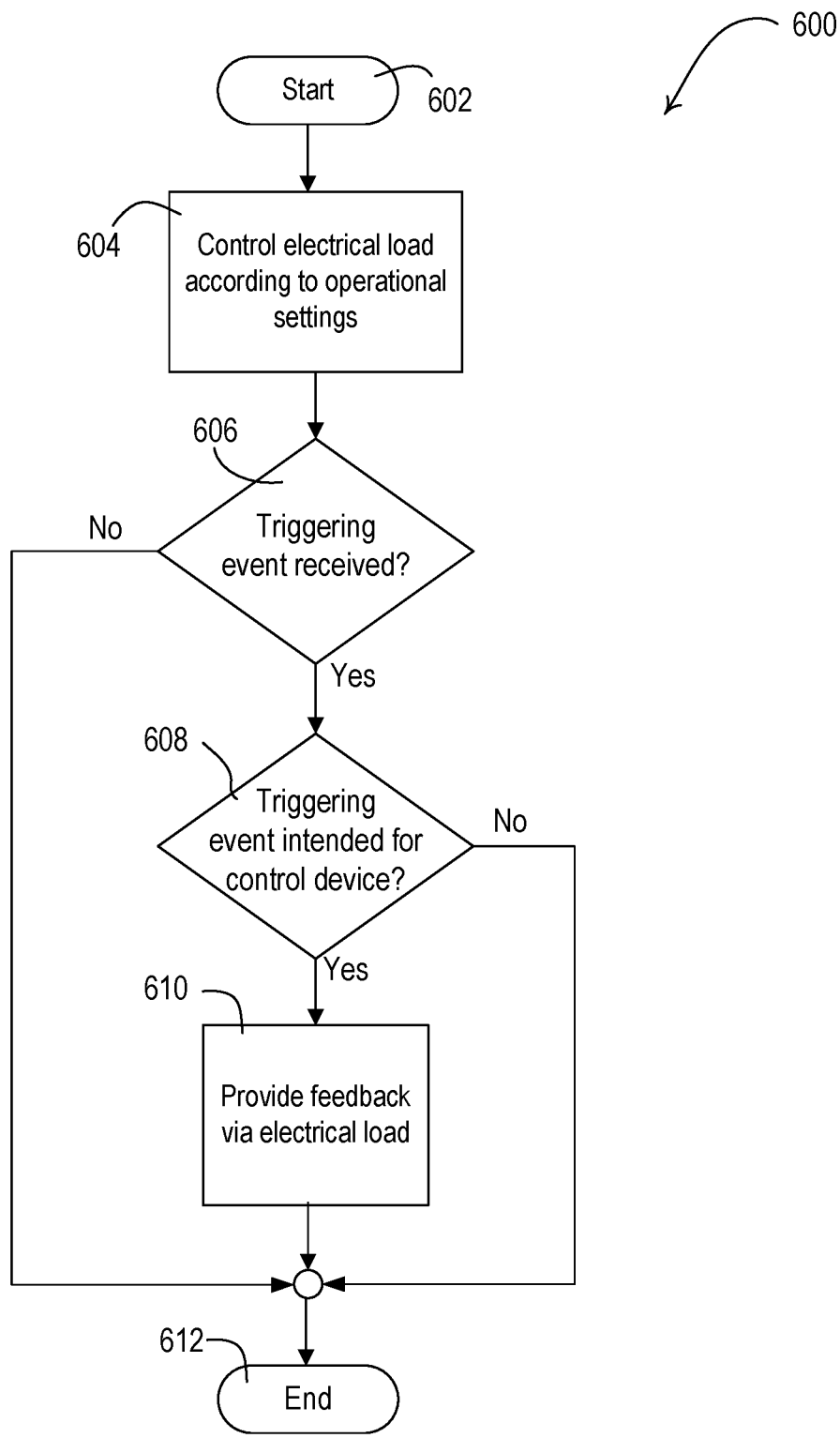
FIG. 6 is a flowchart depicting an example procedure for providing feedback indicating diagnostic or configuration information at a load control device.

FIG. 6 is a flowchart depicting an example procedure 600 for providing feedback indicating diagnostic or configuration information at a load control device. For example, the load control device may be a lighting control device that may control an amount of power provided to a lighting load of a lighting fixture.

The procedure 600 may begin at 602. At 604, the load control device may control the electrical load according to operational settings. For example, the load control device may be a lighting control device capable of receiving an input for controlling the lighting load according to the operational settings. The input may be received in a message from an input device (e.g., an actuation of a button on a remote control device or a sensor measurement event from a sensor device) or may be received locally (e.g., an actuation of a button on a dimmer). The message may include control instructions generated according to the operational settings, or the load control device may generate the control instructions in response to operational settings stored in memory locally. The control circuit of the load control device may receive the input (e.g., via the actuation or via a message received from another device), retrieve the operational settings for the received input that are stored in memory, and generate the control instructions for controlling a corresponding electrical load in response to the operational settings stored thereon. For example, the control device may be a lighting control device that may receive a message that includes an indication of an actuation of a button on a remote control device and, in response to the indication in the message, generate control instructions for controlling a color (e.g., color temperature or full-color value) and/or an intensity of a corresponding lighting load via its load control circuit. At 606, the control circuit of the load control device may determine whether it has received a triggering event to trigger a feedback mode for indicating diagnostic or configuration information. For example, the control circuit of the control device may receive a feedback message via a communication circuit receiving RF signals from another device and the feedback message may comprise the triggering event configured to trigger a feedback mode for identification of the diagnostic or configuration information. The feedback message may be transmitted from a user device (e.g., the mobile device 150, 350) or a system controller (e.g., the system controller 140, 340) for triggering the feedback mode to indicate the diagnostic or configuration information at one or more devices. The user device or the system controller may transmit the message to the lighting control device using a wired communication link or a wireless communication link using a wireless communication protocol. Though messages from the user device or the system controller are provided as examples for triggering the at the load control device, the load control device may provide feedback based on other predefined criteria of the triggering event (e.g., in response to occupancy conditions, the RSSI value of the feedback message, or other messages or signals) as described herein.

The feedback message may be transmitted as a broadcast message or a multicast message to trigger feedback or additional processing at multiple control devices. The feedback message may be transmitted as a unicast message to trigger feedback or additional processing at a single control device. For example, the feedback message may be transmitted as a unicast message directly from the user device or the system controller to cause a specific control device to provide diagnostic or configuration information. The unicast message may include a unique identifier of the control device and operate as a request for the control device to provide feedback.

The triggering event in the feedback message may include one or more predefined criteria that indicate the device or devices intended to provide feedback. The predefined criteria may include the unique identifier in the unicast message itself or the group identifier in the multicast message itself. The predefined criteria may include another group identifier, such as a device type identifier, network role (e.g., leader devices, router devices, end devices, router eligible end devices (REEDs), parent devices, child devices, and/or sleepy end devices), an area identifier, a zone identifier, or another identifier for identifying a group of control devices. The device type identifier may identify different types of control devices, such as lighting control devices, motorized window treatments, types of input devices (e.g., sensor devices, remote control devices, etc.), system controllers, or other types of control devices in the load control system.

The predefined criteria may include a signal strength threshold at which one or more messages are to be received. For example, the predefined criteria may include a threshold (e.g., RSSI) at which the feedback message is to be received at the communication circuit of the control device. The predefined criteria may include a threshold (e.g., RSSI) at which one or more messages are received from an input device, a user device, a system controller, and/or another device in the load control system. The predefined criteria may include a request for certain devices to provide feedback (e.g., devices having certain network information stored thereon, such as roles, link quality, etc.), so that the occupant can identify the devices having the requested information stored thereon.

If the control circuit determines that it has received a triggering event at 606, the control circuit of the control device may determine whether the triggering event in the feedback message is intended to trigger the feedback to be provided by the control device at 608. For example, the control circuit of the control device may identify the triggering event and/or one or more other predefined criteria for triggering a feedback mode at the load control device. The control circuit may compare the one or more predefined criteria defining the triggering event in the feedback message with information that is locally stored in memory to determine whether the control device is intended to provide the feedback.

If the control circuit determines that the load control device is intended to provide the feedback, the load control device may provide feedback via a corresponding electrical load, at 610, and the procedure 600 may end at 612. For example, a lighting control device may provide feedback via a corresponding lighting load. If the control circuit of the load control device determines that it is not intended to provide feedback based on the feedback message, the procedure 600 may end at 612. For example, the feedback message may include a unique identifier of another lighting control device indicating that triggering event is intended to trigger the feedback mode at another lighting control device. If the control circuit of the control device determines that it is not intended to provide feedback based on the feedback message, the control device may maintain its current operational settings in the operation mode. For example, a lighting control device may maintain the control of the power provided to the at least on LED according to the operation mode (e.g., maintain color, color temperature, and/or intensity). In another example, the lighting control device may reduce an intensity level of one or more LEDs (e.g., LEDs within a predefined band of wavelengths) to differentiate the emitted light from a corresponding lighting load from the lighting loads that are providing feedback.

If the control circuit of the control device determines that it is intended to provide the feedback, the control circuit may provide the feedback to indicate the diagnostic or configuration information via the electrical load. The diagnostic or configuration information may include network information associated with the lighting control device and the network. For example, the network information indicated in the feedback may include a network role (e.g., leader devices, router devices, end devices, router eligible end devices (REEDs), parent devices, child devices, and/or sleepy end devices) of the control device. The network information indicated in the feedback may include a link quality or a link cost of one or more network communication links to another device in the network. For example, the link quality may be the link quality to a parent device of the control device in the network. The network information indicated in the feedback may include a noise floor value indicating a noise floor at the location of the control device. The network information indicated in the feedback may include an indication of whether the lighting control device is a parent device or a child device in a network. The network information indicated in the feedback may indicate that the control device is in a communication path in a mesh network between two devices in the network.

The control circuit of the lighting control device may provide the feedback by controlling the amount of power provided to the at least one LED via the load control circuit to indicate the diagnostic or configuration information associated with the lighting control device. For example, the control circuit may provide the feedback by controlling the at least one LED to a predefined color (e.g., color temperature or full-color value) or intensity level to indicate the diagnostic or configuration information associated with the lighting control device. The predefined color (e.g., color temperature or full-color value) may be indicated using a total light output of the lighting load. For example, if the lighting load comprises one or more LEDs (e.g., RGBW LED light sources), the predefined color (e.g., color temperature or full-color value) may be provided by a total light output of the plurality of LEDs.

The lighting control device may provide the feedback by controlling a subset of the plurality of LEDs (e.g., RGBW LED light sources) that make up the lighting load to provide the feedback. For example, the control circuit of the lighting control device may control the lighting load to emit light in one or more bands of wavelength to provide the feedback. The control circuit of the lighting control device may cause the load control circuit to increase an intensity level of the at least one LED above a predefined threshold to indicate the feedback within the one or more bands of wavelength. When the lighting control device is not in the feedback mode and/or is in an operation mode controlling a corresponding lighting load according to one or more operational settings, the control circuit of the lighting control device may cause the load control circuit to decrease the intensity of the at least one LED that is being used to provide feedback in the feedback mode at other lighting control devices, so as to not be confused as being in the feedback mode.

One or more of the multiple LEDs that make up the lighting load may be dedicated for providing the feedback within the predefined bands of wavelength. The one or more LEDs may be limited to being operational when the feedback mode is triggered. As such, the one or more LEDs may be feedback LEDs that are not used during the operation mode of the lighting control device. In another example, the LEDs that are used for providing the feedback within the predefined bands of wavelength may also be used during the operation mode of the lighting control device. For example, the control circuit of the lighting control device may increase the intensity level a white LED (e.g., white LED or substantially white LED) above the threshold intensity level to indicate the feedback. As described herein, the white LED may be controlled by the control circuit of the lighting control device in response to a value of a vibrancy parameter used to control a saturation level for the total light output of the lighting control device. The control circuit of the lighting control device may decrease the intensity level of the white LED in response to an increase in the vibrancy value used to indicate the saturation level for the total light output of the multiple LEDs of the lighting control device. The control circuit of the lighting control device may increase the intensity level of the white LED in response to a decrease in the vibrancy value used to indicate the saturation level for the total light output of the multiple LEDs of the lighting control device.

As one or more LEDs may be controlled to indicate the feedback within one or more predefined bands of wavelength, the other LEDs may be used to control the color of the combined light emitted by the lighting load. For example, in an RGBW LED light source, the white LED may be controlled to an intensity level above a predefined threshold to indicate the feedback within the predefined band of wavelengths. The other non-white LEDs may be controlled to compensate for the increased intensity level of the white LED to provide or maintain the color and/or intensity level of the combined light emitted by the lighting load.

Figure 7:
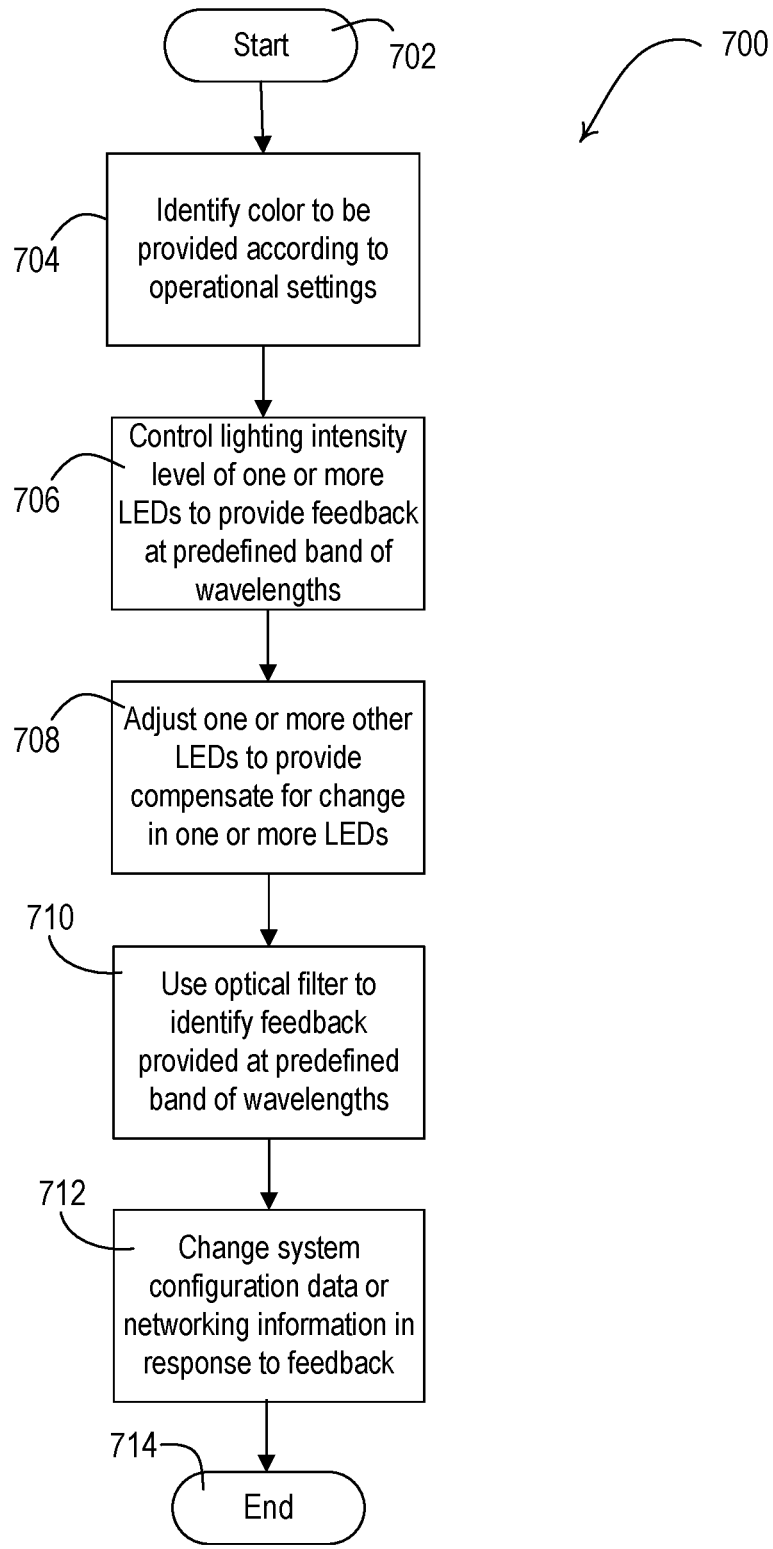
FIG. 7 is a flow diagram illustrating an example procedure for identifying the feedback indicated in predefined bands of wavelength within a spectrum of light emitted by a lighting load.

FIG. 7 is a flow diagram illustrating an example procedure 700 for identifying the feedback indicated in predefined bands of wavelength within a spectrum of light emitted by a lighting load. The procedure 700 may begin at 702. For example, the procedure 700 may begin by receiving a triggering event for triggering the feedback at a lighting control device, as described herein. At 704, the control circuit of the lighting control device may determine a color to be provided according to operating settings in an operating mode. For example, the control circuit may emit a color (e.g., color temperature or full-color value) in a total light output of the lighting load using a first combination of wavelengths. At 706, the control circuit of the lighting control device may control the lighting intensity level of one or more LEDs (e.g., RGBW LED light sources or another combination of four or more different LEDs) to provide the feedback at the predefined band of wavelengths. For example, the control circuit may control the intensity of the white LED to above a predefined threshold to indicate the feedback within the one or more bands of wavelengths. At 708, the control circuit of the one or more other LEDs may be adjusted to compensate for the change in the one or more LEDs that are providing the feedback. For example, the intensity level of the non-white LEDs may be adjusted to compensate for the increase in the white LED and maintain the color provided at 704 using a second combination of wavelengths that is different than the first combination of wavelengths.

At 710, an optical filter may be used to identify the feedback being provided at the predefined band of wavelengths. For example, an occupant that is running diagnostics or configuration of the lighting control devices in the load control system may use a notch filter to remove energy in the predefined band of wavelengths to identify the feedback being provided at the predefined band of wavelengths. The use of the notch filter may show a difference in the spectral distribution of the filtered light at the lighting loads in the space that are providing feedback when compared to the spectral distribution of the filtered light at the lighting loads that are not providing the feedback. For example, the lighting loads that are providing the feedback may look visually different to the occupant when the notch filter is applied, while the lighting loads that are not providing the feedback may look visually the same with and without the application of the notch filter on the light being emitted. The lighting loads that are not providing the feedback may provide a relatively low intensity level within the bands of wavelengths that are being filtered, such that the emitted light is visually similar or visually the same with or without the application of the notch filter. The notch filter may remove less energy in the predefined band of wavelengths for the light emitted by the lighting loads that are not providing feedback than it does for the light emitted by the lighting load that is providing feedback. In another example, a band-pass filter may be implemented at 710 to allow the emitted light within the predefined band of wavelengths to be viewable to the occupant through the filter. The lighting loads having a higher intensity of light through the filter may be the lighting loads providing the feedback.

The optical filter may be included in a lens through which the light passes to be perceived by the occupant that is performing diagnostics or configuration of the load control system. For example, the optical filter may be included in lenses in a pair of glasses that are worn by the occupant. The optical filter may be included in a lens through which the light passes to be received by a visible light sensing circuit (e.g., a camera) of a mobile device being operated by the occupant. The optical filter may include a notch filter, a band-pass filter, or another type of optical filter capable of filtering portions of a visible light spectrum.

The occupant that is performing the diagnostics or configuration of the load control system may change the operational settings on which one or more devices are operating in the load control system in response to the feedback that is being provided at 708. For example, the occupant that is performing the diagnostics or configuration may update the networking information on which one or more devices in the load control system rely for performing communications on a network. The procedure may end at 710.

Figure 8A:
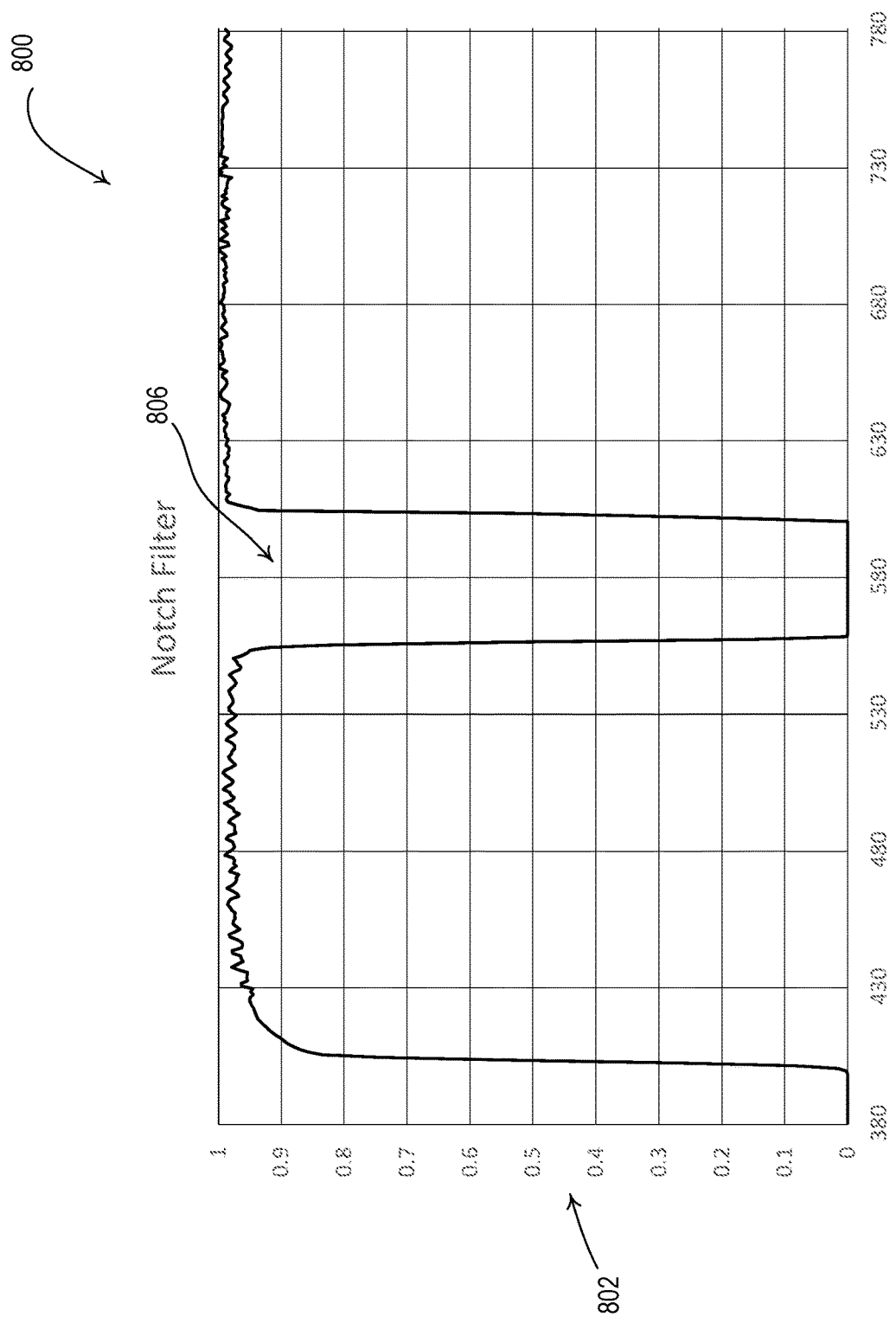
FIGS. 8A and 8B are graphs illustrating the effect of different optical filters on light emitted across a visible light spectrum.
Figure 8B:
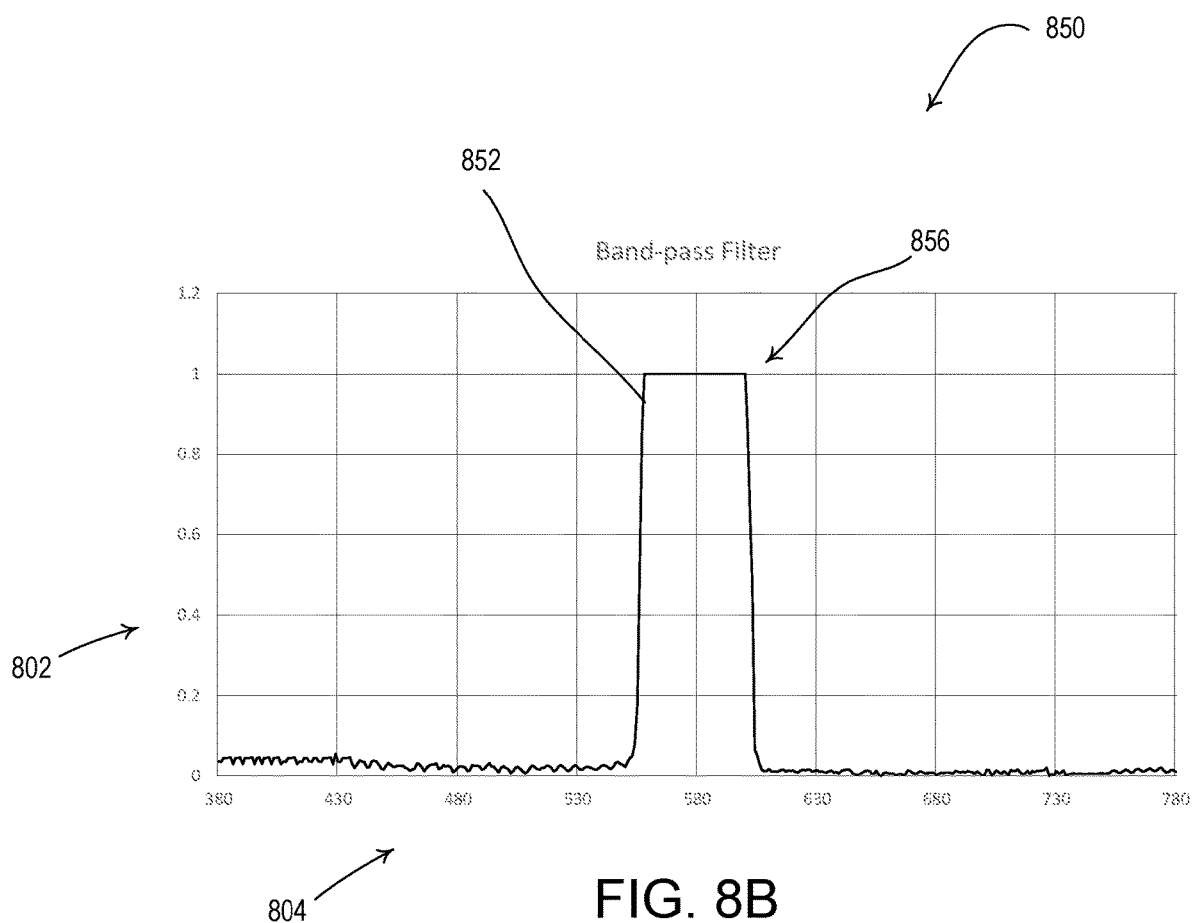

FIGS. 8A and 8B are graphs illustrating the effect of different optical filters on light emitted across a visible light spectrum. FIG. 8A is a graph 800 illustrating an example of a predefined band of wavelength 806 within a visible light spectrum that may be removed by an optical filter. The graph 800 includes an x-axis that includes wavelength values 804 in nanometers that represent a range of wavelength of emitted light by one or more LEDs in the visible light spectrum. The spectrum of light may include wavelength values at which various colors (e.g., color temperature or full-color values) of light are emitted. The graph 800 also includes a y-axis that comprises attenuation factor values 802 that represent lighting intensities between zero (e.g., zero percent) and one (e.g., one hundred percent) at each of the wavelength values 804 in the visible light spectrum.

The graph 800 illustrates the attenuation factor at each of the wavelength values 804 when a notch filter is applied. As shown in FIG. 8A, each of the LEDs in the lighting load may be controlled to one hundred percent intensity to provide emitted light across the visible light spectrum. The notch filter may remove energy in the predefined band of wavelength 806. The predefined band of wavelength 806 may be within a range of about fifty nanometers. The predefined band of wavelength 806 may be a larger or smaller portion of the band of wavelength that is removed by the notch filter. Additionally, there may be one or more predefined bands of wavelength that are removed by one or more notch filters. For example, the notch filter may remove the energy in multiple bands of wavelength across the visible light spectrum to indicate feedback to an occupant.

FIG. 8B is a graph 850 illustrating an example of a predefined band of wavelength 856 within the visible light spectrum that may be allowed to pass through a band-pass filter. The graph 850 includes the wavelength values 804 on the x-axis, and the attenuation factor values 802 on the y-axis. The graph 850 illustrates the intensity of the attenuation factor at each of the wavelength values 804 when the band-pass filter is applied to emitted light. Again, each of the LEDs in the lighting load may be controlled to one (e.g., one hundred percent) to pass through the emitted light in the visible light spectrum. The predefined band of wavelength 856 through which the emitted light is allowed to pass through the band-pass filter may be a larger or smaller portion of the visible light spectrum than the band of wavelength 806 shown in FIG. 8A. Additionally, there may be one or more predefined bands of wavelength that are allowed through one or more band-pass filters and may be represented at the intensity level at which they are emitted from the lighting load.

The predefined band of wavelength 806 and/or the predefined band of wavelength 856 may be used to signal feedback to an occupant of a space. For example, the differences in the emitted light within the predefined bands of wavelengths 806, 856 may be detected by the occupant when viewed through the optical filter or the band-pass filter. FIGS. 9A, 9B, 9D, and 9E are spectral distributions illustrating examples of how emitted light may be affected within a predefined band of wavelength by a notch filter. FIGS. 9G-9J are spectral distributions illustrating examples of how emitted light may be affected within the same predefined band of wavelength by a band-pass filter. The effect of the optical filters on the predefined band of wavelength may be used, along with changes in the intensity of the emitted light within the predefined band of wavelength, to detect lighting control devices providing feedback in a feedback mode.

Figure 9A:
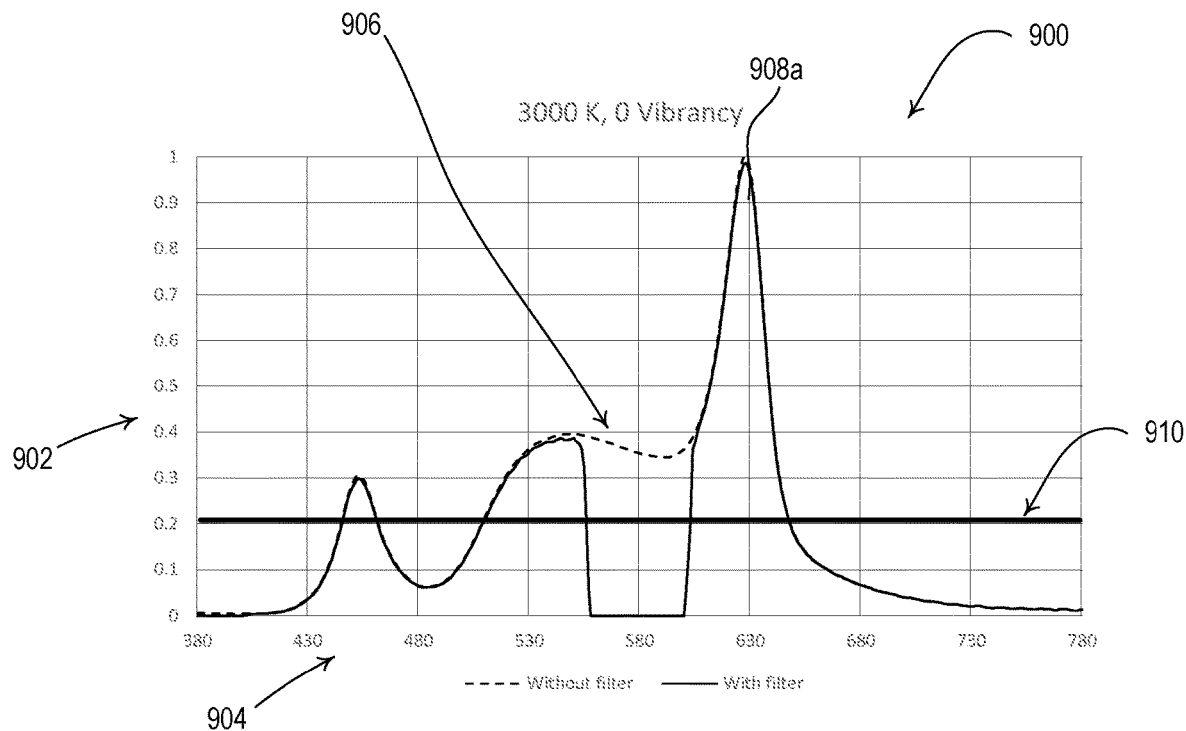
FIGS. 9A-9J are graphs illustrating examples of how emitted light may be affected by an optical filter.
Figure 9B:
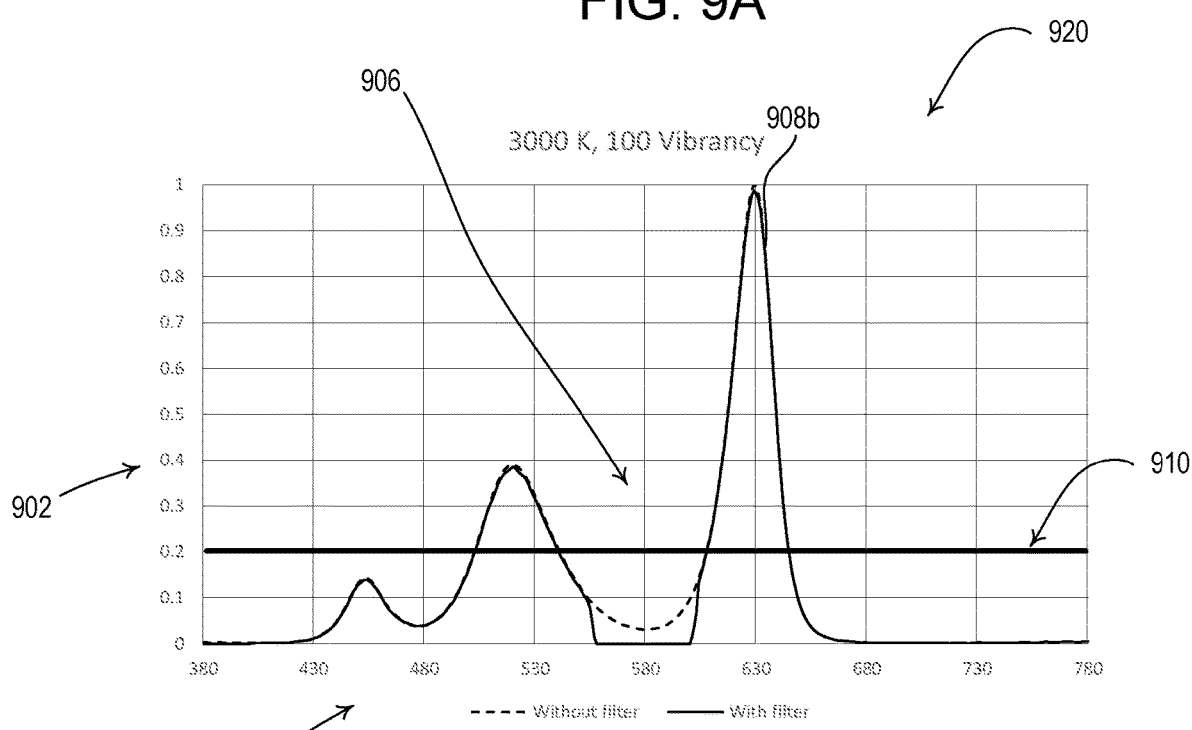

FIGS. 9A and 9B are graphs 900, 920 illustrating spectral distributions 908a, 908b of light in a visible light spectrum. For example, the graphs 900, 920 include an x-axis that comprises wavelength values 904 in nanometers that represent a range of wavelength in a visible light spectrum. The spectrum of light may include wavelength values 904 at which various colors of light are emitted by the LEDs of a light source. The graphs 900, 920 also include a y-axis that comprises power values 902 that represent the relative spectral power at each of the wavelength values 904 in the color spectrum for the LEDs. For example, the power values 902 may be normalized (e.g., to one at the wavelength having the highest power value), such that the highest power value may be defined as a maximum (e.g., 1), and other power values may be defined relative to the maximum (e.g., between 0 and 1). A control circuit in a lighting control device may receive or generate intensity values for controlling one or more LEDs, and may generate the power values based on the intensity values.

The spectral distributions 908a and 908b may represent spectral distributions of light at a color temperature value of 3000 K from lighting loads comprising multiple LED light sources. The spectral distributions 908a, 908b may have varying spectral power values at varying wavelength values, as shown. As described herein, a lighting load that includes multiple LEDs or other light sources of different colors (e.g., three or more LEDs) can emit light of the same color (e.g., color temperature or full-color value) using a mixture of different wavelength combinations. Each of the graphs 900, 920 show an example of two separate spectral distributions 908a, 908b that may be used to produce emitted light having the same color temperature value of 3000 K. The spectral distribution 908a shown in the graph 900 may be a metameric match to the spectral distribution 908b shown in the graph 920, such that the light viewed at the spectral distributions 908a, 908b are visually similar or indistinguishable to one or more occupants of the space without the application of the notch filter.

The graph 900 of FIG. 9A illustrates the spectral distribution 908a of light provided by a lighting load when the load control device controlling the lighting load is in a feedback mode. The graph 900 of FIG. 9A shows the spectral distribution 908a within the predefined band of wavelength 906 before the application of a notch filter (e.g., as indicated by the dotted line) and after the application of a notch filter (e.g., as indicated by the solid line). The graph 920 illustrated in FIG. 9B illustrates an example of another spectral distribution 908b of light provided by a lighting load. The graph 920 of FIG. 9B shows the spectral distribution 908b within the predefined band of wavelength 906 before (e.g., as indicated by the dotted line) and after the application of the same notch filter (e.g., as indicated by the solid line).

The spectral distribution 908a may have an increased intensity level of the light that is emitted within a predefined band of wavelength 906 than the spectral distribution 908a. As shown in FIG. 9A, the control circuit of a lighting control device in a feedback mode may increase the intensity level of one or more LEDs of its lighting load to produce a power value 902 of the emitted light 908a above a predefined threshold 910 to indicate the feedback within the predefined band of wavelength 906. The predefined band of wavelength 906 may be within the same band of wavelength that are filtered by the notch filter, such that the emitted light 908a from the lighting device that is in the feedback mode may appear visually distinct with the application of the notch filter (e.g., indicated by the solid line) and without the application of the notch filter (e.g., indicated by the dotted line). This may be because the combination of wavelengths of visible light to the user may be distinct due to the removal of energy within the predefined band of wavelength 906 by the notch filter. As shown in FIG. 9B, the control circuit of a lighting device that is not in the feedback mode may decrease the intensity level of one or more LEDs of its lighting load to produce a power value 902 of the emitted light 908b below the predefined threshold 910 within the predefined band of wavelength 906. The lighting device that is not providing the feedback within the predefined band of wavelength 906 may reduce the intensity level of one or more LEDs to produce a relatively low intensity level within the predefined band of wavelength 906 that are being filtered, such that the emitted light 908b from the lighting device that is not in the feedback mode may appear visually similar with the application of the notch filter (e.g., indicated by the solid line) and without the application of the notch filter (e.g., indicated by the dotted line).

The intensity value of one or more LEDs may be increased/decreased to increase/decrease the intensity of the emitted light 908a, 908b within the predefined band of wavelength 906. For example, a white LED of an RGBW LED light source may be controlled to increase/decrease the intensity of the emitted light 908a, 908b within the predefined band of wavelength 906. A value of a vibrancy parameter may be used to control a relative intensity value of a white LED in an RGBW LED light source to control the color saturation of objects in a load control environment. As described herein, increasing the value of the vibrancy parameter may thereby decrease the intensity of the one or more white LEDs that make up the respective lighting load of the light source and thereby increase the color saturation of the objects in the user environment. Decreasing the value of the vibrancy parameter may thereby increase the intensity of the one or more white LEDs that make up the respective lighting load of the light source and thereby decrease the color saturation of the objects in the user environment. As shown in FIG. 9A, the value of the vibrancy parameter may be reduced (e.g., to zero percent) to increase the intensity of the one or more white LEDs (e.g., to one hundred percent) to increase a power value 902 of the emitted light 908a above the predefined threshold 910 within the predefined band of wavelength 906. As shown in FIG. 9B, the value of the vibrancy parameter may be increased (e.g., to one hundred percent) to decrease the intensity of the one or more white LEDs (e.g., to zero percent) to reduce a power value 902 of the emitted light 908b below the predefined threshold 910 within the predefined band of wavelength 906. The intensity level of the other LEDs (e.g., non-white LEDs) of the lighting load are adjusted to maintain the same color temperature value (e.g., 3000 K) after decreasing the intensity value of the white LED of the one or more white LEDs.

Though the intensity level of the LEDs of the lighting load may be adjusted such that the emitted light 908a of the lighting load providing the feedback and the emitted light 908b of the lighting load that is not providing the feedback may be visually similar or visually the same without the application of the notch filter (e.g., 3000 K), the color (e.g., color temperature or full-color value) of the emitted light 908a and the emitted light 908b may be visually different when the notch filter is applied. For example, the notch filter may remove a greater amount of energy from the emitted light 908a than that emitted light 908b, which may cause a visual difference in the color based on the spectral distribution when the notch filter is being applied. For example, the notch filter may cause a greater shift in the chromaticity coordinates of the emitted light 908a than that emitted light 908b.

Figure 9C:
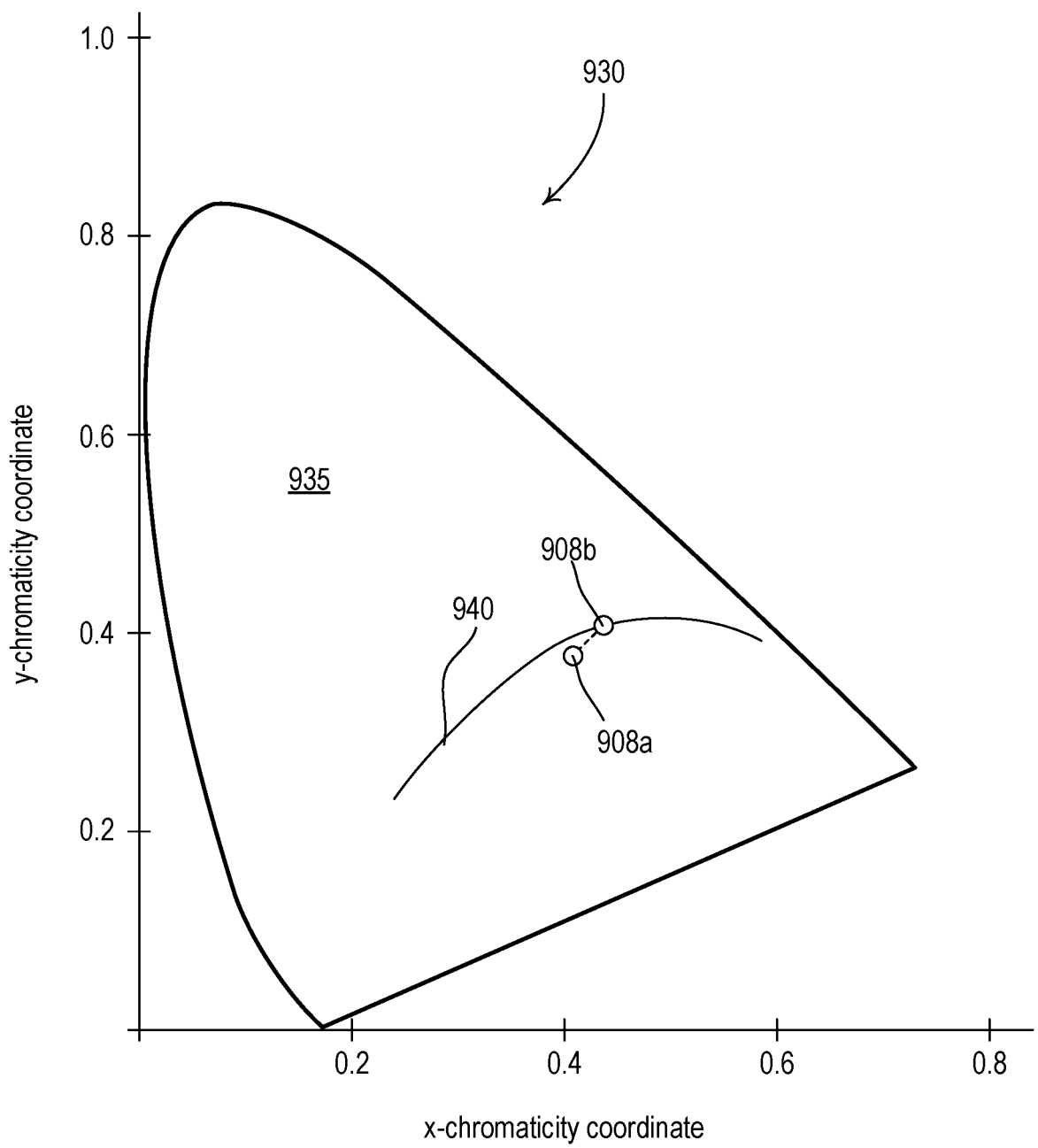

FIG. 9C depicts an International Commission on Illumination (CIE) 1931 color space chart 930 depicting a color space 935 and a black body curve 940. The color space 935 may represent a two-dimensional space (e.g., an XY chromaticity space) where colors may be indicated by an x-chromaticity coordinate and a y-chromaticity coordinate. The black body curve 940 may represent a one-dimensional space (e.g., a CCT chromaticity space) where colors may be indicated by a color temperature value (e.g., from 1400 K to 10,000 K) on a spectrum of white light. The chart 930 depicts example color changes between the color of the emitted light 908a and the color of the emitted light 908b when viewed through the notch filter by the occupant.

Color values in the color space 935 that are within a predefined distance of one another may be visibly indistinguishable in color, while color values that are outside of the predefined distance of one another are visibly distinguishable in color. The predefined distance may be greater than one MacAdam ellipse. The application of the notch filter to the emitted light 908a may cause a shift in the chromaticity coordinates that is greater than one MacAdam ellipse (e.g., one or more MacAdam ellipses), while the application of the notch filter to the emitted light 908b may cause a relatively smaller shift in the chromaticity coordinates (e.g., less than one MacAdam ellipse). The chromaticity coordinates of the emitted light 908a and the emitted light 908b may be within a MacAdam ellipse of one another when the notch filter is not being applied to the emitted light 908a, 908b. The application of the notch filter may cause the chromaticity coordinates of the emitted light 908a and the emitted light 908b to be greater than one or more MacAdam ellipses of one another when the notch filter is applied due to the amount of energy removed by the notch filter from the emitted light 908a, which may result in the lighting loads providing the feedback being visibly distinct from the lighting loads that are not providing feedback while the notch filter is applied.

Figure 9D:
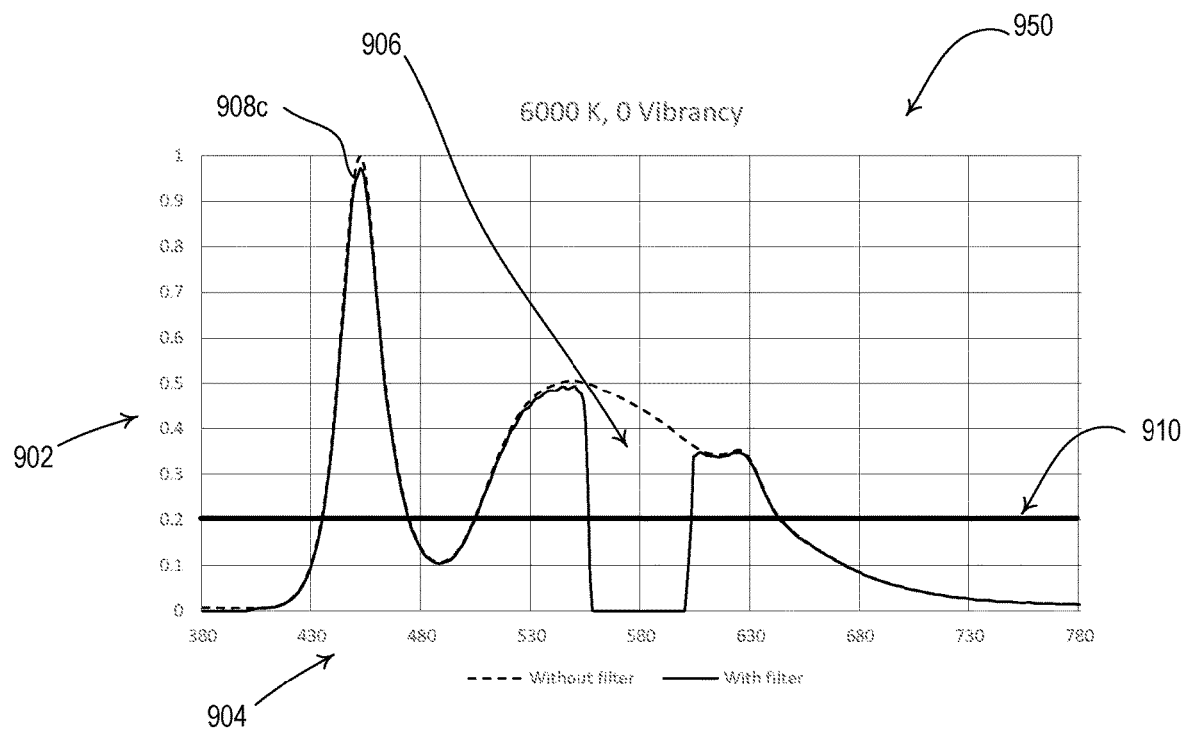
Figure 9E:
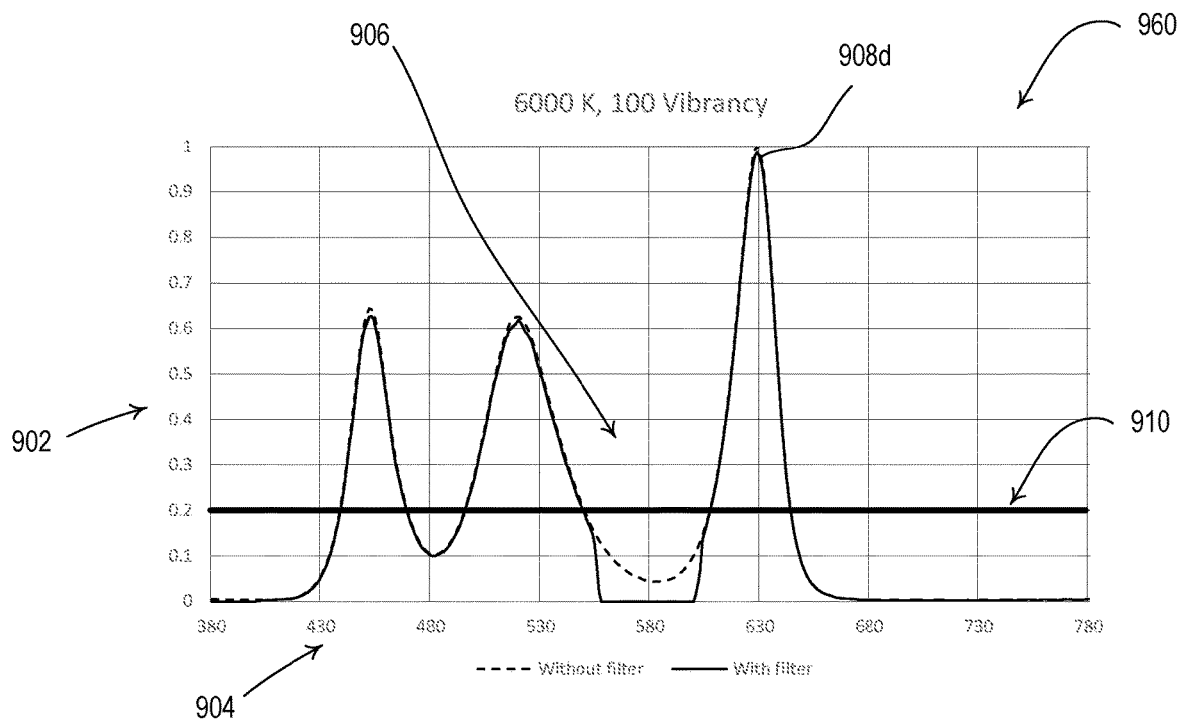
Figure 9F:
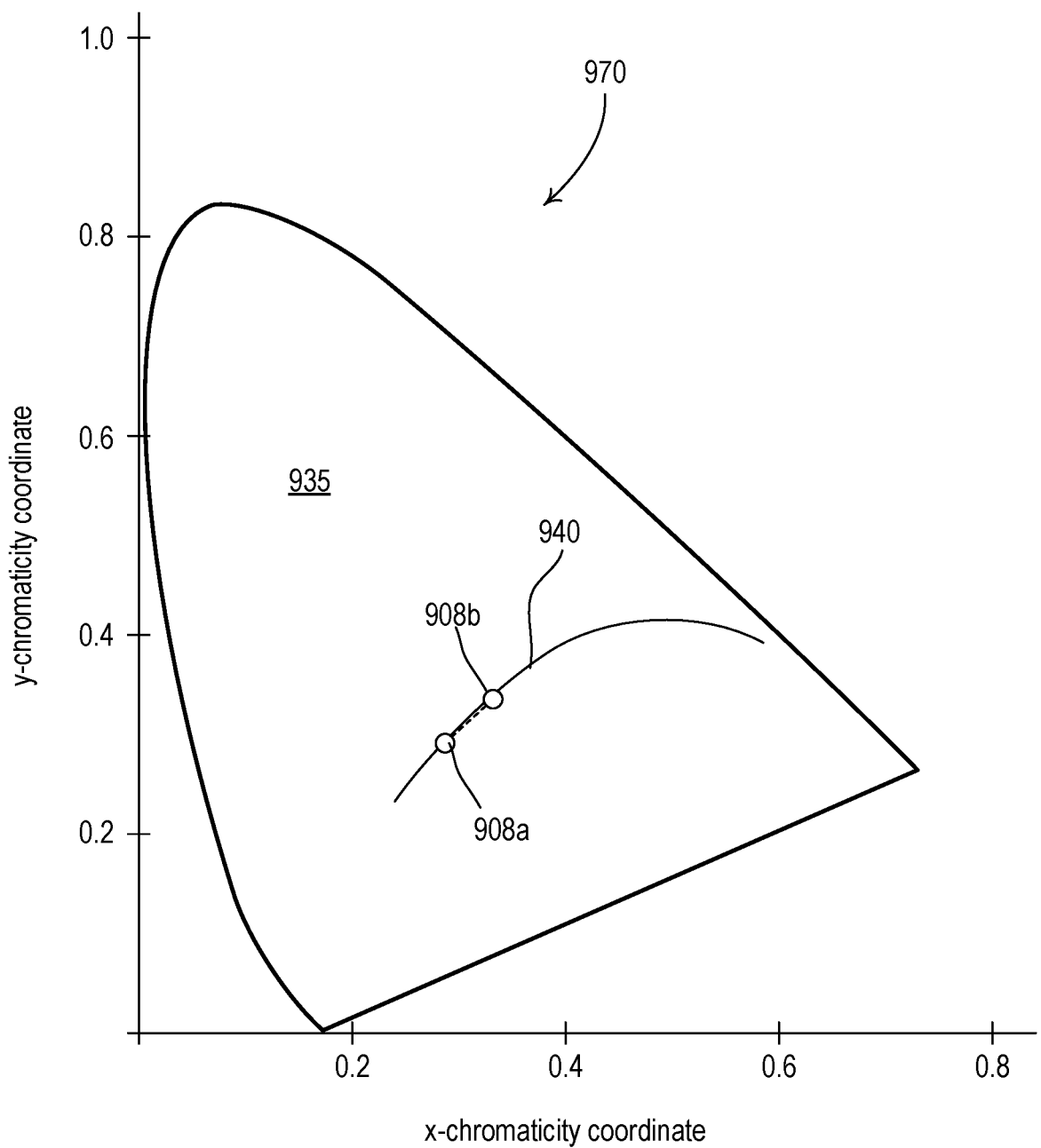

Though FIGS. 9A-9C illustrate examples of different spectral distributions of emitted light 908a, 908b that may be used to enable feedback to be provided to an occupant in the emitted light 908a while the total light output of the emitted light 908a, 908b is controlled to a color temperature value of 3000 K, the lighting control devices may similarly control their respective lighting loads at other color temperature values. FIGS. 9D-9F illustrate other spectral distributions in emitted light 908c, 908d from the lighting loads of lighting devices operating in different modes to enable feedback to be provided to the occupant at another color temperature value (e.g., 6000 K).

FIGS. 9D and 9E are graphs 950, 960 illustrating different spectral distributions of emitted light 908c, 908d, respectively, capable of providing light output a color temperature value of 6000 K from lighting loads comprising multiple LED light sources. The graph 950 of FIG. 9D shows the spectral distribution 908c within a predefined band of wavelength 906 before the application of a notch filter (e.g., as indicated by the dotted line) and after the application of a notch filter (e.g., as indicated by the solid line). The graph 960 of FIG. 9E shows the spectral distribution 908d within the predefined band of wavelength 906 before the application of a notch filter (e.g., as indicated by the dotted line) and after the application of a notch filter (e.g., as indicated by the solid line).

Again, the control circuit of the lighting control device controlling their respective lighting load to provide the emitted light 908c may control one or more white LEDs in response to a value of a vibrancy parameter to indicate feedback within the predefined band of wavelength 906. As shown in FIG. 9D, the control circuit of the lighting device in the feedback mode may increase the intensity level of one or more white LEDs (e.g., to one hundred percent) to increase the power value 902 of the emitted light 908c above the predefined threshold 910 within the predefined band of wavelength 906. As shown in FIG. 9E, the control circuit of the lighting device that is not in the feedback mode may decrease the intensity level of one or more white LEDs (e.g., to zero percent) to reduce the power value 902 of the emitted light 908*d* below the predefined threshold 910 within the predefined band of wavelength 906. The control circuits of each of the lighting control devices may control the non-white LEDs to intensity values to compensate for the increase/decrease in the one or more white LEDs, while maintaining the same color of the total output of the emitted light 908*c*, 908*d*. Again, the spectral distribution of the emitted light 908*c* shown in the graph 950 shown in FIG. 9D may similarly be a metameric match to the spectral distribution of the emitted light 908*d* shown in the graph 960 shown in FIG. 9E, such that the spectral distributions of the emitted light 908*c*, 908*d* are visually similar or indistinguishable to one or more occupants of the space without the application of the notch filter.

Again, though the emitted light 908*c* of the lighting load providing the feedback and the emitted light 908*d* of the lighting load that is not providing the feedback may be visually similar or visually the same without the application of the notch filter, the color of the emitted light 908*c* and the emitted light 908*d* may be visually different when the notch filter is applied. FIG. 9F depicts an International Commission on Illumination (CIE) 1931 color space chart 970 that indicates the difference in the chromaticity coordinates of the emitted light 908*c* and the emitted light 908*d*.

Color values in the color space 935 that are within a predefined distance of one another may be visibly indistinguishable in color, while color values that are outside of the predefined distance of one another are visibly distinguishable in color. The predefined distance may be greater than one MacAdam ellipse. The application of the notch filter to the emitted light 908*c* may cause a shift in the chromaticity coordinates that is greater than one MacAdam ellipse (e.g., one or more MacAdam ellipses), while the application of the notch filter to the emitted light 908*d* may cause a relatively smaller shift in the chromaticity coordinates (e.g., less than one MacAdam ellipse). The chromaticity coordinates of the emitted light 908*c* and the emitted light 908*d* may be within a MacAdam ellipse of one another when the notch filter is not being applied to the emitted light 908*c*, 908*d*. The application of the notch filter may cause the chromaticity coordinates of the emitted light 908*c* and the emitted light 908*d* to be greater than one or more MacAdam ellipses of one another when the notch filter is applied due to the amount of energy removed by the notch filter from the emitted light 908*d*, which may result in the lighting loads providing the feedback being visibly distinct from the lighting loads that are not providing feedback while the notch filter is applied.

Figure 9G:
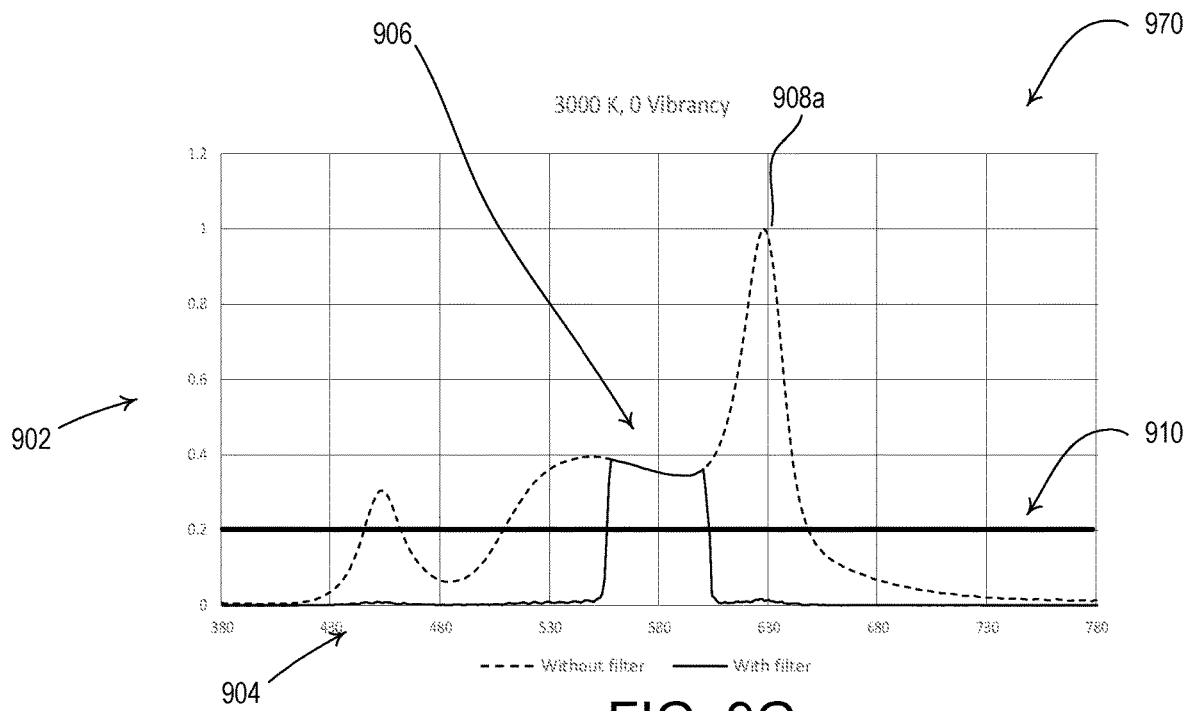

FIGS. 9G-9J are graphs illustrating examples of how emitted light comprising feedback within the same predefined band of wavelength 906 may be affected by a band-pass filter. FIG. 9G is a graph 970 that illustrates the same power values 902 of emitted light 908*a* within the same wavelength values 904 of the visible light spectrum as shown in FIG. 9A. For example, the graph 970 of FIG. 9G shows the emitted light 908*a* at a color temperature value of 3000 K when a value of a vibrancy parameter is reduced (e.g., to zero percent) to increase the intensity of the one or more white LEDs (e.g., to one hundred percent). More specifically, the graph 970 of FIG. 9G shows the spectral distribution 908*a* before application of the band-pass filter (e.g., as indicated by the dotted lines) and after application of the band-pass filter (e.g., as indicated by the solid line).

The increase in the intensity level of the one or more white LEDs causes an increase in the power value 902 of the emitted light 908*a* above the predefined threshold 910 within the predefined band of wavelength 906 to indicate the feedback. Again, the control circuit of the lighting control device operating in the feedback mode may increase the intensity level of the one or more white LEDs of its lighting load to produce the lighting intensity value 902 of the emitted light 908*a* above the predefined threshold 910 to indicate the feedback within the predefined band of wavelength 906. The band-pass filter may allow the emitted light 908*a* within the band of wavelength 906 to pass through and be visible to the occupant (e.g., as indicated by the solid line). The band-pass filter may reject the emitted light outside of the band of wavelength 906 (e.g., as indicated by the dotted line).

Figure 9H:
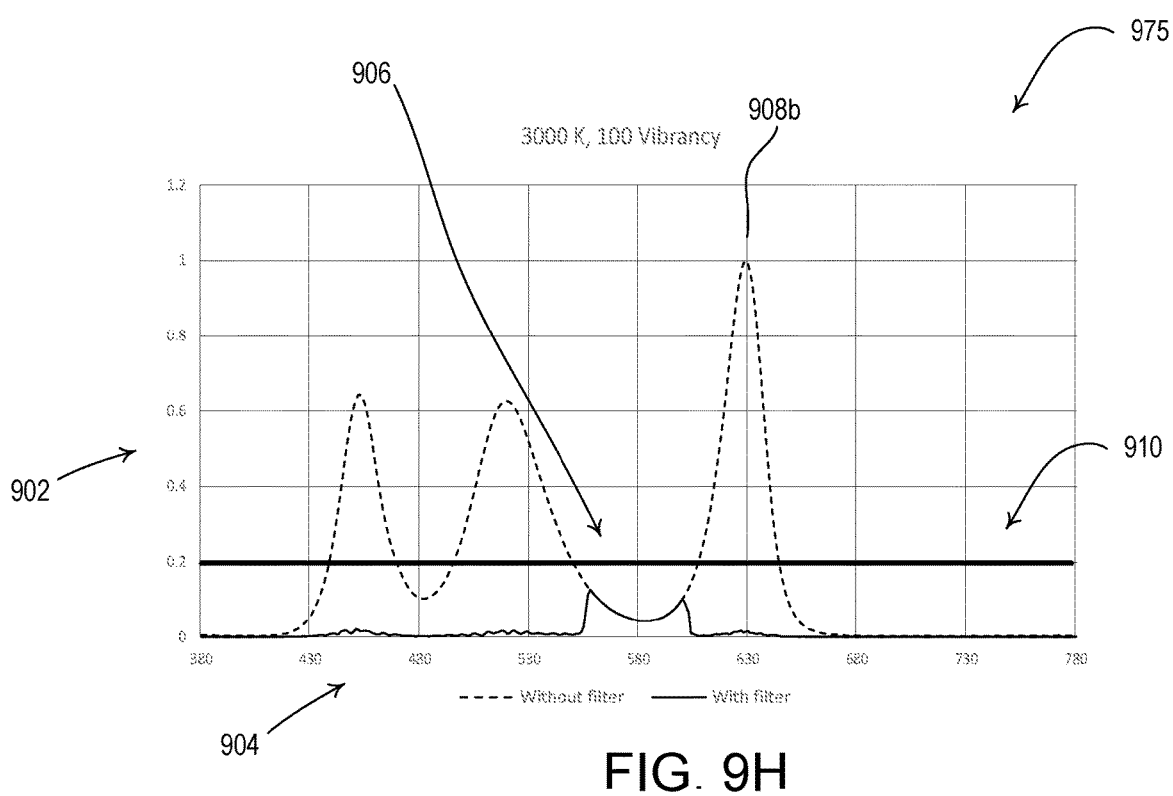

FIG. 9H is a graph 975 that illustrates the same power values 902 of emitted light 908*b* within the same wavelength values 904 of the visible light spectrum as shown in FIG. 9B. For example, the graph 975 of FIG. 9H shows the emitted light 908*b* at a color temperature value of 3000 K when the value of the vibrancy parameter is increased (e.g., to one hundred percent) to decrease the intensity of the one or more white LEDs (e.g., to zero percent). The graph 975 of FIG. 9H shows the spectral distribution 908*b* before application of the band-pass filter (e.g., as indicated by the dotted lines) and after application of the band-pass filter (e.g., as indicated by the solid line).

The decrease in the intensity value of the one or more white LEDs causes a decrease in the power value 902 of the emitted light 908*b* to below the predefined threshold 910 within the predefined band of wavelength 906 that are used to indicate the feedback. The control circuit of the lighting device that is not in the feedback mode may decrease the intensity level of the one or more white LEDs of its lighting load to produce the power value 902 of the emitted light 908*b* below the predefined threshold 910 within the predefined band of wavelength 906. The band-pass filter may allow the emitted light 908*b* within the predefined band of wavelength 906 to pass through and be visible to the occupant (e.g., as indicated by the solid line). The band-pass filter may reject the emitted light outside of the predefined band of wavelength 906 (e.g., as indicated by the dotted line). As shown in FIGS. 9G and 9H, the emitted light 908*a* that is allowed through the band-pass filter from the lighting load that is providing feedback may have a higher intensity value than the emitted light 908*b* that is allowed through the band-pass filter from the lighting load that is not providing feedback. The emitted light 908*a*, 908*b* may be of the same color, but may be distinguishable based on their relative intensity level.

Figure 9I:
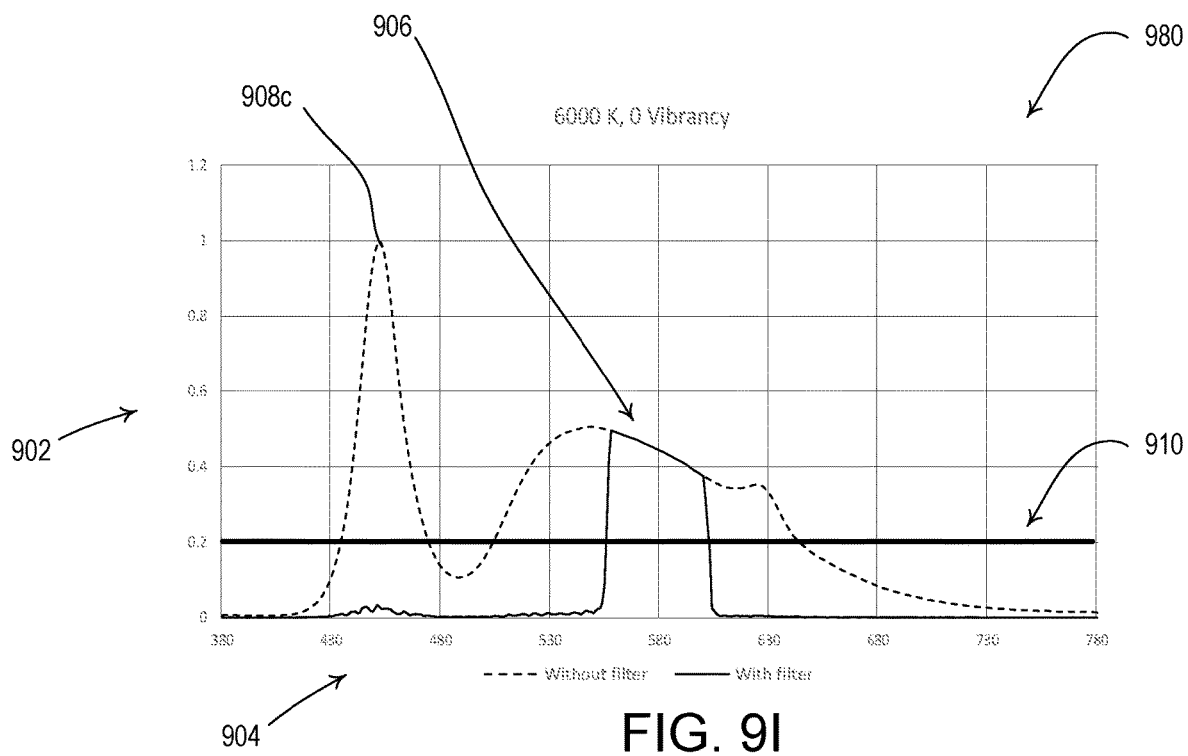
Figure 9J:
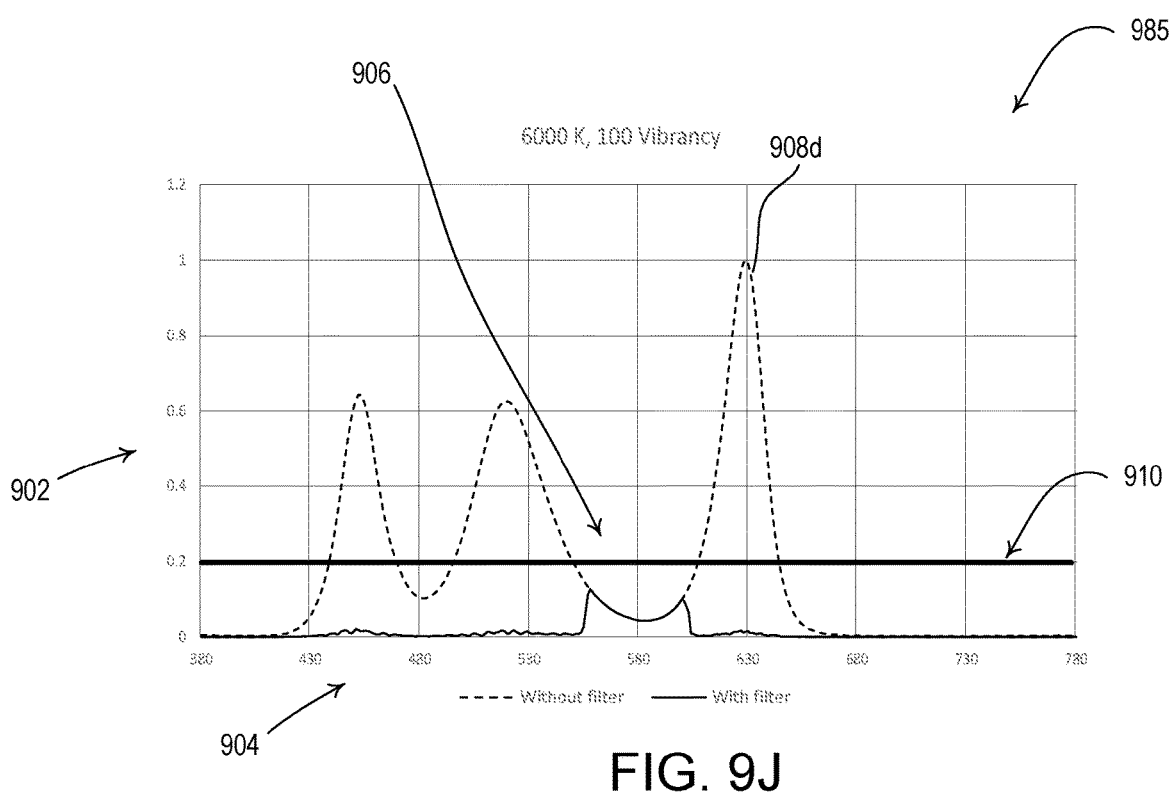

FIGS. 9I and 9J similarly include graphs 980 and 985, respectively, that illustrate the emitted light 908*c*, 908*d* at the color temperature value of 6000 K when the same band-pass filter is applied. The graph 980 shown in FIG. 9I illustrates the same power values 902 of emitted light 908*c* within the same wavelength values 904 of the visible light spectrum as shown in FIG. 9D. For example, the graph 980 shows the emitted light 908*c* at a color temperature value of 6000 K when the value of the vibrancy parameter is reduced (e.g., to zero percent) to increase the intensity of the one or more white LEDs (e.g., to one hundred percent). The graph 970 shows the spectral distribution 908*c* within the predefined band of wavelength 906 before application of the band-pass filter (e.g., as indicated by the dotted lines) and after application of the band-pass filter (e.g., as indicated by the solid line).

The increase in the intensity of the one or more white LEDs causes an increase in the power value 902 of the emitted light 908*c* above the predefined threshold 910 within the predefined band of wavelength 906 to indicate the feedback. As described herein, the control circuit of the lighting device in the feedback mode may increase the intensity level of the one or more white LEDs of its lighting load to produce the power value 902 of the emitted light 908c above the predefined threshold 910 to indicate the feedback within the predefined band of wavelength 906. The band-pass filter may allow the emitted light 908c within the band of wavelength 906 to pass through and be visible to the occupant (e.g., as indicated by the solid line). The band-pass filter may reject the emitted light outside of the band of wavelength 906 (e.g., as indicated by the dotted line).

The graph 985 of FIG. 9J shows the emitted light 908d at the color temperature value of 6000 K when the value of the vibrancy parameter is increased (e.g., to one hundred percent) to decrease the intensity of the one or more white LEDs (e.g., to zero percent). The decrease in the intensity value of the one or more white LEDs causes a decrease in the power value 902 of the emitted light 908d to below the predefined threshold 910 within the predefined band of wavelength 906. The band-pass filter may allow the emitted light 908d within the predefined band of wavelength 906 to pass through and be visible to the occupant (e.g., as indicated by the solid line). The band-pass filter may reject the emitted light outside of the predefined band of wavelength 906 (e.g., as indicated by the dotted line). As shown in FIGS. 9I and 9J, the emitted light 908c that is allowed through the band-pass filter from the lighting load that is providing feedback may have a higher intensity value than the emitted light 908d that is allowed through the band-pass filter from the lighting load that is not providing feedback.

Though examples are provided for different types of optical filters, other types of optical filters may be similarly applied to indicate feedback from lighting control devices. Additionally, the optical filters may be applied to different bands of wavelength in the visible light spectrum. Although one or more white LEDs are illustrated for controlling the intensity level of the light within the predefined band of wavelength, other LEDs may similarly be controlled to control the intensity of light at other wavelength values. It will be further appreciated that other lighting loads may comprise a different configuration of the colors and/or number of LEDs. However, similar procedures may be implemented using other types of LEDs to provide feedback as indicated herein.

There may be one or more predefined bands of wavelength and/or one or more predefined thresholds in addition to the predefined band of wavelength 906 and the predefined threshold 910, respectively. For example, a lighting control device may use different bands of wavelength and/or different predefined thresholds to provide different types of feedback as described herein. In an example, a first lighting control device may increase the intensity level of one or more LEDs of its lighting load within a first predefined band of wavelength above a predefined threshold to provide a first feedback type, while a second lighting control device may increase the intensity level of one or more LEDs of its lighting load within a second predefined band of wavelength above the predefined threshold to provide a second feedback type. In another example, the first lighting control device may increase the intensity level of one or more LEDs of its lighting load within a predefined band of wavelength above a first predefined threshold to provide the first feedback type, while the second lighting control device may increase the intensity level of one or more LEDs of its lighting load within the predefined band of wavelength above a second predefined threshold to provide the second feedback type. Although examples herein describe a control device providing feedback by increasing the intensity level of one or more LEDs within a predefined band of wavelength above a predefined threshold, other examples may apply where a control device provides feedback by decreasing the intensity level of one or more LEDs within a predefined band of wavelength below a predefined threshold.

Figure 10A:
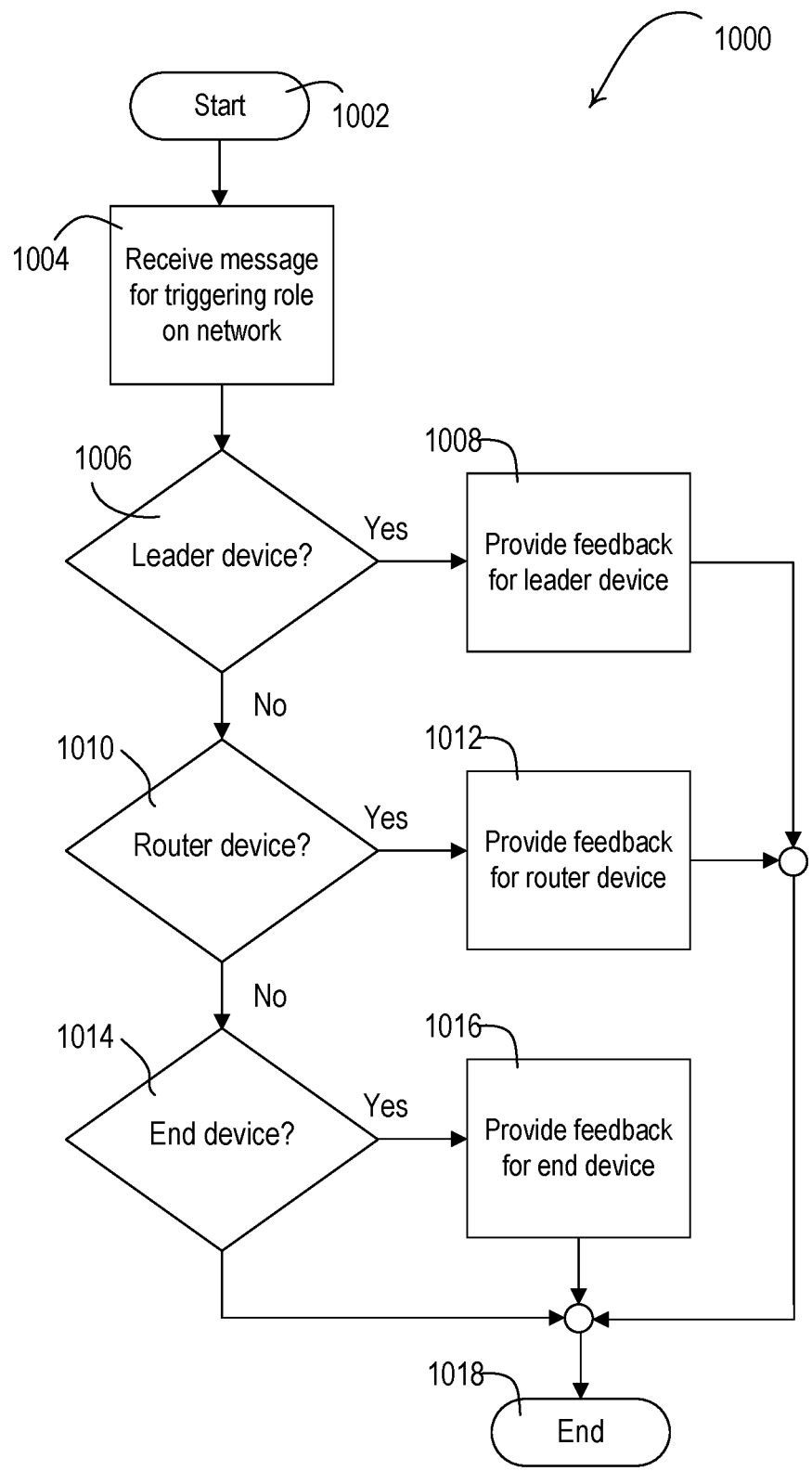
FIG. 10A is a flowchart depicting an example procedure for identifying a role of a control device in a network.

As described herein, different types of feedback may be used to indicate different types of diagnostic or configuration information at the lighting loads for the respective lighting control device. FIG. 10A is a flowchart depicting an example procedure 1000 for identifying a role of a control device in a network. For example, the control device may be a lighting control device that may control an amount of power provided to lighting loads of a lighting fixture. The lighting control device may be assigned a role in the network information. For example, the lighting control device may be a leader device, a router device, and/or an end device. The procedure 1000 may be performed by the lighting control device after reception of a triggering event configured to cause the lighting control device to enter a feedback mode.

The procedure 1000 may begin at 1002. At 1004, the control circuit of the lighting control device may receive a feedback message configured to trigger identification of the lighting control device's role on the network. For example, the lighting control device may enter the feedback mode for providing feedback as described herein. In one example, the lighting control device may receive the feedback message from a user device and/or from a system controller. The user device may transmit the message to the lighting control device using a wireless communication protocol. The system controller may transmit the message to the lighting control device via a wireless or wired communication. Though messages from the user device or the system controller are provided as examples for triggering feedback at the lighting control device, the lighting control devices may provide feedback based on other triggering criteria (e.g., in response to occupancy conditions, the RSSI value of the feedback message, or other messages or signals) as described herein.

The feedback message may be transmitted from the user device in response to a user pressing a button on the user device in an application that is configured to cause the lighting control device to identify its role. The feedback message may be transmitted as a multicast message that requests the lighting control devices that receive the feedback message to identify their role. The feedback message may be transmitted directly from the user device or the system controller to cause a specific lighting control device to identify its role. For example, the feedback message may be transmitted as a unicast message that includes a unique identifier of the lighting control device and operates as a request for the lighting control device to identify its role.

After receipt of the feedback message at 1004, the control circuit of the lighting control device may determine from its network information stored in memory whether the lighting control device is a leader device of the network at 1006. As described herein, the leader device may manage other control devices in the network. A lighting control device may be an example of a leader device, though other control devices may be assigned as the leader device in a network or network partition.

If the control circuit of the lighting control device determines from memory that the lighting control device is a leader device at 1006, the lighting control device may provide feedback that indicates that the lighting control device is a leader device at 1008. The feedback may be indicated by changing a state of the lighting loads controlled by the lighting control device. For example, the feedback may be indicated by illuminating a corresponding lighting load a color and/or intensity. The lighting control device may cause the lighting loads to illuminate a first color (e.g., blue) to indicate that the lighting control device is a leader device. Additionally and/or alternatively, the lighting control device may increase the intensity level of one or more LEDs of its lighting load within a predefined band of wavelength above a predefined threshold. The procedure 1000 may end at 1018.

In response to receiving the feedback message at 1004, the control circuit of the lighting control device may determine whether the lighting control device is a router device at 1010. After receipt of the feedback message at 1004, the control circuit of the lighting control device may determine from its network information stored in memory whether the lighting control device is a router device in the network at 1010. A router device may route (e.g., receive and/or transmit) messages between devices, or between router devices for communicating messages received from an attached device to another device in the network.

If the control circuit of the lighting control device determines it is a router device at 1010, the control circuit of the lighting control device may enter a feedback mode and provide feedback that indicates that the lighting control device is a router device at 1012. The feedback may be indicated by changing a state of the lighting loads controlled by the lighting control device. For example, the feedback may be indicated by changing the intensity of the lighting loads. For example, the control circuit of the lighting control device may cause the lighting loads to illuminate a second color (e.g., green) to indicate that the lighting control device is a router device. In another example, the control circuit of the lighting control device may cause the lighting loads to illuminate the first color at a different intensity than is used to indicate the leader device. Additionally and/or alternatively, the lighting control device may increase the intensity level of one or more LEDs of its lighting load within a predefined band of wavelength above a predefined threshold. The predefined threshold and/or the predefined band of wavelength may be different than the predefined threshold and/or the predefined band of wavelength that is used to indicate the leader device. The procedure 1000 may end at 1018.

The control circuit of the lighting control device may determine from its network information stored in memory whether the lighting control device is an end device at 1014. An end device may be attached to another device (e.g., a parent device, such as a leader device 310 and/or one or more router devices) on the network and may transmit and/or receive messages via its attached parent device (e.g., leader device and/or router device). An end device may be, for example, a router eligible end device and/or a sleepy end device.

If the control circuit of the lighting control device determines that is an end device at 1014, the control circuit of the lighting control device may provide feedback that indicates that the lighting control device is an end device at 1016. Different types of end devices may provide different types of feedback. For example, a sleepy end device may provide different feedback than a router eligible end device. The feedback may be indicated by changing a state of the lighting loads controlled by the lighting control device. For example, the feedback may be indicated by changing the intensity and/or color of the lighting loads. For example, the control circuit of the lighting control device may cause the lighting loads to illuminate a third color (e.g., red) to indicate that the lighting control device is an end device. In another example, the control circuit of the lighting control device may cause the lighting loads to emit light in the first color at a different intensity than is used to indicate the leader device and/or the router devices (e.g., using a gradient). Additionally and/or alternatively, the lighting control device may increase the intensity level of one or more LEDs of its lighting load within a predefined band of wavelength above a predefined threshold. The predefined threshold and/or the predefined band of wavelength may be different than the predefined threshold(s) and/or the predefined band of wavelength(s) that is used to indicate the leader device and/or the router devices. The procedure 1000 may end at 1018.

The control circuit of the lighting control device may similarly provide feedback in response to a feedback message that defines a specific role to be identified by the lighting control devices that receive the feedback message. For example, the feedback message may be transmitted as a multicast message that operates as a request for lighting control devices of a defined role to identify themselves. Each lighting control device that receives the feedback message may compare the defined role in the feedback message with their role that is stored in the network information in memory. The control circuit of the lighting control devices with the defined role in the feedback message may identify themselves (e.g., by illuminating a color, intensity, or providing other feedback) as having the defined role.

In addition to identifying one or more roles of control devices in the network, it may be beneficial to identify link quality between one or more control devices capable of communicating with one another. For example, as end devices communicate out to other devices in the network through their corresponding parent router devices, the link quality on the communication link between the end devices and their parent router devices may be indicated to assist in improving communications between the end devices and the corresponding parent devices through which each end device may communicate.

Figure 10B:
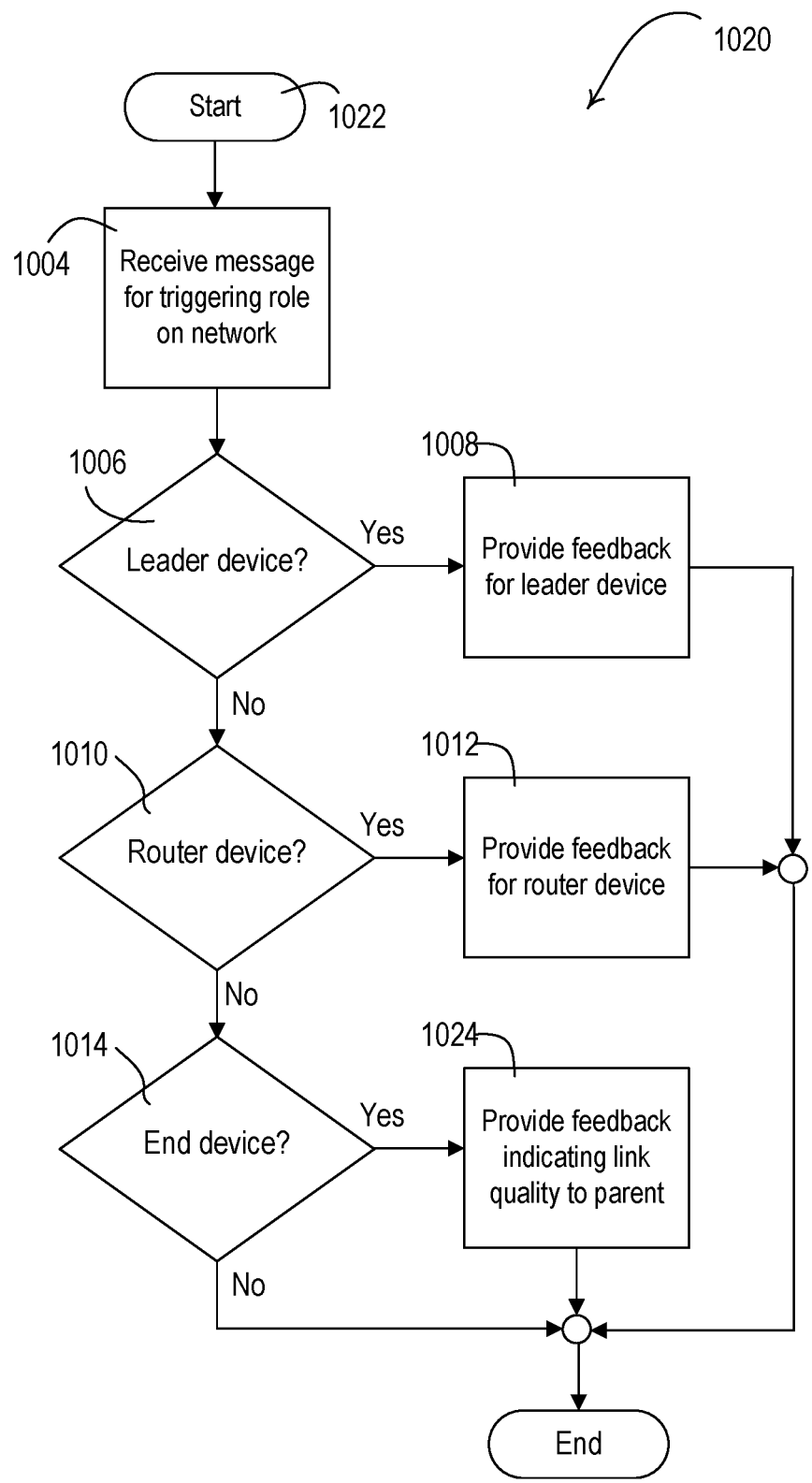
FIG. 10B is a flowchart depicting an example procedure for identifying a network role of a device and/or a link quality between devices in a network.

FIG. 10B is a flowchart depicting an example procedure 1020 for identifying a link quality between an end device and a parent router device in a network. For example, the end device may be a lighting control device that may control an amount of power provided to lighting loads of a lighting fixture. The procedure 1020 shown in FIG. 10B may include similar steps as shown in the example procedure 1000 shown in FIG. 10A. For example, the procedure 1020 may begin at 1022 and may be performed by the lighting control device after a triggering event at 1004. The triggering event may be reception of a feedback message configured to cause the control circuit of the lighting control device to enter a feedback mode configured to indicate the role of the lighting control device on the network and/or provide feedback indicating a link quality to a parent router device.

If the control circuit of the lighting control device determines, at 1006 or 1010, that the lighting control device is a leader device or a router device, respectively, the control circuit of the lighting control device may provide feedback identifying the role of the lighting control device. For example, if the control circuit of the lighting control device is a leader device it may provide a first type of feedback, and if the control circuit of the lighting control device is a router device it may provide a second type of feedback. However, if the control circuit of the lighting control device determines that it is an end device, it may provide feedback that it is an end device and/or the feedback may indicate a link quality to its parent router device. As shown in FIG. 10B, after the control circuit of the lighting control device determines, from the network information stored in memory, that the lighting control device is an end device at 1014, the control circuit of the lighting control device may provide feedback at 1024 indicating a link quality between the end device and its parent router device (e.g., a leader device and/or a router device). The link quality to the parent router device may be stored in the network information at the lighting control device (e.g., end device). The indicated link quality may be the link quality out ("LQO") or the link quality in ("LQI"). The indicated link quality may be the lower or higher of the LQO and LOI. The indicated link quality may be an average of the LQO and LOI.

The link quality may be indicated by a color and/or intensity of the lighting load. For example, the link quality from 0-3 may be indicated with four different colors (e.g., red being the worst link quality, yellow being the next level of improved link quality, blue being the next level of improved link quality, and green being the best link quality). The link quality may be indicated by a gradient from red to green as the link quality improves. The link quality may be indicated by an intensity level (e.g., intensity increases as link quality increases, or vice versa). Additionally and/or alternatively, the link quality may be indicated by changing a spectral power value of the emitted light within a predefined band of wavelength. Using the procedure 1020, each of the router devices and/or the leader device may be separately identified, such that the user may identify the closest parent router devices to which the end devices having the indicated link quality may be located in the system.

Figure 11A:
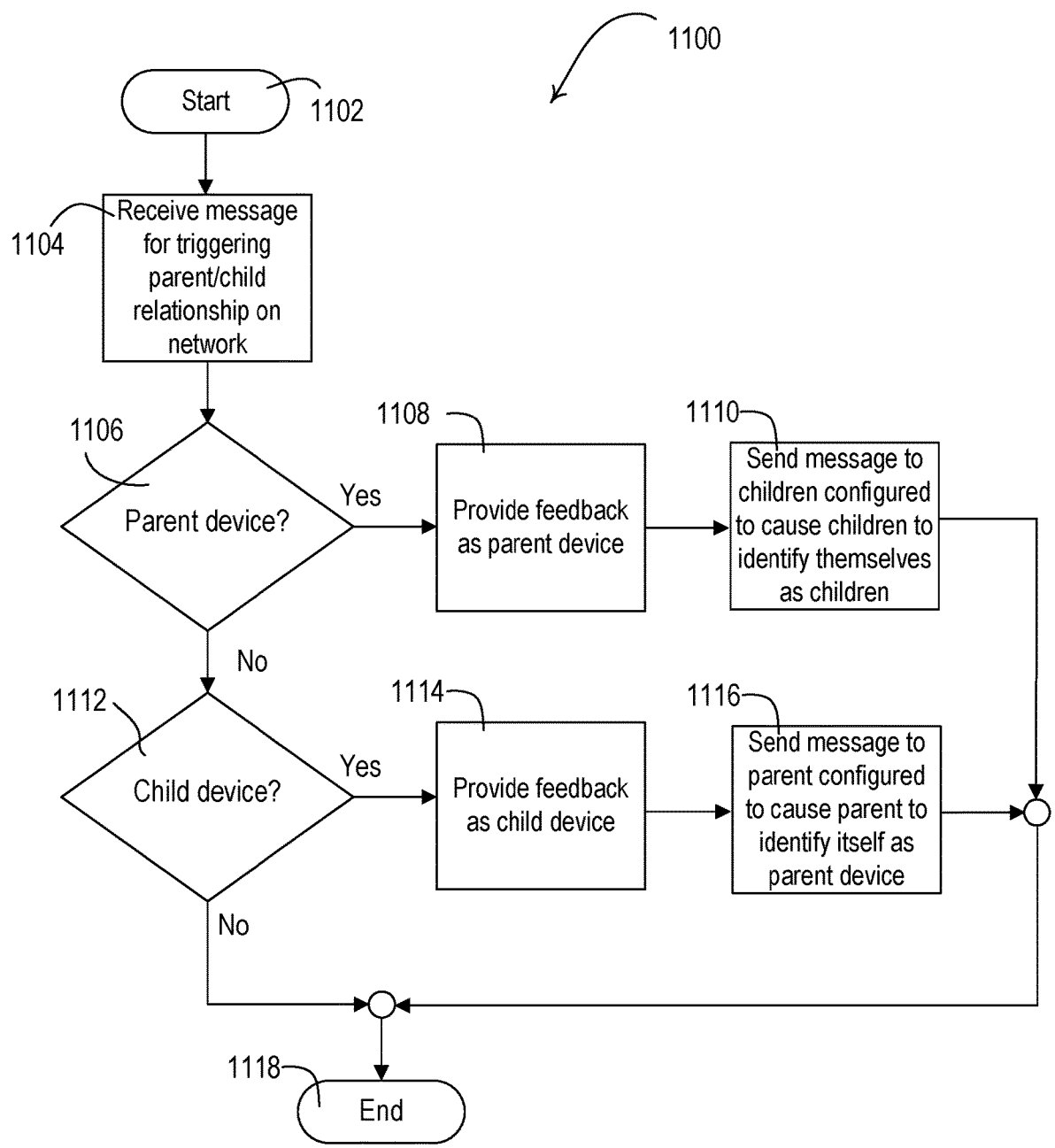
FIG. 11A is a flowchart depicting an example procedure for identifying a parent or child role of a control device in a network.

The lighting control devices may provide feedback to indicate other roles in the network. For example, the lighting control devices may be illuminated (e.g., a different color, intensity, or otherwise illuminated) to identify a parent or child role in the network. FIG. 11A is a flowchart depicting an example procedure 1100 for identifying a parent or child role of control devices in a network. For example, the control device may be a lighting control device. The lighting control device may control an amount of power provided to lighting loads of a lighting fixture. The lighting control device may be assigned a role in the network. For example, the lighting control device may be a parent device (e.g., a leader device or a router device attached to a child end device) or a child device (e.g., an end device attached to a parent router device). The procedure 1100 may be performed by the control circuit of the lighting control device upon reception of a triggering event. The triggering event may be a feedback message from a user device (e.g., a mobile device) and/or a system controller configured to cause the lighting control device to enter a feedback mode to provide feedback indicating that the lighting control device is a parent device or a child device. Though messages from the user device or the system controller are provided as examples for triggering feedback at the lighting control device, the lighting control devices may provide feedback based on other triggering criteria (e.g., in response to occupancy conditions, the RSSI value of the feedback message, or other messages or signals) as described herein.

The procedure 1100 may begin at 1102. At 1104, the control circuit of the lighting control device may receive a feedback message for triggering identification of the lighting control device's parent or child role on the network. For example, the feedback message may trigger the lighting control device to identify itself as a parent device or a child device. The control circuit of the lighting control device may receive the feedback message from a user device (e.g., directly) and/or from a system controller via a communication circuit. The user device may transmit the feedback message to the lighting control device using a wireless communication protocol. The system controller may transmit the message to the lighting control device via a wireless or wired communication.

The feedback message may be transmitted from the user device in response to a user pressing a button on the user device in an application that is configured to cause the lighting control device to identify its parent or child role. The feedback message may be transmitted as a multicast message that requests the lighting control devices that receive the feedback message to identify their parent or child role. The feedback message may be transmitted directly from the user device or the system controller to cause a specific lighting control device to identify its parent or child role. For example, the feedback message may be transmitted as a unicast message that includes a unique identifier of the lighting control device and operates as a request for the lighting control device to identify its role as a parent or child device.

The parent or child role feedback may be provided after a device has already provided feedback indicating another role. For example, after a lighting control device has identified its role as a leader device, router device, or end device (e.g., as illustrated in the procedures 400, 420), a user may select a particular lighting control device on the user device and transmit (e.g., from the user device) a unicast message to a particular lighting control device to identify the device's role as a parent or child device, and/or the parent device or children devices associated with the selected lighting control device.

Upon reception of the feedback message at 1104, the control circuit of the lighting control device may determine from the network information stored in memory whether the lighting control device is a parent device at 1106. Leader devices and router devices that are attached to one or more end devices may operate as parent devices. A parent device may be attached to one or more child devices. If the control circuit of the lighting control device determines that it is a parent device at 1106, the control circuit of the lighting control device may provide feedback that indicates that the lighting control device is a parent device at 1108. The feedback may be indicated by changing a state of the lighting loads controlled by the lighting control device. For example, the feedback may be indicated by illuminating the lighting load a color or intensity. For example, the control circuit of the lighting control device may cause the lighting loads to illuminate a first color (e.g., blue) to indicate that the lighting control device is a parent device. Additionally and/or alternatively, the feedback may be indicated by increasing a spectral power value of the emitted light within a predefined band of wavelength above a predefined threshold.

At 1110, the control circuit of the lighting control device may send a feedback message to its children that is configured to cause its children to identify themselves as a child device in the network. For example, the feedback message may be sent directly to the lighting control devices that are children of the parent device (e.g., as a unicast message that includes the unique identifier of the child devices). The feedback message may be sent as a multicast message that includes the unique identifier of the parent device. The feedback message may be sent as a request that each lighting control device identify itself as a child device if it recognizes the unique identifier as being associated with its parent on the network. The children may identify themselves by changing a state of their lighting loads. For example, each child device may identify itself by changing the intensity and/or color of the lighting loads. For example, each child device may cause the lighting loads to illuminate a second color (e.g., green). In another example, each child device may identify itself by causing the lighting loads to illuminate the first color at a different intensity than is used to indicate the parent device (e.g., using a gradient). Additionally and/or alternatively, the feedback may be indicated by increasing a spectral power value of the emitted light within a predefined band of wavelength above a predefined threshold. The predefined band of wavelength and/or the predefined threshold may be different than the predefined threshold and/or the predefined band of wavelength that is used to indicate the parent devices. The procedure 1100 may end at 1118.

If the control circuit of the lighting control device determines that it is a child device at 1112, the lighting control device may provide feedback that indicates that the lighting control device is a child device at 1114. The feedback may be indicated by changing a state of the lighting loads controlled by the lighting control device. For example, the feedback may be indicated by illuminating the lighting load an intensity or color. The control circuit of the lighting control device may cause the lighting loads to illuminate a second color (e.g., green) to indicate that the lighting control device is a child device. In another example, the control circuit of the lighting control device may cause the lighting loads to illuminate the first color at a different intensity than is used to indicate the parent device (e.g., using a gradient). Additionally and/or alternatively, the feedback may be indicated by increasing a spectral power value of the emitted light within a predefined band of wavelength above a predefined threshold. The predefined band of wavelength and/or the predefined threshold may be different than the predefined threshold and/or the predefined band of wavelength that is used to indicate the parent device.

At 1116, the control circuit of the lighting control device may send a feedback message to its parent device via a communication circuit that is configured to cause the parent device to identify itself as the parent device of the lighting control device. For example, the feedback message may be sent directly to the lighting control device that is the parent of the child device (e.g., as a unicast message that includes the unique identifier of the parent device). The feedback message may be sent as a multicast message that includes the unique identifier of the child device. The feedback message may be sent as a request that the lighting control device identify itself as a parent device of the device having the unique identifier in the feedback message. The parent device may identify itself by changing a state of the lighting loads controlled by the parent device. For example, the parent device may identify itself by illuminating the lighting loads an intensity and/or color. The parent device may cause the lighting loads to illuminate the first color to identify the parent device. The parent may identify itself by causing the lighting loads to illuminate the second color at a different intensity than is used to indicate the child device (e.g., using a gradient). Additionally and/or alternatively, the feedback may be indicated by increasing a spectral power value of the emitted light within a predefined band of wavelength above a predefined threshold. The predefined band of wavelength and/or the predefined threshold may be different than the predefined threshold and/or the predefined band of wavelength that is used to indicate the child device. The procedure 1100 may end at 1118.

Using the procedure 1100, parent devices and child devices may be separately identified, such that the user may identify the parent router devices for a selected child device or the children of a selected parent device. The user may select the parent or child device on the user device and send a message to the device to trigger the corresponding feedback, or send a general message to the devices to show their parent or child role.

Figure 11B:
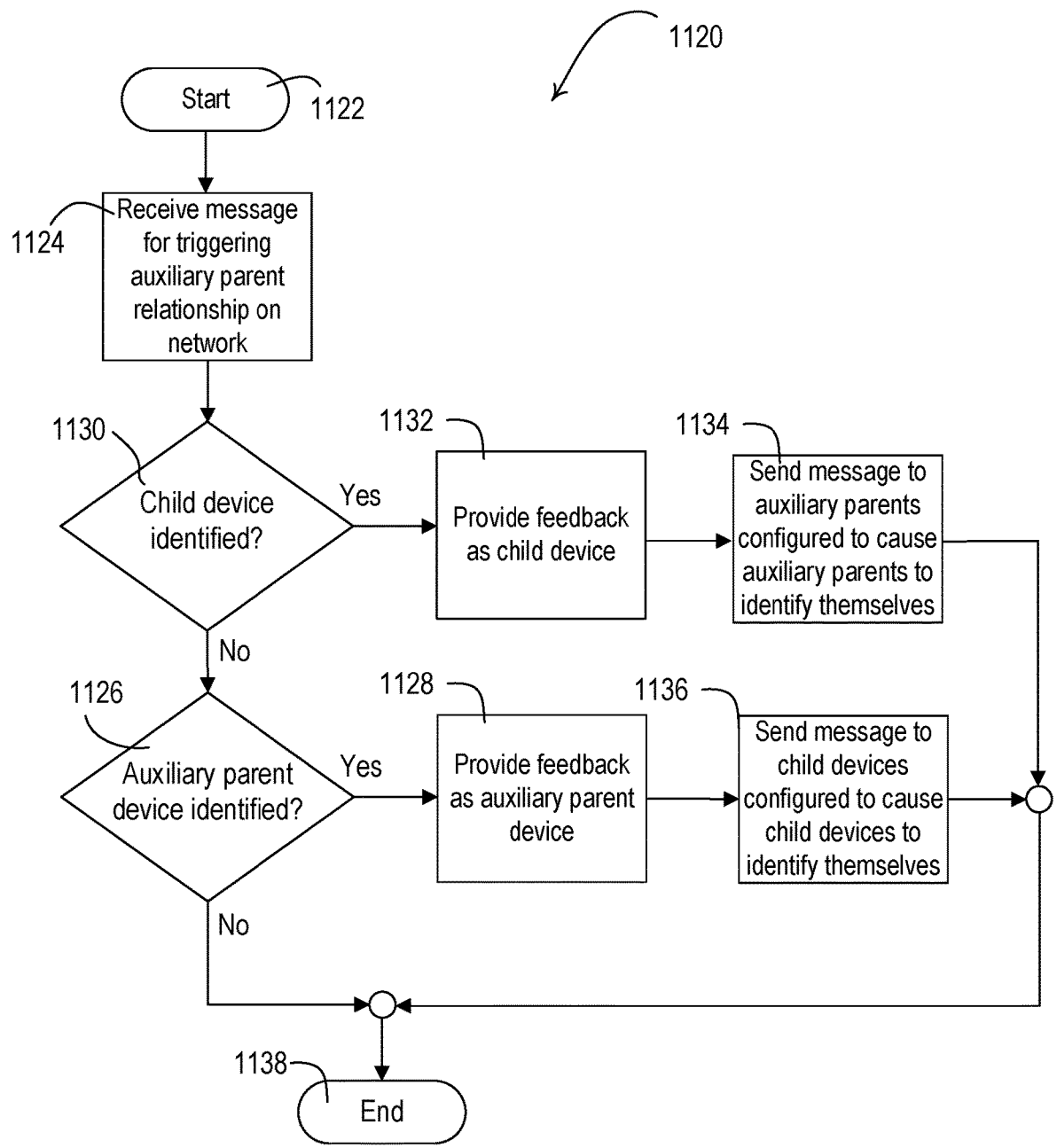
FIG. 11B is a flowchart depicting an example procedure for identifying a network role of a control device as an auxiliary parent of a child device in a network.

As described herein, an end device may transmit messages out via a single parent device on the network, but may hear messages on the network from multiple auxiliary parent devices. The end device may hear advertisement messages from many auxiliary parents for updating locally stored network information and improving communications on the network. FIG. 11B is a flowchart depicting an example procedure 1120 for identifying a role of a control device as an auxiliary parent of a child device in a network. For example, the control device may be a lighting control device. The lighting control device may control an amount of power provided to lighting loads of a lighting fixture. The lighting control device may be assigned a role in the network. For example, the lighting control device may be an auxiliary parent device or a child device configured to hear massages (e.g., advertisement messages) from the auxiliary parent device. Leader devices and router devices that are attached to one or more end devices may operate as auxiliary parent devices.

The procedure 1120 may begin at 1122. The procedure 1120 may be performed by a lighting control device upon reception of a triggering event. The triggering event may be a feedback message received at 1124 from a user device (e.g., a mobile device), a system controller, and/or another control device. For example, at 1124, a child device or an auxiliary parent may receive the feedback message from the user device and/or the system controller for triggering identification of the lighting control device's role as a child device on the network. A user may initiate the transmission of the feedback message from a user device and/or a system controller by selection of a button on the user device. The feedback message may be configured to cause one or more lighting control devices to provide feedback indicating auxiliary parent relationship(s) on a network. For example, the feedback message may be transmitted to and received by a child device or an auxiliary parent device on the network at 1124. The feedback message may be received at 1124 as a unicast message that includes the unique identifier of the lighting control device. The feedback message may cause the child device or the auxiliary parent device to which the feedback message is sent to identify its role in the network. The feedback message may also cause a child lighting control device to send another feedback message to its auxiliary parent devices triggering identification of its auxiliary parent devices. The feedback message may cause an auxiliary parent device to send another feedback message to its child devices that hear messages (e.g., advertisement messages) from the auxiliary parent device. The feedback messages may be transmitted and/or received using a wireless communication protocol (e.g., the BLUETOOTH® communication protocol, the BLUETOOTH® low energy (BLE) communication protocol, the THREAD™ protocol, the AWS™ protocol, or another wireless communication protocol).

If a control circuit of the lighting control device receives the feedback message at 1124 and determines that the message is directed to the lighting control device (e.g., the feedback message includes the unique identifier of the lighting control device), the control circuit of the lighting control device may identify its role as a child device or an auxiliary parent device from the network information stored in memory. If the control circuit of the lighting control device is determined to be a child device at 1130, the control circuit of the lighting control device may provide feedback at 1132 identifying the lighting control device as a child device. The feedback may be indicated by changing a state of the lighting loads controlled by the lighting control device. For example, the feedback may be indicated by changing the intensity and/or color of the lighting loads. The control circuit of the lighting control device may cause the lighting loads to illuminate a first color (e.g., green) to indicate that the lighting control device is a child device in the network. In another example, the control circuit of the lighting control device may cause the lighting loads to be illuminated in the first color at an intensity that is used to indicate the lighting control device is a child device in the network (e.g., using a gradient). Additionally and/or alternatively, the feedback may be indicated by increasing a spectral power value of the emitted light within a predefined band of wavelength above a predefined threshold.

At 1134, the control circuit of the lighting control device may send another feedback message to its auxiliary parent device(s) that is configured to cause the auxiliary parent devices to identify themselves as the auxiliary parent devices of the child lighting control device. The control circuit of the lighting control device may send a single multicast feedback message that is received by each of its auxiliary parent devices. The multicast feedback message may include the unique identifier of the child device and/or the identifiers of the auxiliary parent devices of the child device (e.g., auxiliary parent devices from which advertisement messages may be heard), such that the auxiliary parent devices may receive the feedback message and identify themselves as the auxiliary parents of the child lighting control device. In another example, the child lighting control device may send a unicast feedback message to each of the auxiliary parent devices of the child lighting control device.

The multicast feedback messages and/or the unicast feedback messages may be received by an auxiliary parent device and the auxiliary parent device may identify themselves as an auxiliary parent device of the child lighting control device. The auxiliary parent device may identify itself as an auxiliary parent based on its unique identifier being identified in the feedback message received from the child device. In another example, the auxiliary parent device may identify the feedback message received at 1124 as being transmitted from a child device of which it is an auxiliary parent device on the network (e.g., child device capable of hearing advertisement messages from the lighting control device), the unique identifier of which may be stored locally at the auxiliary parent, and the auxiliary parent device may provide feedback in the form of a color and/or intensity to indicate its role as the auxiliary parent device.

The feedback message received at 1124 may be configured to cause an auxiliary parent device to identify itself to a user or user device by changing a state of the lighting loads controlled by the auxiliary parent device. If the lighting control device is an auxiliary parent device, the lighting control device may determine it is an auxiliary parent device at 1126 and provide feedback indicating the lighting control device is an auxiliary parent device at 1128. For example, the auxiliary parent device may identify itself by changing the intensity and/or color of the lighting loads. The auxiliary parent device may cause the lighting loads to illuminate a second color (e.g., red) to identify the auxiliary parent device. The auxiliary parent device may identify itself by causing the lighting loads to illuminate the first color (e.g., green) at a different intensity than is used to indicate the child lighting control device (e.g., using a gradient). Additionally and/or alternatively, the feedback may be indicated by increasing a spectral power value of the emitted light within a predefined band of wavelength above a predefined threshold. The predefined band of wavelength and/or the predefined threshold may be different than the predefined threshold and/or the predefined band of wavelength that is used to indicate the child device.

At 1136, the control circuit of the lighting control device may send another feedback message to child devices configured to cause the child devices to identify themselves. The feedback message that is sent at 1136 may be sent as a multicast message via the communication circuit and each child device that receives the message may compare the unique identifier in the feedback message with the unique identifiers of its auxiliary parents. Each child device of the auxiliary parent may identify themselves as child devices that receive messages (e.g., advertisement messages) from the lighting control device from which the feedback message is received by illuminating the lighting load a color and/or intensity level. Additionally and/or alternatively, the feedback may be indicated by increasing a spectral power value of the emitted light within a predefined band of wavelength above a predefined threshold. The predefined band of wavelength and/or the predefined threshold may be different than the predefined threshold and/or the predefined band of wavelength that is used to indicate the parent device. The procedure 1120 may end at 1138.

As described herein, the network information stored at devices in the network may include information about the roles of the devices in the network. As also described herein, the network information may include information indicating the quality of communications in the network. For example, the network information may include link quality for communications between control devices in the network. The link quality between control devices in the network may, however, be difficult for a user configuring the load control system to identify. The link quality may be particularly difficult to identify after the initial commissioning of a load control system, as devices are added to the network and items in the space are added or moved around and may cause interference for communications between devices on the network. The link quality may be tested by a user, but the link quality may vary over time as the network changes and the link quality tested by the user may be the link quality at a snapshot in time, which may even be more misleading than helpful for configuring the network communications in the load control system.

Figure 12A:
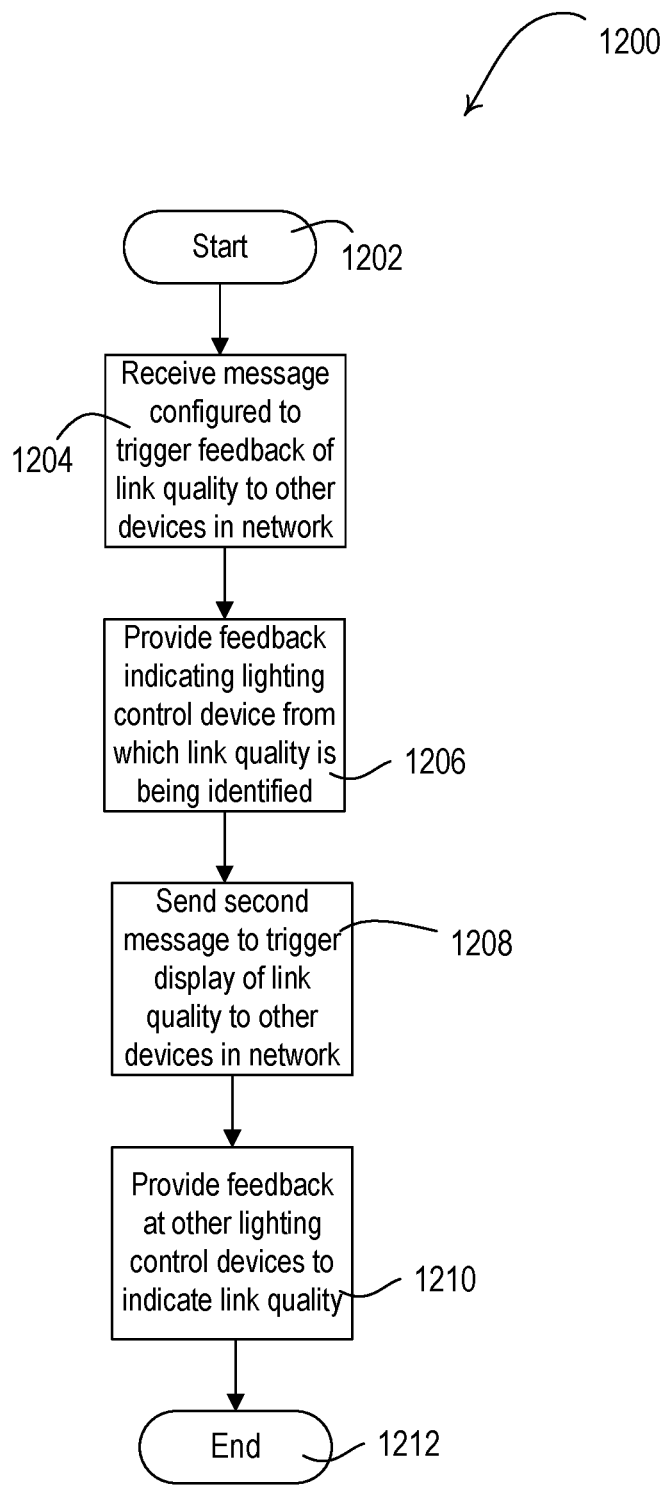
FIGS. 12A and 12B are flowcharts depicting example procedures for identifying link quality between devices in a network.

FIG. 12A is a flowchart depicting an example procedure 1200 for identifying link quality between a control device and one or more other control devices on a network. For example, the control device may be a lighting control device. The lighting control device may control an amount of power provided to lighting loads of a lighting fixture. The lighting control device may share a direct communication link with one or more other control devices (e.g., lighting control devices) in the network. For example, the lighting control device may be a parent device (e.g., a leader device and/or a router device) that has one or more child devices (e.g., end devices) attached to it, or the lighting control device may be a child device that is attached to one or more parent devices. The lighting control device may also be a router device (e.g., leader device or another router device) that shares a direct communication link with another router device (e.g., leader device or another router device). The procedure 1200 may be performed by one or more lighting control device upon reception of a triggering event. The reception of the triggering event may cause the lighting control device to enter a feedback mode. The triggering event may be reception of a feedback message from a user device (e.g., a mobile device) and/or a system controller. Though messages from the user device or the system controller are provided as examples for triggering feedback at the lighting control device, the lighting control devices may provide feedback based on other triggering criteria (e.g., in response to occupancy conditions, the RSSI value of the feedback message, or other messages or signals) as described herein.

The procedure 1200 may begin at 1202. At 1204, a control circuit of the lighting control device may receive a feedback message for triggering feedback of link quality between the lighting control device and one or more other lighting control devices on the network. For example, the lighting control device may receive the feedback message from a user device (e.g., directly) and/or from a system controller. The feedback message may be sent as a unicast message that includes the unique identifier of the lighting control device from which the link quality is to be identified. The feedback message may include the type of link quality to be identified (e.g., link quality out (LQO) or link quality in (LQI)), or the type of link quality to be identified may be preprogrammed at the lighting control devices. For example, the user may select the type of link quality to be identified at the user interface of the user device and the type of link quality may be sent in the feedback message. The user device may transmit the feedback message to the lighting control device using a wireless communication protocol. The system controller may transmit the feedback message to the lighting control device via a wireless or wired connection.

After reception of the feedback message at 1204, the control circuit of the lighting control device may provide feedback indicating that it is the lighting control device from which the link quality is identified. The feedback may be indicated by changing a state of the lighting loads controlled by the lighting control device. For example, the feedback may be indicated by changing the intensity and/or color of the lighting loads. The lighting control device may cause the lighting loads to illuminate a first color (e.g., blue) to indicate that the lighting control device is the device from which the link quality is being identified. In another example, the lighting control device may cause the lighting loads to illuminate the first color at a different intensity. Additionally and/or alternatively, the feedback may be indicated by increasing a spectral power value of the emitted light within a predefined band of wavelength above a predefined threshold.

After reception of the feedback message at 1204, the control circuit of the lighting control device may send a second feedback message, at 1208, to one or more other lighting control devices on the network. For example, the lighting control device may be a router device (e.g., a leader device or another router device), and the second feedback message may be sent to other router devices (e.g., leader device and/or other router devices). In another example, the lighting control device may be an end device attached to a router device. The second feedback message may be configured to trigger feedback of link quality on the direct communication link between the lighting control device that sent the second feedback message and the lighting control devices in the network that received the feedback message at 1204. The second feedback message may be sent as a multicast message that includes the unique identifier of the lighting control device from which the second feedback message was sent at 1208. The control circuit of the lighting control devices that receive the second feedback message may determine that they are to provide feedback if they share a direct communication link with the lighting control device that sent the second feedback message. The lighting control devices that respond to the second feedback message may be the devices that have an identified link quality for the direct communication link stored in network information. The second feedback message may be sent as a unicast message that includes the unique identifier of the lighting control device configured to receive the second feedback message. For example, the lighting control device that sends the second feedback message at 1208 may identify the devices with which it shares a direct communication link (e.g., the devices that have an identified link quality for the direct communication link stored in network information) and send a unicast message to each of these devices for providing feedback.

One or more lighting control devices may provide feedback at 1210 that identifies the link quality for communications on the direct communication link with the device that sent the second feedback message at 1208. The second feedback message may include the type of link quality to be identified (e.g., link quality out (LQO) or link quality in (LQI)), or the type of link quality to be identified may be preprogrammed at the lighting control devices. The link quality (e.g., LQI and/or LQO) may be calculated as a predefined number that is within a range indicating different link qualities for the communication link between two devices. For example, the link quality may be indicated by values of 0, 1, 2, or 3. The other control devices may display the link quality as an intensity and/or color. For example, each link quality value may be represented by a different color and/or intensity. A first color (e.g., red) may represent a poor link quality, a second color (e.g., yellow) may represent a relatively better link quality than the first color, a third color (e.g., blue) may represent a relatively better link quality than the second color, and a fourth color (e.g., green) may represent a highest link quality. A gradient between two colors (e.g., between the first and fourth color) may be used to indicate the link quality. For example, the link quality may be represented as a heat map, with different colors used to represent different link qualities between the device that sent the feedback message and the other control devices. A first intensity (e.g., a lowest intensity) may be used to indicate a poor link quality, and a second intensity (e.g., a highest intensity) may be used to indicate a high link quality. A gradient between the first intensity and the second intensity may be used to indicate the link quality. Additionally and/or alternatively, the feedback may be indicated by increasing a spectral power value of the emitted light within a predefined band of wavelength above a predefined threshold. Differing predefined bands of wavelength and/or predefined thresholds may be used to indicate different link qualities. The link quality may be current link quality or a link quality over a given period of time. For example, the link quality may be an average link quality over a given period of time. The procedure 1200 may end at 1210.

Figure 12B:
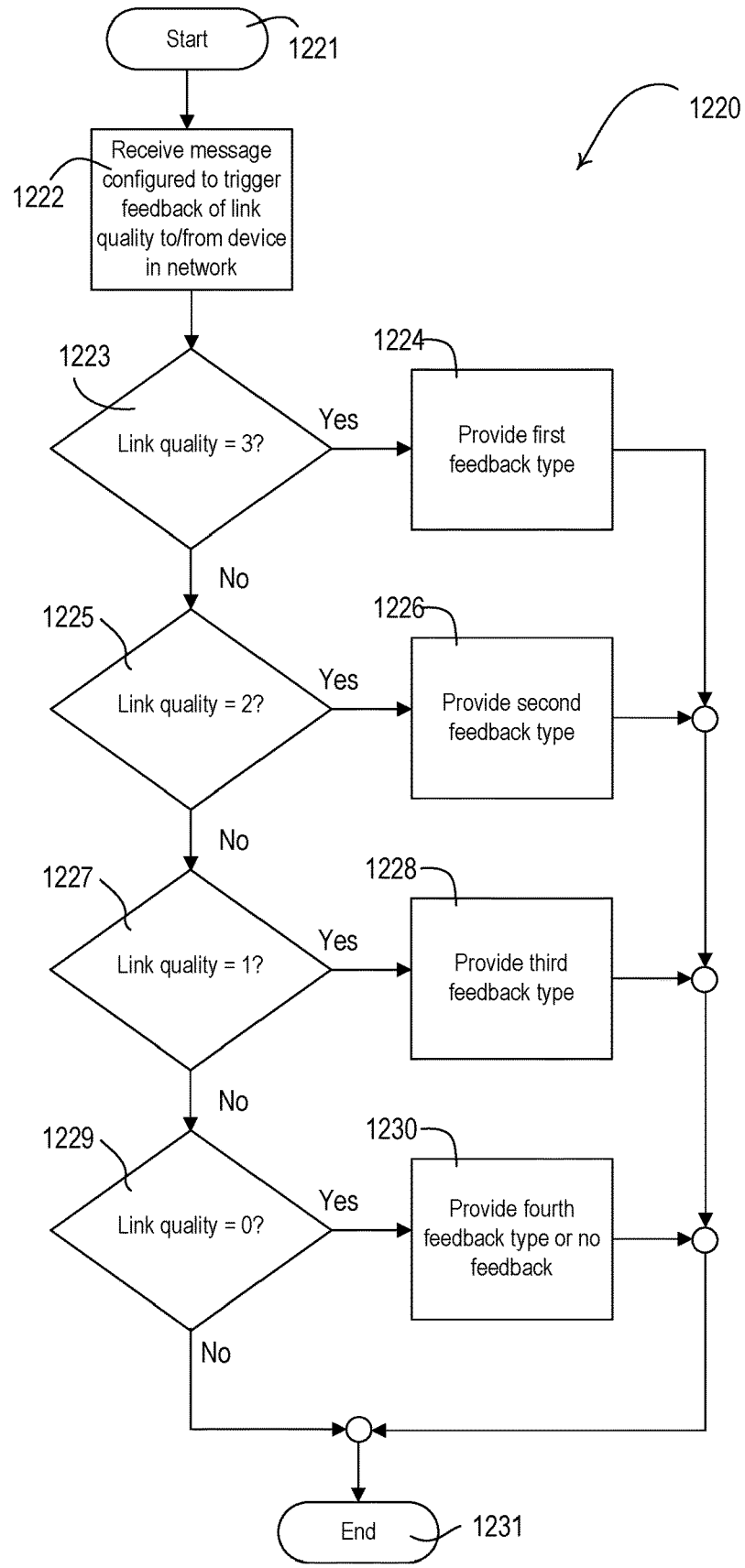

As illustrated in FIG. 12A, different types of feedback may be provided to identify the link quality between control devices in a network. FIG. 12B is a flowchart depicting an example procedure 1220 for identifying link quality between control devices in a network. For example, the control devices may be lighting control devices. The lighting control device that performs the procedure 1220 may control an amount of power provided to lighting loads of a lighting fixture. The procedure 1220 may be performed by the control circuit of the lighting control device in response to a triggering event. The triggering event may be reception of a feedback message from another lighting control device (e.g., router or end device as described with reference to FIG. 12A), a user device (e.g., a mobile device) and/or a system controller to cause the lighting control device to enter a feedback mode. The procedure 1220 may be used to generate a heat map representing the link quality between a first lighting control device and other lighting control devices in the network (e.g., to which the first lighting control device is attached). For example, the first lighting control device may be illuminated a first color, while each of the other lighting control devices may be illuminated in a color that is associated with the respective link quality between the first lighting control device and the other lighting control device.

The procedure 1220 may begin at 1221. At 1222, the lighting control device may receive a message for triggering feedback of link quality between the lighting control device and another control device on the network. For example, the lighting control device may receive the feedback message from another lighting control device in the network. The feedback message may be received from the other lighting control device as a unicast message or a multicast message. For example, the feedback message may be received from another lighting control device as described herein (e.g., with reference to FIG. 12A). The lighting control device may receive the feedback message at 1222 and may determine its link quality (e.g., link quality out (LQO) or link quality in (LQI)) on the direct communication link for communicating with the lighting control device from which the feedback message was received. When a first lighting control device sends a feedback message to trigger feedback indicating for the link quality to be provided at a second lighting control, the first lighting control device may also provide feedback indicating that it is the device from which the link quality is being indicated.

In another example, the lighting control device may receive the feedback message at 1222 from a user device (e.g., directly) and/or from a system controller. The feedback message may be received as a unicast message or a multicast message to trigger the lighting control device to provide a link quality with an identified control device in the network. The feedback message itself may identify the unique identifier of a second control device in the network for which the lighting control device is to provide feedback that indicates the link quality for communicating messages with the second control device. The lighting control device may identify its link quality with the identified control device in the feedback message for being provided as feedback to the user or the user device of the user. The user device may transmit the feedback message to the lighting control device using a wireless communication protocol. The system controller may transmit the feedback message to the control device via a wireless or wired connection. When a first lighting control device receives a feedback message to trigger feedback indicating for the link quality between the first lighting control device and a second lighting control device, the first lighting control device may also send a feedback message to the second lighting control device to cause the second lighting control device to provide feedback indicating that it is the device from which the link quality is being indicated.

After receiving the feedback message at 1222, the control circuit of the lighting control device may determine a link quality (e.g., LQI and/or LQO) between the lighting control device and the identified device (e.g., from which the feedback message was received or as otherwise identified in the feedback message). The link quality (e.g., LQI and/or LQO) may be determined from the network information stored in memory at the lighting control device. The link quality may be calculated as a predefined number that is within a range indicating different link qualities for the communication link between two devices. For example, the link quality may be indicated by values of 0, 1, 2, or 3. At 1223, the control circuit of the lighting control device may determine whether the link quality is equal to 3. For example, the control circuit of the lighting control device may determine that the link quality is equal to 3 when the RSSI value of one or more advertisement messages between the lighting control device and the identified control device is at least a link margin of 20 dB above a receive level (e.g., a noise floor). If the control circuit of the lighting control device determines at 1223 that the link quality is equal to 3, the control circuit of the lighting control device may provide a first feedback type that indicates that the link quality is equal to 3 at 1224. The feedback may be indicated by changing a state of the lighting loads controlled by the lighting control device. For example, the feedback may be indicated by changing the intensity and/or color of the lighting loads. The control circuit of the lighting control device may cause the lighting loads to be illuminated in a first color (e.g., green) to indicate that the link quality is equal to 3. Additionally and/or alternatively, the feedback may be indicated by increasing a spectral power value of the emitted light within a predefined band of wavelength above a predefined threshold. The procedure 1220 may end at 1231.

If the control circuit of the lighting control device determines from the network information that the link quality is equal to 2 at 1225, the control circuit of the lighting control device may provide a second feedback type that indicates that the link quality is equal to 2 at 1226. The control circuit of the lighting control device may calculate that the link quality is equal to 2 when the RSSI value of one or more advertisement messages between the lighting control device and the identified control device is at least a link margin of 10 dB above a receive level (e.g., a noise floor) and less than 20 dB above the receive level (e.g., noise floor). The feedback may be indicated by changing a state of the lighting loads controlled by the lighting control device. For example, the feedback may be indicated by changing the intensity and/or color of the lighting loads. The lighting control device may cause the lighting loads to illuminate a second color (e.g., yellow, greenish-red, etc.) to indicate that the link quality is equal to 2. Alternatively, the lighting control device may cause the lighting loads to illuminate the first color at a different intensity (e.g., a lower intensity) than that used to indicate a link quality of 3. Additionally and/or alternatively, the feedback may be indicated by increasing a spectral power value of the emitted light within a predefined band of wavelength above a predefined threshold. The predefined band of wavelength and/or the predefined threshold may be different than the predefined threshold and/or the predefined band of wavelength that is used to indicate a link quality of 3. The procedure 1220 may end at 1231.

If the control circuit of the lighting control device determines from the network information that the link quality is equal to 1 at 1227, the lighting control device may provide a third feedback type that indicates that the link quality is equal to 1 at 1228. The control circuit of the lighting control device may calculate that the link quality is equal to 1 when the RSSI value of one or more advertisement messages between the lighting control device and the identified control device is at least a link margin of 2 dB above a receive level (e.g., a noise floor) and less than 10 dB above the receive level (e.g., noise floor). The feedback may be indicated by changing a state of the lighting loads controlled by the lighting control device. For example, the feedback may be indicated by changing the intensity and/or color of the lighting loads. The lighting control device may cause the lighting loads to illuminate a third color (e.g., orange, red, etc.) to indicate that the link quality is equal to 1. Alternatively, the lighting control device may cause the lighting loads to illuminate the first color, at a different intensity (e.g., a lower intensity) than the intensities used to indicate a link quality of 3 and a link quality of 2. Additionally and/or alternatively, the feedback may be indicated by increasing a spectral power value of the emitted light within a predefined band of wavelength above a predefined threshold. The predefined band of wavelength and/or the predefined threshold may be different than the predefined thresholds and/or the predefined bands of wavelength that are used to indicate a link quality of 3 and a link quality of 2. The procedure 1220 may end at 1231.

If the control circuit of the lighting control device determines from the network information that the link quality is equal to 0 at 1229, the lighting control device may provide a fourth feedback type that indicates that the link quality is equal to 0 at 1230. For example, the lighting control device may calculate that the link quality is equal to 0 when the link quality is unknown or when the RSSI value of one or more advertisement messages is unable to be determined above the noise floor. The feedback may be indicated by changing a state of the lighting loads controlled by the lighting control device. For example, the feedback may be indicated by changing the intensity and/or color of the lighting loads. The control circuit of the lighting control device may cause the lighting loads to illuminate a fourth color (e.g., red) to indicate that the link quality is equal to 0. Alternatively, the lighting control device may cause the lighting loads to illuminate the first color, at a different intensity (e.g., a lower intensity) than the intensities used to indicate a link quality of 3, a link quality of 2, and/or a link quality of 1. Additionally and/or alternatively, the feedback may be indicated by increasing a spectral power value of the emitted light within a predefined band of wavelength above a predefined threshold. The predefined band of wavelength and/or the predefined threshold may be different than the predefined thresholds and/or the predefined band of wavelengths that are used to indicate a link quality of 3, a link quality of 2, and/or a link quality of 1.

The control device may indicate that the link quality is equal to 0 by not providing feedback of any type. For example, the lighting control device may maintain its state prior to indicating a link quality. The link quality may be equal to 0 when the lighting control device does not have a direct communication link with the identified control device for which the link quality may be indicated, such that the lighting control devices having a direct communication link with the identified control device provide feedback to the user or user device. The procedure 1220 may end at 1231.

Though the procedure 1220 may use link quality indicators from 0-3, feedback may similarly be provided for different values indicating link quality. For example, link quality may be provided for any range of values by changing the color or dimming level of the lighting load of a lighting control device as the link quality changes. Additionally, although the procedure 1220 is used to provide feedback when the link quality is equal to a given value, the procedure 1220 may similarly be implemented to provide different types of feedback when the link quality is greater than or less than different link quality thresholds. For example, the control circuit of the lighting control device may determine at 1223, 1225, 1227, and/or 1229 whether the link quality is above or below the given thresholds (e.g., link quality threshold $TH_{LQ1}$ may be set to 3, link quality threshold $TH_{LQ2}$, may be set to 2, link quality threshold $TH_{LQ3}$ may be set to 1, and link quality threshold $TH_{LQ4}$ may be set to 0). The different types of feedback may be provided when the link quality is above or below the given thresholds.

As described herein, the link quality between two devices in the network may be used to determine the overall path cost for communicating messages from a sending device to a receiving device in the network. The network information may be stored at each device in the network with the path cost for communicating messages from the device to other devices in the network. The path cost for communicating messages from a sending device to a receiving device in the network may, however, be difficult for a user configuring the load control system to identify. The path cost may be particularly difficult to identify after the initial commissioning of a load control system, as devices are added to the network and items in the space are added or moved around and may cause interference for communications between devices on the network. The path cost may be extracted from a device on the network by a user, but the path cost may vary over time as the network changes and the path cost identified by a user may be the path cost at a snapshot in time, which may even be more misleading than helpful for configuring the network communications in the load control system.

Figure 12C:
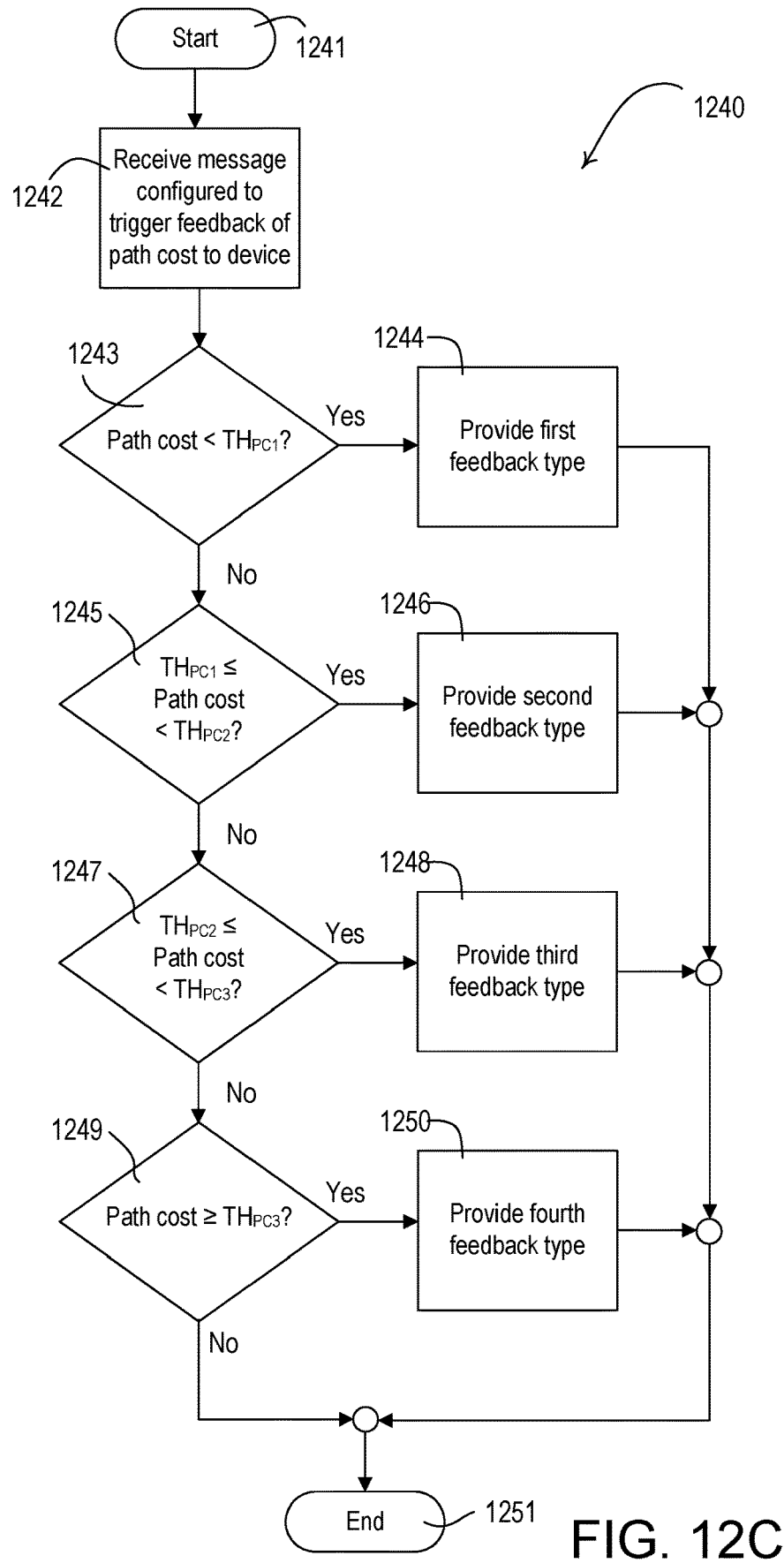
FIG. 12C is a flowchart depicting an example procedure for identifying a path cost between a control device and a leader device on a network.

FIG. 12C is a flowchart depicting an example procedure 1240 for identifying a path cost between a control device and another device in the network (e.g., a leader device or another device in a network). For example, the control device may be a lighting control device. The lighting control device may control an amount of power provided to lighting loads of a lighting fixture. The procedure 1240 may be performed by the control circuit of the lighting control device upon identification of a triggering event. The triggering event may be receipt of a feedback message from a user device (e.g., a mobile device) and/or a system controller that causes the lighting control device to enter a feedback mode. The procedure 1240 may be used to generate a heat map representing the path cost between a first lighting control device and other lighting control devices in the network. For example, the first lighting control device may be illuminated a first color, while each of the other lighting control devices may be illuminated in a color that is associated with the respective path cost for the path from the first lighting control device to the other lighting control device.

The procedure 1240 may begin at 1241. At 1242, the control circuit of the lighting control device may receive a feedback message for triggering feedback of the path cost between the lighting control device and another device. For example, the feedback message may be configured to trigger the lighting control device to provide feedback indicating the path cost to the leader device or another device in the network. The unique identifier of the device for which the path cost is to be indicated in the feedback may be included in the feedback message or the device for which the path cost is to be indicated in the feedback may be preprogrammed at the lighting control device (e.g., path cost to leader device stored in memory). The lighting control device may receive a feedback message at 1242 that is from a user device (e.g., directly) and/or from a system controller. The feedback message may be communicated as a unicast message to the lighting control device, or as a multicast message to trigger the feedback of the path cost at multiple lighting control devices in the space. The user device may transmit the message to the lighting control device using a wireless communication protocol. The system controller may transmit the message to the lighting control device via a wireless or wired connection. Though messages from the user device or the system controller are provided as examples for triggering feedback at the lighting control device, the lighting control devices may provide feedback based on other triggering criteria (e.g., in response to occupancy conditions, the RSSI value of the feedback message, or other messages or signals) as described herein.

After receiving the feedback message at 1242, the control circuit of the lighting control device may determine the feedback to be provided for the path cost to the identified device in the network (e.g., leader device or other device identified in the network). As described herein, the control circuit of the lighting control device may calculate the path cost to other devices in the network based on advertisement messages that are received. The path cost may indicate the relative cost or loss of communications on an entire communication path that may include one or more router devices. The control circuit of the lighting control device may store the path cost information in memory in the network information. The path cost information may include the path cost between one or more router devices in the network, including the leader device. For example, the path cost may indicate the overall cost for communicating a message from a starting router device to an ending router device. As the path cost may indicate the cost of communications between router devices, the lighting control device may be a router device that indicates the path cost for communicating messages to the identified ending router device, or the lighting control device may indicate the path cost of its parent router device for communicating messages to the identified ending router device. If the lighting control device is an end device, the control circuit of the lighting control device may indicate the path cost to the identified ending router device based on the path cost from its parent router device and the link quality for communications between the lighting control device and its parent router device.

At 1243, the control circuit of the lighting control device may determine whether the path cost is lower than a first path cost threshold (e.g., $TH_{PC1}$). If the lighting control device determines at 1243 that the path cost is lower than the first path cost threshold $TH_{PC1}$, the lighting control device may provide a first feedback type that indicates that the path cost is lower than the first path cost threshold $TH_{PC1}$ at 1244. The feedback may be indicated by changing a state of the lighting loads controlled by the lighting control device. For example, the feedback may be indicated by changing the intensity and/or color of the lighting loads. The lighting control device may cause the lighting loads to be illuminated a first color (e.g., green) to indicate that the path cost is lower than the first path cost threshold $TH_{PC1}$. Additionally and/or alternatively, the lighting control device may increase a spectral power value of the emitted light within a predefined band of wavelength above a predefined threshold to indicate that the path cost is lower than the first path cost threshold $TH_{PC1}$. The procedure 1240 may end at 1251.

If the control circuit of the lighting control device determines that the path cost is not less than the first path cost threshold $TH_{PC1}$, the control circuit of the lighting control device may determine that the path cost is greater than the first path cost threshold $TH_{PC1}$. For example, the lighting control device may determine, at 1245, that the path cost is greater than or equal to the first path cost threshold $TH_{PC1}$ and less than a second path cost threshold $TH_{PC2}$. If the control circuit of the lighting control device determines at 1245 that the path cost is greater than or equal to the first path cost threshold $TH_{PC1}$ and less than the second path cost threshold $TH_{PC2}$, the control circuit of the lighting control device may provide a second feedback type at 1246. The feedback may be indicated by changing a state of the lighting loads controlled by the lighting control device. For example, the feedback may be indicated by changing the intensity and/or color of the lighting loads. The lighting control device may cause the lighting loads to illuminate a second color (e.g., yellow) to indicate that the path cost is greater than or equal to the first path cost threshold $TH_{PC1}$ and less than the second path cost threshold $TH_{PC2}$. Alternatively, the lighting control device may cause the lighting loads to illuminate the first color, at a different intensity (e.g., a greater intensity) than that used to indicate that the path cost is less than the first path cost threshold $TH_{PC1}$. Additionally and/or alternatively, the lighting control device may increase a spectral power value of the emitted light within a predefined band of wavelength above a predefined threshold to indicate that the path cost is greater than or equal to the first path cost threshold $TH_{PC1}$ and less than the second path cost threshold $TH_{PC2}$. The predefined band of wavelength and/or the predefined threshold may be different than the predefined band of wavelength and/or the predefined threshold used to indicate that the path cost is lower than the first path cost threshold $TH_{PC1}$. The procedure 1240 may end at 1251.

If the control circuit of the lighting control device determines that the path cost is not less than the second path cost threshold $TH_{PC2}$, the lighting control device may determine that the path cost is greater than the second path cost threshold $TH_{PC2}$ at 1247. For example, the control circuit of the lighting control device may determine, at 1247, that the path cost is greater than or equal to the second path cost threshold $TH_{PC2}$ and less than a third path cost threshold $TH_{PC3}$. If the control circuit of the lighting control device determines at 1247 that the path cost is greater than or equal to the second path cost threshold $TH_{PC2}$ and less than the third path cost threshold $TH_{PC3}$, the control circuit of the lighting control device may provide a third feedback type that indicates that the path cost is greater than or equal to the second path cost threshold $TH_{PC2}$ at 1248. The feedback may be indicated by changing a state of the lighting loads controlled by the lighting control device. For example, the feedback may be indicated by changing the intensity and/or color of the lighting loads. The lighting control device may cause the lighting loads to illuminate a third color (e.g., orange) to indicate that the path cost is greater than or equal to the second path cost threshold $TH_{PC2}$ and less than the third path cost threshold $TH_{PC3}$. Alternatively, the lighting control device may cause the lighting loads to illuminate the first color, at a different intensity (e.g., a greater intensity) than those used to indicate the first feedback type at 1244 and the second feedback type at 1246. Additionally and/or alternatively, the lighting control device may increase a spectral power value of the emitted light within a predefined band of wavelength above a predefined threshold to indicate that the path cost is greater than or equal to the second path cost threshold $TH_{PC2}$ and less than the third path cost threshold $TH_{PC3}$. The predefined band of wavelength and/or the predefined threshold may be different than those used to indicate the first feedback type at 1244 and the second feedback type at 1246. The procedure 1240 may end at 1251.

If the control circuit of the lighting control device determines that the path cost is greater than or equal to the third path cost threshold $TH_{PC3}$ at 1249, the lighting control device may provide a fourth feedback type at 1250. The feedback may be indicated by changing a state of the lighting loads controlled by the lighting control device. For example, the feedback may be indicated by changing the intensity and/or color of the lighting loads. The lighting control device may cause the lighting loads to emit light in a fourth color (e.g., red) to indicate that the path cost is greater than or equal to the third path cost threshold $TH_{PC3}$. Alternatively, the lighting control device may cause the lighting loads to illuminate the first color, at a different intensity (e.g., a greater intensity) than those used to indicate the first feedback type at 1244, the second feedback type at 1246, and the third feedback type at 1248. Additionally and/or alternatively, the lighting control device may increase a spectral power value of the emitted light within a predefined band of wavelength above a predefined threshold to indicate that the path cost is greater than or equal to the second path cost threshold $TH_{PC2}$ and less than the third path cost threshold $TH_{PC3}$. The predefined band of wavelength and/or the predefined threshold may be different than those used to indicate the first feedback type at 1244, the second feedback type at 1246, and the and the third feedback type at 1248. The procedure 1240 may end at 1251.

Using the procedure 1240, the path cost between devices in the network may be identified, such that the user or the user's user device may identify higher and/or lower path costs for communications between devices within the network. The user may then configure the control devices in an attempt to improve the path cost of communications between devices in the network. The user may improve the path cost between two devices by, for example, making the path between the devices shorter (e.g., decreasing the number of other devices in the path) and/or by increasing the link quality of a link between two devices in the path. For example, a user may attach an end device to another parent router device to improve the path cost between the end device and a leader device. The updated configuration may be sent from the user's user device and stored in the network information at the end device.

Other information that may assist a user in configuring, troubleshooting, and/or diagnosing problems in the network may be the noise floor. As described herein, the noise floor at a device may indicate the amount of wireless traffic (e.g., interference) at the device. For example, if a user can identify the noise floor at a given control device, such as a lighting control device, the user may identify an RSSI value for noise generated in the area of the lighting control device. The noise floor at a given control device may be particularly difficult to identify after the initial commissioning of a load control system, as devices are added to the network and items in the space are added or moved around and may cause interference for communications between devices on the network. The noise floor may be identified by measuring the noise at a device in the network by a user, but the noise floor may vary over time as the network changes and the noise floor identified by a user may be the noise floor at a snapshot in time, which may even be more misleading than helpful for configuring the network communications in the load control system.

Figure 12D:
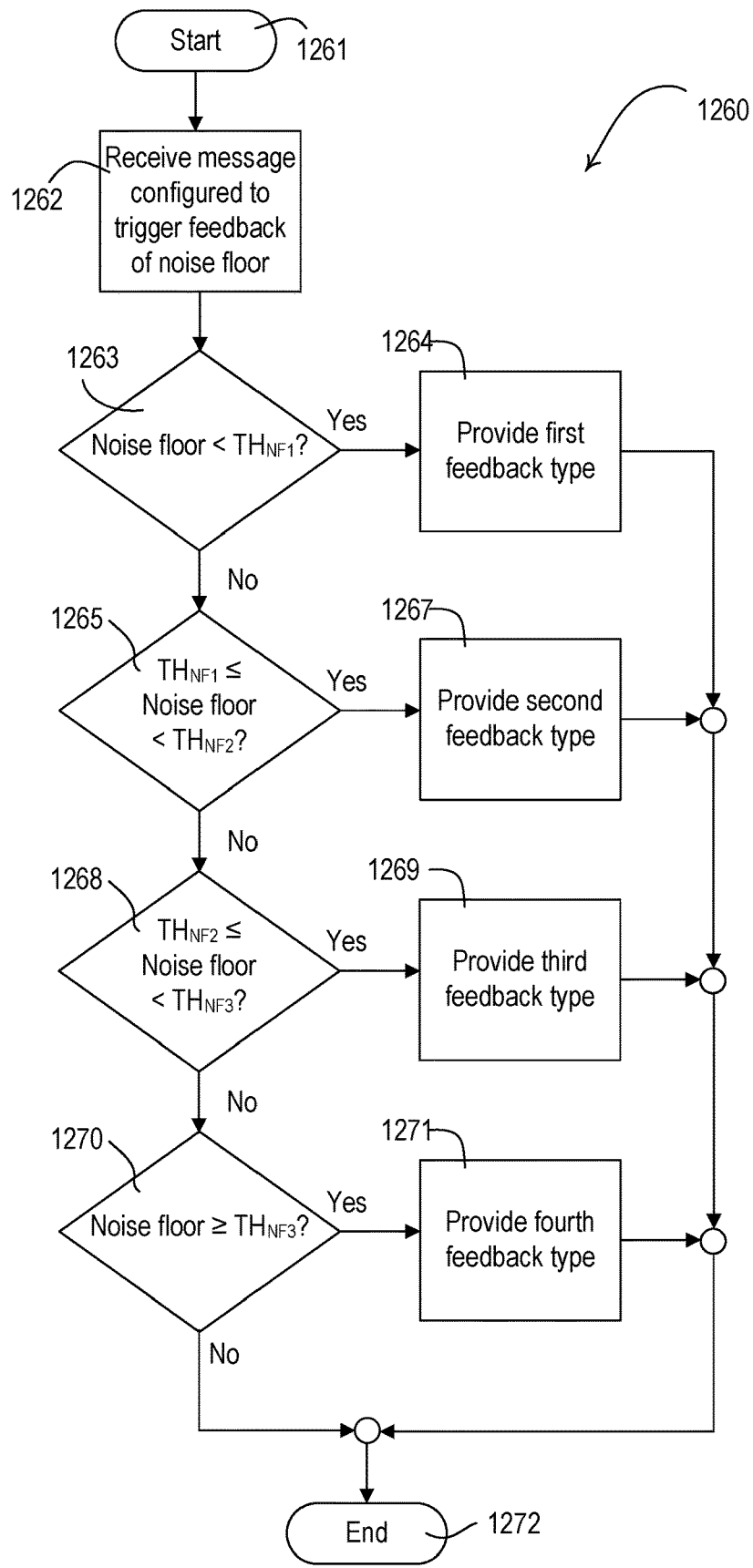
FIG. 12D is a flowchart depicting an example procedure for identifying a noise floor at a control device on a network.

FIG. 12D is a flowchart depicting an example procedure 1260 for identifying a noise floor at a control device on a network. For example, the control device may be a lighting control device. The lighting control device may control an amount of power provided to lighting loads of a lighting fixture. The procedure 1260 may be performed by the control circuit of the lighting control device upon identification of a triggering event. The triggering event may be receipt of a feedback message from a user device (e.g., a mobile device) and/or a system controller that causes the lighting control device to enter a feedback mode. The procedure 1260 may be used to generate a heat map representing the noise floor at one or more lighting control devices. For example, each lighting control device may illuminate a color that is associated with the noise floor for that lighting control device.

The procedure 1260 may begin at 1261. At 1262, the control circuit of the lighting control device may receive a feedback message for triggering feedback of the noise floor at the control device. For example, the control circuit of the lighting control device may receive the message from a user device (e.g., directly) and/or from a system controller. The feedback message may be communicated as a unicast message to the lighting control device, or as a multicast message to trigger the feedback of the noise floor at multiple lighting control devices in the space. The user device may transmit the message to the lighting control device using a wireless communication protocol. The system controller may transmit the message to the lighting control device via a wireless or wired connection. Though messages from the user device or the system controller are provided as examples for triggering feedback at the lighting control device, the lighting control devices may provide feedback based on other triggering criteria (e.g., in response to occupancy conditions, the RSSI value of the feedback message, or other messages or signals) as described herein.

After receiving the feedback message at 1262, the control circuit of the lighting control device may determine the noise floor from the network information stored in memory. The noise floor may be an RSSI value for noise generated on the network. For example, the noise floor may be an instantaneous value indicating the noise floor at the lighting control device, or the noise floor may be an average value indicating the noise floor at the lighting control device over a period of time. The noise floor may be used to determine the link quality and/or the path cost between the control device and another control device (e.g., a leader device or another router device).

At 1263, the control circuit of the lighting control device may determine whether the noise floor is lower than a first noise floor threshold $TH_{NF1}$. If it is determined at 1263 that the noise floor is lower than the first noise floor threshold $TH_{NF1}$, the control circuit of the lighting control device may provide a first feedback type at 1264. The feedback may be indicated by changing a state of the lighting loads controlled by the lighting control device. For example, the feedback may be indicated by changing the intensity and/or color of the lighting loads. The control circuit of the lighting control device may cause the lighting loads to illuminate a first color (e.g., green) to indicate that the noise floor is lower than the first noise floor threshold $TH_{NF1}$. Additionally and/or alternatively, the lighting control device may increase a spectral power value of the emitted light within a predefined band of wavelength above a predefined threshold to indicate that the noise floor is lower than the first noise floor threshold $TH_{NF1}$. The procedure 1260 may end at 1272.

If the control circuit of the lighting control device determines that the noise floor is not less than the first noise floor threshold $TH_{NF1}$, the control circuit of the lighting control device may determine whether the noise floor is greater than the first noise floor threshold $TH_{NF1}$. For example, the control circuit of the lighting control device may determine at 1245 that the noise floor is greater than or equal to the first noise floor threshold $TH_{NF1}$ and less than a second noise floor threshold $TH_{NF2}$. If it is determined at 1265 that the noise floor is greater than or equal to the first noise floor threshold $TH_{NF1}$ and less than the second noise floor threshold $TH_{NF2}$, the control circuit of the lighting control device may provide a second feedback type at 1267. The feedback may be indicated by changing a state of the lighting loads controlled by the lighting control device. For example, the feedback may be indicated by changing the intensity and/or color of the lighting loads. The control circuit of the lighting control device may cause the lighting loads to illuminate a second color (e.g., yellow) to indicate that the noise floor is greater than or equal to the first noise floor threshold $TH_{NF1}$ and less than a second noise floor threshold $TH_{NF2}$. Alternatively, the control circuit of the lighting control device may cause the lighting loads to illuminate the first color, at a different intensity (e.g., a greater intensity) than the first feedback type provided at 1264. Additionally and/or alternatively, the lighting control device may increase a spectral power value of the emitted light within a predefined band of wavelength above a predefined threshold to indicate that the noise floor is greater than or equal to the first noise floor threshold $TH_{NF1}$ and less than the second noise floor threshold $TH_{NF2}$. The predefined band of wavelength and/or the predefined threshold may be different than the predefined band of wavelength and/or the predefined threshold used to indicate the first feedback type provided at 1264. The procedure 1260 may end at 1272.

If the control circuit of the lighting control device determines that the noise floor is greater than or equal to the second noise floor threshold $TH_{NF2}$ at 1268, the control circuit of the lighting control device may provide a third feedback type at 1269. For example, the control circuit of the lighting control device may determine at 1268 that the noise floor is greater than or equal to the second noise floor threshold $TH_{NF2}$ and less than a third noise floor threshold $TH_{NF3}$. If it is determined at 1268 that the noise floor is greater than or equal to the second noise floor threshold $TH_{NF2}$ and less than the third noise floor threshold $TH_{NF3}$, the feedback may be indicated by changing a state of the lighting loads controlled by the lighting control device. For example, the feedback may be indicated by changing the intensity and/or color of the lighting loads. The control circuit of the lighting control device may cause the lighting loads to illuminate a third color (e.g., orange) to indicate that the noise floor is greater than or equal to the second noise floor threshold $TH_{NF2}$. Alternatively, the control circuit of the lighting control device may cause the lighting loads to illuminate the first color, at a different intensity (e.g., a greater intensity) than those used to indicate the first feedback type and the second feedback type. Additionally and/or alternatively, the lighting control device may increase a spectral power value of the emitted light within a predefined band of wavelength above a predefined threshold to indicate that the noise floor is greater than or equal to the second noise floor threshold $TH_{NF2}$ and less than a third noise floor threshold $TH_{NF3}$. The predefined band of wavelength and/or the predefined threshold may be different than those used to indicate the first feedback type and the second feedback type. The procedure 1260 may end at 1272.

The control circuit of the lighting control device may determine whether the noise floor is greater than or equal to a third noise floor threshold $TH_{NF3}$ at 1270. The third noise floor threshold $TH_{NF3}$ may be greater than the first noise floor threshold $TH_{NF1}$ and the second noise floor threshold $TH_{NF2}$. If it is determined at 1270 that the noise floor is not greater than or equal to the third noise floor threshold $TH_{NF3}$, the procedure 1260 may end at 1272.

If it is determined at 1270 that the noise floor is greater than or equal to third noise floor threshold $TH_{NF3}$, the control circuit of the lighting control device may provide a fourth feedback type at 1271. The feedback may be indicated by changing a state of the lighting loads controlled by the lighting control device. For example, the feedback may be indicated by changing the intensity and/or color of the lighting loads. The lighting control device may cause the lighting loads to illuminate a fourth color (e.g., red) to indicate that the noise floor is greater than or equal to the third noise floor threshold $TH_{NF3}$. Alternatively, the lighting control device may cause the lighting loads to illuminate the first color, at a different intensity (e.g., a greater intensity) than those used to indicate the first feedback type, the second feedback type, and the third feedback type. Additionally and/or alternatively, the lighting control device may increase a spectral power value of the emitted light within a predefined band of wavelength above a predefined threshold to indicate that the noise floor is greater than or equal to the third noise floor threshold $TH_{NF3}$. The predefined band of wavelength and/or the predefined threshold may be different than those used to indicate the first feedback type, the second feedback type, and the third feedback type. The procedure 1260 may end at 1272.

Using the procedure 1260, the noise floor at a control device may be identified, such that the user or the user's user device may identify control devices from which higher or lower noise floors are measured. Though the procedure 1260 indicates the use of a certain number of feedback types, there may be a greater or lesser number of feedback types that are implemented. For example, a greater number of feedback types may allow for a seamless gradient of color changing from one color to another across the space, and a more granular indication of the noise floor. More control devices may allow for a smaller change in color and more granular indication of noise floor form one device to another. In order to provide a granular indication of the noise floor, the control devices may calculate or generate the color provided as feedback of the noise floor as a function of the noise floor value.

Providing feedback to the user or user device that indicates the noise floor measured by a particular control device in the network may indicate the noise generated on the network at the device's location. For example, the feedback being provided to the user may indicate when other devices (e.g., a wireless access point (WAP) or a microwave) may be generating noise or interference with communications to/from the control device. The noise floor at a given control device may indicate the average amount of RF noise on the network from a source external to the network over a period of time (e.g., as an RSSI value). As other types of network information (e.g., link quality, path cost, etc.) may be provided or calculated based on the noise floor, identification of the noise floor may be useful in troubleshooting, diagnosing, and/or configuring other portions of the network.

The user may move the control device identified as having a relatively high noise floor to a different physical location that has a lower noise floor, thereby decreasing the likelihood that messages sent to and received from the control device will be dropped while maintaining the parent/child relationships of the control device. For example, a lamp that provides feedback of a relatively high noise floor in the space may be moved to a location in which the lamp provides feedback of a relatively lower noise floor. The user may additionally or alternatively identify a source of interference (e.g., a WAP) in the area of the control device and may reduce the interference by disabling, configuring, and/or physically moving the source of interference.

The procedures disclosed herein may be combined and used together to determine multiple types of information about a lighting control device at the same time. For example, the procedure 1000 shown in FIG. 10A and the procedure 1260 shown in FIG. 12D may be combined in computer executable or machine executable instructions to identify a noise floor around a device having a particular role on the network. A lighting control device may receive a message that triggers the lighting control device to provide feedback indicating the lighting control device's role on the network and the noise floor at the lighting control device. The lighting control device may provide different types of feedback to indicate the lighting control device's role on the network and the noise floor at the lighting control device. For example, the lighting control device's role on the network may be indicated by illuminating a corresponding lighting load a given color, and the noise floor at the lighting control device may be indicated by illuminating the corresponding lighting load at a given intensity. Alternatively, the lighting control device may indicate the lighting control device's role on the network and the noise floor at the lighting control device using the same feedback type. For example, the lighting control device may indicate its role on the network by illuminating at a given color, and may indicate the noise floor at the lighting control device by illuminating at a given shade within the color. Though the role and the noise floor are indicated as an example of the types of feedback that may be provided together, or in sequence, other types of feedback may similarly be provided (e.g., by a single feedback message or multiple feedback messages).

In performing troubleshooting, diagnostics, and/or configuration of a network, it may be difficult for a user to identify the path of communications between control devices to even identify the control devices to be configured for improving network communications. As described herein, a control device (e.g., a router device) may form part of a path between control devices (e.g., an end device and a leader device). In larger networks, there may be multiple alternative paths between the control devices in a network. For example, as shown in FIG. 2B, router eligible end device 241 may communicate with the leader device 211 via a first path including router devices 221d and 221a, and/or via a second path including router devices 221d, 221b, and 221c. Therefore, if messages communicated between a given end device and a leader device are dropped, it may be difficult to determine the path on which the messages are being communicated to help troubleshoot or diagnose inefficiencies in communication and/or configure the devices for improving communications.

Figure 13:
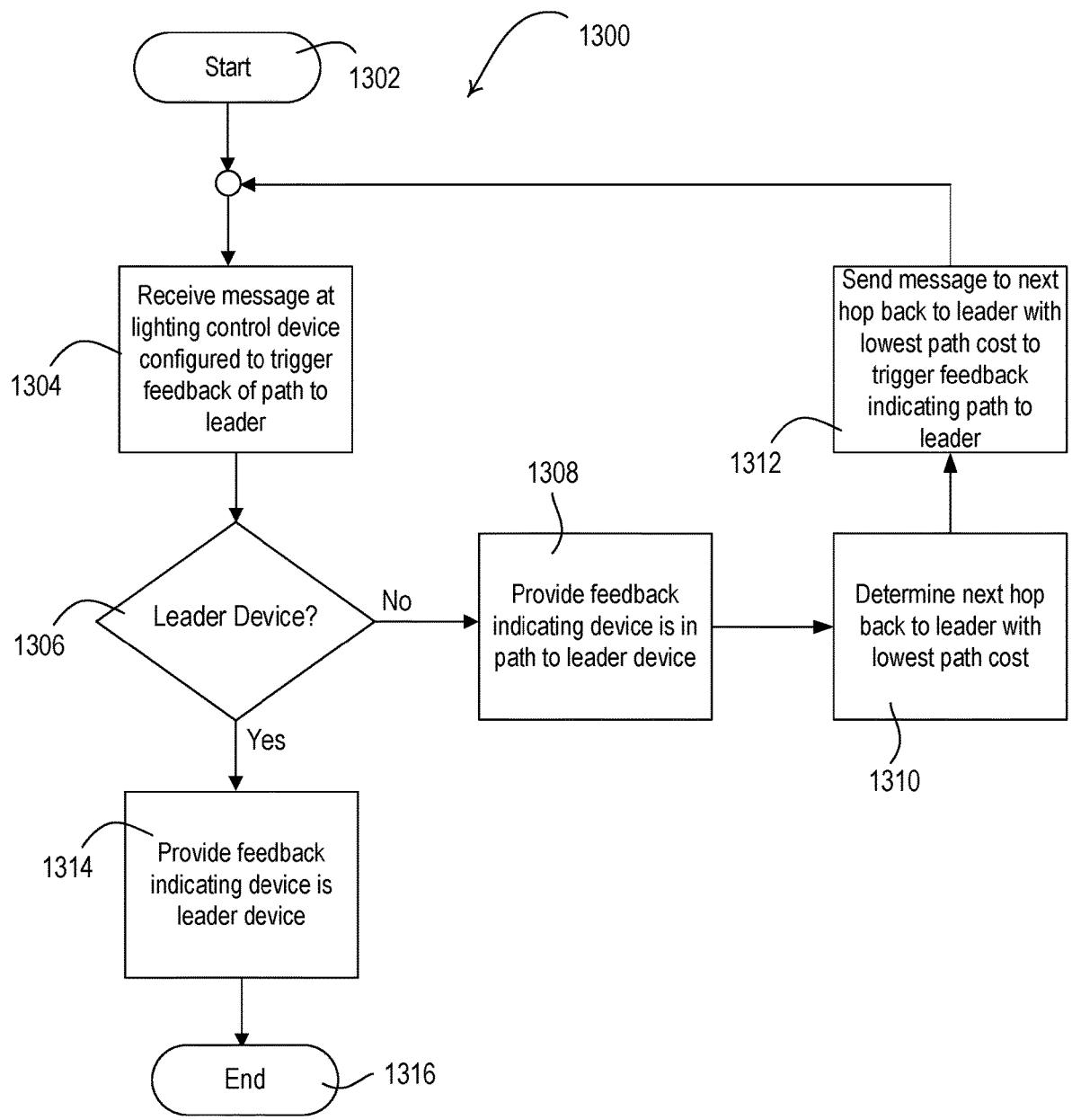
FIG. 13 is a flowchart depicting an example procedure for identifying a path between a control device and a leader device on a network.

Because the leader device may be responsible for organizing the roles of devices and communications on the network, it may be important that a control device has the best chance of communicating information to and/or receiving information from the leader device. If messages communicated between a given end device and a leader device are dropped, it may be helpful to know the path between the end device and the leader device, and which (if any) of the identified control devices are in the path between the end device and the leader device. The path between the end device and the leader device may be identified using a procedure 1300 shown in FIG. 13. FIG. 13 is a flowchart depicting an example procedure 1300 for identifying a path between a control device and its leader device on a network. For example, the control device may be a lighting control device. The lighting control device may control an amount of power provided to lighting loads of a lighting fixture. The lighting control device may be in communication with other lighting control devices in the network. For example, the lighting control device may share a direct communication link with the leader device or another router device in the network. The procedure 1300 may be performed by one or more lighting control devices to identify the communication path between a lighting control device and the leader device upon a triggering event. The triggering event may be the reception of a feedback message from a user device (e.g., a mobile device) and/or a system controller that causes the lighting control device to enter a feedback mode.

The procedure 1300 may begin at 1302. At 1304, a lighting control device may receive a message (e.g., a feedback message) for triggering feedback of the path from the lighting control device to the leader device in the network. For example, the lighting control device may receive the feedback message from a user device (e.g., directly), from another control device (e.g., a lighting control device) and/or from a system controller. The feedback message may be received as a unicast message that includes the unique identifier of the lighting control device for triggering the feedback. The user device may transmit the message to the control device using a wireless communication protocol (e.g., the BLUETOOTH® communication protocol or the BLUETOOTH® low energy (BLE) communication protocol). The system controller may transmit the message to the control device via a wireless or wired connection. Though messages from the user device or the system controller are provided as examples for triggering feedback at the lighting control device, the lighting control devices may provide feedback based on other triggering criteria (e.g., in response to occupancy conditions, the RSSI value of the feedback message, or other messages or signals) as described herein.

The lighting control device may receive the feedback message from the user device (e.g., directly or via the system controller) if, for example, the lighting control device is the first device in the path to the leader (e.g., the lighting control device is an end device). The lighting control device may receive the message from another lighting control device if the lighting control device is not the first device in the path to the leader (e.g., the lighting control device is a router device).

At 1306, the lighting control device may determine whether it is a leader device. As described herein, a leader device may manage other control devices in the network. A lighting control device may be an example of a leader device, though other control devices may be assigned as the leader device in a network or network partition. If the lighting control device determines at 1306 that it is a leader device, the lighting control device may provide feedback indicating that the device is the leader device at 1314. The feedback may be indicated by changing a state of the lighting loads controlled by the lighting control device. For example, the feedback may be indicated by illuminating a corresponding lighting load a color and/or intensity. The lighting control device may cause the lighting loads to illuminate a first color (e.g., blue) to indicate that the lighting control device is a leader device. Additionally and/or alternatively, the lighting control device may increase a spectral power value of the emitted light within a predefined band of wavelength above a predefined threshold. The procedure 1300 may end at 1316.

If the lighting control device does not determine that it is a leader device at 1306, the lighting control device may provide feedback indicating that the device is in the path to the leader device at 1308. The feedback may be indicated by changing a state of the lighting loads controlled by the lighting control device. For example, the feedback may be indicated by illuminating a corresponding lighting load a color and/or intensity. The lighting control device may cause the lighting loads to illuminate a second color (e.g., red) to indicate that the lighting control device is in the path to the leader device (e.g., device determines it is a router). The first device in the path to the leader device (e.g., device that determines it is an end device or a router device to which the end device is directly attached) may provide different feedback from the other devices in the path to the leader device. For example, the first device in the path may cause the lighting loads to illuminate a third color (e.g., green). Additionally and/or alternatively, the lighting control device may increase a spectral power value of the emitted light within a predefined band of wavelength above a predefined threshold to indicate that the noise floor is greater than or equal to the third noise floor threshold $TH_{NF3}$. The predefined band of wavelength and/or the predefined threshold may be different than those used to indicate the leader device.

At 1310, the lighting control device may determine a next hop back to the leader device with the lowest overall path cost (e.g., and/or highest link quality). After the lighting control device determines which device is the next hop back to the leader device, the lighting control device may send a message (e.g., a feedback message) to the determined device. The message may instruct the next device to provide feedback indicating that it is in the path to the leader device. The next device may receive the message at 1304, and the procedure 1300 may loop until the leader device is reached. The procedure 1300 may end at 1316 when the leader device is reached.

As described herein, the lighting control devices in the path to the leader may provide feedback indicating that they are in the path to the leader by changing the color of the lighting loads controlled by the respective lighting control devices. Different colors may be used to indicate lighting control devices that are in different portions of the path to the leader device. For example, the first device in the path (e.g., an end device) may illuminate a first color, the leader device may illuminate a second color, and other devices in the path (e.g., router devices) may illuminate a third color. Alternatively, each device in the path may illuminate separate colors and/or intensities. The different colors and/or intensities may be used to show the order of the devices in the path. For example, the wavelength of the color used to indicate each device may decrease (e.g., from red to blue) for each successive device in the path, which may allow the user to see the order of the devices in the path to the leader device. Additionally and/or alternatively, the lighting control device may increase a spectral power value of the emitted light within a predefined band of wavelength above a predefined threshold. Different predefined bands of wavelength and/or different predefined thresholds may be used to show the order of the devices in the path.

Using the procedure 1300 to identify paths between respective end devices and the leader device(s) may have one or more benefits. For example, as described with reference to FIG. 6D, identifying the path between an end device and a leader device may be helpful for avoiding router devices and/or areas having a relatively high noise floor. In addition, the procedure 1300 may identify a router device that is in a relatively high number of paths, and thus has a relatively high amount of wireless traffic. The user may reduce the number of paths that go through the router device by, for example, adding another router device to the network, or by rerouting one or more of the paths to go through another router device that is already in the network. The procedure 1300 may also be used to identify that a path has an increased likelihood of dropped messages because, for example, the path may indicate that one or more hops between control devices are physically far apart, or the path includes a relatively high number of devices in an area on the path that may cause interference on the path.

The procedure 1300 shown in FIG. 13 may be used in combination with or consecutively with one or more of the procedures described herein. For example, as described herein, the procedure 1300 may be used consecutively with procedure 1000 shown in FIG. 10A to identify a particular device type (e.g., an end device) and illuminate the path from the device to the leader device. Using the procedure 1300 in combination with or consecutively with one or more other procedures may allow the user to configure control devices in a network to, for example, increase reliability and/or to decrease latency. After the path between two devices is identified, the user may send a feedback message to identify the noise floor, link quality, link cost, or provide other feedback for devices on the path to diagnose problems that may occur on the communication path between the devices. The user may perform one or more actions to improve communications in the path between the end device and the leader device, such as attaching the end device to another router device to improve the quality of the communication path to the leader device.

Although features and elements are described herein in particular combinations, each feature or element can be used alone or in any combination with the other features and elements. The procedures described herein may be implemented in a computer program, software, instructions, or firmware stored on one or more non-transitory computer-readable media or other machine-readable media for execution by a computer or machine, or portion thereof. For example, the computer-readable or machine-readable media may be executed by a control circuit, such as a processor. Examples of computer-readable media or machine-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). The control circuit may access the computer program, software, instructions, or firmware stored on the computer-readable media or machine-readable media for being executed to cause the control circuit to operate as described herein, or to operate one or more devices as described herein.

What is claimed is:

1. A lighting control device comprising:
 a load control circuit configured to control an amount of power provided to at least one lighting load;
 a communication circuit configured to communicate messages on a network; and
 a control circuit configured to:
  receive, via the communication circuit, a message, wherein the message comprises a triggering event for triggering a feedback mode to indicate diagnostic or configuration information for at least one lighting control device, wherein the diagnostic or configuration information comprises network information associated with the lighting control device and the network, wherein the network information comprises a link quality between the lighting control device and another device in the network; and in response to receiving the triggering event, provide feedback by controlling the load control circuit to control the amount of power provided to the at least one lighting load to indicate the diagnostic or configuration information associated with the lighting control device, wherein the feedback is indicated using a predefined color.

2. The lighting control device of claim 1, wherein the lighting control device is within a plurality of lighting control devices in a lighting control system, and wherein the lighting control device meets predefined criteria indicated in the message for providing the feedback.

3. The lighting control device of claim 2, wherein the lighting control device is a first lighting control device in the plurality of lighting control devices, wherein the predefined color is a first color output, and wherein the first color output is different than a second color output configured to be provided by at least one lighting load of a second lighting control device.

4. The lighting control device of claim 3, wherein the second color output is configured to indicate that the second lighting control device does not meet the predefined criteria for providing the feedback indicated in the message.

5. The lighting control device of claim 4, wherein the first color output comprises a total light output of the first lighting control device that meets the predefined criteria for providing the feedback, and wherein a second color output comprises the total light output of the second lighting control device that does not meet the predefined criteria.

6. The lighting control device of claim 1, wherein the at least one lighting load that is used to provide the feedback is within a plurality of lighting loads used to provide a total light output for the lighting control device.

7. The lighting control device of claim 6, wherein the at least one lighting load that is used to indicate the feedback is configured to emit light in a predefined band of wavelength.

8. The lighting control device of claim 7, wherein the lighting control device is configured to provide the feedback by causing the load control circuit to increase an intensity level of the at least one lighting load above a predefined threshold.

9. The lighting control device of claim 8, wherein the control circuit is configured to cause the load control circuit to increase the intensity level of the at least one lighting load based on a decrease in a vibrancy value used to indicate a saturation level for the total light output of the lighting control device.

10. The lighting control device of claim 9, wherein the at least one lighting load comprises a white lighting load, and wherein the control circuit is configured to cause the load control circuit to control at least one other lighting load of the plurality of lighting loads to provide the total light output for the lighting control device comprises a non-white lighting load.

11. The lighting control device of claim 10, wherein the total light output configured to be emitted by the plurality of lighting loads of the lighting control device comprises a first color value that is visibly indistinguishable from a second color value of the total light output configured to be emitted by a plurality of lighting loads of a second lighting control device.

12. The lighting control device of claim 11, wherein the first color value and the second color value are color temperature values on a black body curve.

13. The lighting control device of claim 11, wherein the first color value comprises first chromaticity coordinates, wherein the second color value comprises second chromaticity coordinates, wherein the first chromaticity coordinates and the second chromaticity coordinates are within a predefined distance of one another on a color spectrum.

14. The lighting control device of claim 13, wherein the predefined distance comprises a predefined number of MacAdam ellipses on the color spectrum.

15. The lighting control device of claim 11, wherein the first color value corresponds to a first spectral distribution of a visible light spectrum, and wherein the second color value corresponds to a second spectral distribution of the visible light spectrum.

16. The lighting control device of claim 15, wherein the first spectral distribution is a metameric match with the second spectral distribution.

17. The lighting control device of claim 1, wherein the feedback is configured to provide color diagnostic information indicating a relative performance of the lighting control device on the network.

18. The lighting control device of claim 1, wherein the network information comprises a role of the lighting control device in the network.

19. The lighting control device of claim 18, wherein the role comprises one of a leader device, a router device, or an end device in a mesh network.

20. The lighting control device of claim 1, wherein the link quality comprises the link quality to a parent device of the lighting control device in the network.

21. The lighting control device of claim 1, wherein the network information comprises a noise floor, wherein the predefined color is different for different predefined noise floor values.

22. The lighting control device of claim 1, wherein the network information comprises an indication of whether the lighting control device is a parent device or a child device in the network.

23. The lighting control device of claim 22, wherein the lighting control device is a parent device, and wherein the control circuit is further configured to:

transmit, via the communication circuit, a message to a child device configured to cause the child device to provide feedback to identify itself.

24. The lighting control device of claim 22, wherein the lighting control device is a child device, and wherein the control circuit is further configured to:

transmit, via the communication circuit, a message to a parent device configured to cause the parent device to provide feedback to identify itself.

25. The lighting control device of claim 1, wherein the message is configured to cause the lighting control device to provide the feedback if the lighting control device is in a communication path in a mesh network between a first device and a second device, and wherein the control circuit is further configured to:

determine that the lighting control device is in the communication path; and in response to the determination that the lighting control device is in the communication path, provide the feedback.

26. The lighting control device of claim 25, wherein the control circuit is configured to determine that the lighting control device is in the communication path by being further configured to determine that the lighting control device is a next hop in the mesh network with a lowest path cost toward a leader device.

27. Non-transitory computer readable media having instructions stored thereon that, when executed by a control circuit, cause the control circuit to:
   receive a message at a lighting control device, wherein the message comprises a triggering event for triggering a feedback mode to indicate diagnostic or configuration information for at least one lighting control device, wherein the diagnostic or configuration information comprises network information associated with the lighting control device and a network, wherein the network information comprises a link quality between the lighting control device and another device in the network; and
   in response to receiving the triggering event, provide the feedback at the lighting control device by controlling an amount of power provided to at least one lighting load of the lighting control device to indicate the diagnostic or configuration information associated with the lighting control device, wherein the feedback is indicated using a predefined color.

28. A method comprising:
   receiving a message at a lighting control device, wherein the message comprises a triggering event for triggering a feedback mode to indicate diagnostic or configuration information for the at least one lighting control device, wherein the diagnostic or configuration information comprises network information associated with the lighting control device and a network, wherein the network information comprises a link quality between the lighting control device and another device in the network; and
   in response to receiving the triggering event, providing feedback at the lighting control device by controlling an amount of power provided to at least one lighting load of the lighting control device to indicate the diagnostic or configuration information associated with the lighting control device, wherein the feedback is indicated using a predefined color.

29. The non-transitory computer readable media of claim 27, wherein the network information comprises a role of the lighting control device in the network, and wherein the role comprises one of a leader device, a router device, or an end device in a mesh network.

30. The non-transitory computer readable media of claim 27, wherein the message is configured to cause the lighting control device to provide the feedback if the lighting control device is in a communication path in a mesh network between a first device and a second device, and wherein the instructions, when executed by the control circuit, further cause the control circuit to:
   determine that the lighting control device is in the communication path based on a determination that the lighting control device is a next hop in the mesh network with a lowest path cost toward a leader device; and
   in response to the determination that the lighting control device is in the communication path, provide the feedback.

31. The non-transitory computer readable media of claim 27, wherein the network information comprises one or more of a noise floor or an indication of whether the lighting control device is a parent device or a child device in the network, wherein the predefined color is different for different predefined noise floor values, and wherein the link quality comprises a link quality to a parent device of the lighting control device in the network.

32. The method of claim 28, wherein the network information comprises a role of the lighting control device in the network, and wherein the role comprises one of a leader device, a router device, or an end device in a mesh network.

33. The method of claim 28, wherein the message is configured to cause the lighting control device to provide the feedback if the lighting control device is in a communication path in a mesh network between a first device and a second device, and wherein the method further comprises:
   determining that the lighting control device is in the communication path based on a determination that the lighting control device is a next hop in the mesh network with a lowest path cost toward a leader device; and
   in response to determining that the lighting control device is in the communication path, providing the feedback.

34. The method of claim 28, wherein the network information comprises one or more of a noise floor or an indication of whether the lighting control device is a parent device or a child device in the network, wherein the predefined color is different for different predefined noise floor values, and wherein the link quality comprises a link quality to a parent device of the lighting control device in the network.

35. A lighting control device comprising:
   a load control circuit configured to control an amount of power provided to at least one lighting load;
   a communication circuit configured to communicate messages on a network; and
   a control circuit configured to:
      receive, via the communication circuit, a message, wherein the message comprises a triggering event for triggering a feedback mode to indicate diagnostic or configuration information for at least one lighting control device, wherein the diagnostic or configuration information comprises network information associated with the lighting control device and the network, and wherein the network information comprises a noise floor; and
      in response to receiving the triggering event, provide feedback by controlling the load control circuit to control the amount of power provided to the at least one lighting load to indicate the diagnostic or configuration information associated with the lighting control device, wherein the feedback is indicated using a predefined color, and wherein the predefined color is different for different predefined noise floor values.

36. The lighting control device of claim 35, wherein the network information comprises a role of the lighting control device in the network, and wherein the role comprises one of a leader device, a router device, or an end device in a mesh network.

37. The lighting control device of claim 35, wherein the message is configured to cause the lighting control device to provide the feedback if the lighting control device is in a communication path in a mesh network between a first device and a second device, and wherein the control circuit is further configured to:
   determine that the lighting control device is in the communication path based on a determination that the lighting control device is a next hop in the mesh network with a lowest path cost toward a leader device; and in response to the determination that the lighting control device is in the communication path, provide the feedback.

38. The lighting control device of claim 35, wherein the network information comprises one or more of a link quality between the lighting control device and another device in the network or an indication of whether the lighting control device is a parent device or a child device in the network, and wherein the link quality comprises a link quality to a parent device of the lighting control device in the network.

39. Non-transitory computer readable media having instructions stored thereon that, when executed by a control circuit, cause the control circuit to:
    receive a message at a lighting control device, wherein the message comprises a triggering event for triggering a feedback mode to indicate diagnostic or configuration information for at least one lighting control device, wherein the diagnostic or configuration information comprises network information associated with the lighting control device and a network, and wherein the network information comprises a noise floor; and
    in response to receiving the triggering event, provide the feedback at the lighting control device by controlling an amount of power provided to at least one lighting load of the lighting control device to indicate the diagnostic or configuration information associated with the lighting control device, wherein the feedback is indicated using a predefined color, and wherein the predefined color is different for different predefined noise floor values.

40. The non-transitory computer readable media of claim 39, wherein the network information comprises a role of the lighting control device in the network, and wherein the role comprises one of a leader device, a router device, or an end device in a mesh network.

41. The non-transitory computer readable media of claim 39, wherein the message is configured to cause the lighting control device to provide the feedback if the lighting control device is in a communication path in a mesh network between a first device and a second device, and wherein the instructions, when executed by the control circuit, further cause the control circuit to:
    determine that the lighting control device is in the communication path based on a determination that the lighting control device is a next hop in the mesh network with a lowest path cost toward a leader device; and
    in response to the determination that the lighting control device is in the communication path, provide the feedback.

42. The non-transitory computer readable media of claim 39, wherein the network information comprises one or more of a link quality between the lighting control device and another device in the network or an indication of whether the lighting control device is a parent device or a child device in the network, and wherein the link quality comprises a link quality to a parent device of the lighting control device in the network.

43. A method comprising:
    receiving a message at a lighting control device, wherein the message comprises a triggering event for triggering a feedback mode to indicate diagnostic or configuration information for the at least one lighting control device, wherein the diagnostic or configuration information comprises network information associated with the lighting control device and a network, and wherein the network information comprises a noise floor; and
    in response to receiving the triggering event, providing feedback at the lighting control device by controlling an amount of power provided to at least one lighting load of the lighting control device to indicate the diagnostic or configuration information associated with the lighting control device, wherein the feedback is indicated using a predefined color, and wherein the predefined color is different for different predefined noise floor values.

44. The method of claim 43, wherein the network information comprises a role of the lighting control device in the network, and wherein the role comprises one of a leader device, a router device, or an end device in a mesh network.

45. The method of claim 43, wherein the message is configured to cause the lighting control device to provide the feedback if the lighting control device is in a communication path in a mesh network between a first device and a second device, and wherein the method further comprises:
    determining that the lighting control device is in the communication path based on a determination that the lighting control device is a next hop in the mesh network with a lowest path cost toward a leader device; and
    in response to determining that the lighting control device is in the communication path, providing the feedback.

46. The method of claim 43, wherein the network information comprises one or more of a link quality between the lighting control device and another device in the network or an indication of whether the lighting control device is a parent device or a child device in the network, and wherein the link quality comprises a link quality to a parent device of the lighting control device in the network.

47. A lighting control device comprising:
    a load control circuit configured to control an amount of power provided to at least one lighting load;
    a communication circuit configured to communicate messages on a network; and
    a control circuit configured to:
        receive, via the communication circuit, a message, wherein the message comprises a triggering event for triggering a feedback mode to indicate diagnostic or configuration information for at least one lighting control device, wherein the diagnostic or configuration information comprises network information associated with the lighting control device and the network, wherein the network information comprises an indication of whether the lighting control device is a parent device or a child device in the network; and
        in response to receiving the triggering event, provide feedback by controlling the load control circuit to control the amount of power provided to the at least one lighting load to indicate the diagnostic or configuration information associated with the lighting control device, wherein the feedback is indicated using a predefined color.

48. The lighting control device of claim 47, wherein the network information comprises a role of the lighting control device in the network, and wherein the role comprises one of a leader device, a router device, or an end device in a mesh network.

49. The lighting control device of claim 47, wherein the message is configured to cause the lighting control device to provide the feedback if the lighting control device is in a communication path in a mesh network between a first device and a second device, and wherein the control circuit is further configured to:

determine that the lighting control device is in the communication path based on a determination that the lighting control device is a next hop in the mesh network with a lowest path cost toward a leader device; and in response to the determination that the lighting control device is in the communication path, provide the feedback.

50. The lighting control device of claim 47, wherein the network information comprises one or more of a link quality between the lighting control device and another device in the network or a noise floor, wherein the link quality comprises a link quality to a parent device of the lighting control device in the network, and wherein the predefined color is different for different predefined noise floor values.

51. Non-transitory computer readable media having instructions stored thereon that, when executed by a control circuit, cause the control circuit to:

receive a message at a lighting control device, wherein the message comprises a triggering event for triggering a feedback mode to indicate diagnostic or configuration information for at least one lighting control device, wherein the diagnostic or configuration information comprises network information associated with the lighting control device and a network, and wherein the network information comprises an indication of whether the lighting control device is a parent device or a child device in the network; and in response to receiving the triggering event, provide the feedback at the lighting control device by controlling an amount of power provided to at least one lighting load of the lighting control device to indicate the diagnostic or configuration information associated with the lighting control device, wherein the feedback is indicated using a predefined color.

52. The non-transitory computer readable media of claim 51, wherein the network information comprises a role of the lighting control device in the network, and wherein the role comprises one of a leader device, a router device, or an end device in a mesh network.

53. The non-transitory computer readable media of claim 51, wherein the message is configured to cause the lighting control device to provide the feedback if the lighting control device is in a communication path in a mesh network between a first device and a second device, and wherein the instructions, when executed by the control circuit, further cause the control circuit to:

determine that the lighting control device is in the communication path based on a determination that the lighting control device is a next hop in the mesh network with a lowest path cost toward a leader device; and in response to the determination that the lighting control device is in the communication path, provide the feedback.

54. The non-transitory computer readable media of claim 51, wherein the network information comprises one or more of a link quality between the lighting control device and another device in the network or a noise floor, wherein the link quality comprises a link quality to a parent device of the lighting control device in the network, and wherein the predefined color is different for different predefined noise floor values.

55. A method comprising:

receiving a message at a lighting control device, wherein the message comprises a triggering event for triggering a feedback mode to indicate diagnostic or configuration information for the at least one lighting control device, wherein the diagnostic or configuration information comprises network information associated with the lighting control device and a network, and wherein the network information comprises an indication of whether the lighting control device is a parent device or a child device in the network; and in response to receiving the triggering event, providing feedback at the lighting control device by controlling an amount of power provided to at least one lighting load of the lighting control device to indicate the diagnostic or configuration information associated with the lighting control device, wherein the feedback is indicated using a predefined color.

56. The method of claim 55, wherein the network information comprises a role of the lighting control device in the network, and wherein the role comprises one of a leader device, a router device, or an end device in a mesh network.

57. The method of claim 55, wherein the message is configured to cause the lighting control device to provide the feedback if the lighting control device is in a communication path in a mesh network between a first device and a second device, and wherein the method further comprises:

determining that the lighting control device is in the communication path based on a determination that the lighting control device is a next hop in the mesh network with a lowest path cost toward a leader device; and in response to determining that the lighting control device is in the communication path, providing the feedback.

58. The method of claim 55, wherein the network information comprises one or more of a link quality between the lighting control device and another device in the network or a noise floor, wherein the link quality comprises a link quality to a parent device of the lighting control device in the network, and wherein the predefined color is different for different predefined noise floor values.

* * * * *